(12) United States Patent
Kennedy et al.

(10) Patent No.: US 9,378,525 B2
(45) Date of Patent: Jun. 28, 2016

(54) INTEGRATED ELECTRONIC CREDIT APPLICATION, CONTRACTING AND SECURITIZATION SYSTEM AND METHOD

(75) Inventors: William R. Kennedy, Melville, NY (US); Charles J. Giglia, New York City, NY (US)

(73) Assignee: Dealertrack, Inc., Lake Success, NY (US)

( * ) Notice: Subject to any disclaimer, the term of this patent is extended or adjusted under 35 U.S.C. 154(b) by 1689 days.

(21) Appl. No.: 10/559,066

(22) PCT Filed: Jul. 31, 2004

(86) PCT No.: PCT/US2004/025866
§ 371 (c)(1),
(2), (4) Date: May 3, 2006

(87) PCT Pub. No.: WO2005/010731
PCT Pub. Date: Feb. 3, 2005

(65) Prior Publication Data
US 2006/0277123 A1 Dec. 7, 2006

Related U.S. Application Data

(60) Provisional application No. 60/491,621, filed on Jul. 31, 2003.

(51) Int. Cl.
*G06Q 40/00* (2012.01)
*G06Q 40/02* (2012.01)

(52) U.S. Cl.
CPC ............... *G06Q 40/02* (2013.01); *G06Q 40/00* (2013.01)

(58) Field of Classification Search
USPC .................. 705/35, 38, 39; 235/379–381
See application file for complete search history.

(56) References Cited

U.S. PATENT DOCUMENTS

| | | | |
|---|---|---|---|
| 3,970,992 A | 7/1976 | Boothroyd et al. |
| 4,017,835 A | 4/1977 | Randolph |
| 4,491,725 A | 1/1985 | Pritchard |
| 4,598,367 A | 7/1986 | DeFrancesco et al. |
| 4,600,828 A | 7/1986 | Nogami et al. |
| 4,642,768 A | 2/1987 | Roberts |
| 4,646,250 A | 2/1987 | Childress |
| 4,648,037 A | 3/1987 | Valentino |
| 4,649,037 A | 3/1987 | Marsh et al. |
| 4,649,832 A | 3/1987 | Hain et al. |

(Continued)

FOREIGN PATENT DOCUMENTS

| | | |
|---|---|---|
| EP | 0629962 | 12/1994 |
| EP | 0774725 | 5/1997 |
| JP | 05-101250 | 4/1993 |

OTHER PUBLICATIONS

Digital Handshake Registry Process, White Paper, ILumin Corporation, 2002, 6 pages.

(Continued)

*Primary Examiner* — Olabode Akintola
(74) *Attorney, Agent, or Firm* — Downs Rachlin Martin PLLC

(57) ABSTRACT

The present invention is an integrated electronic credit application, contracting, and securitization system and method. In one embodiment, the present invention comprises the following integrated components: a Credit Application Module, an eContracting Module and an eDocument Storage Module. Together the components enable "paper-lese" commercial transactions.

66 Claims, 63 Drawing Sheets

(56) References Cited

U.S. PATENT DOCUMENTS

| | | | |
|---|---|---|---|
| 4,675,815 A | 6/1987 | Kuroki et al. | |
| 4,683,536 A | 7/1987 | Yamamoto et al. | |
| 4,722,055 A | 1/1988 | Roberts | |
| 4,730,252 A | 3/1988 | Bradshaw | |
| 4,736,294 A | 4/1988 | Gill et al. | |
| 4,752,877 A | 6/1988 | Roberts et al. | |
| 4,772,055 A | 9/1988 | Fang | |
| 4,774,664 A | 9/1988 | Campbell et al. | |
| 4,814,587 A | 3/1989 | Carter | |
| 4,890,228 A | 12/1989 | Longfield | |
| 4,914,587 A | 4/1990 | Clouse | |
| 4,947,028 A | 8/1990 | Gorog | |
| 4,949,028 A | 8/1990 | Brune | |
| 4,958,368 A | 9/1990 | Parker | |
| 4,965,821 A | 10/1990 | Bishop et al. | |
| 4,992,939 A | 2/1991 | Tyler | |
| 5,023,904 A | 6/1991 | Kaplan et al. | |
| 5,025,138 A | 6/1991 | Cuervo | |
| 5,025,373 A | 6/1991 | Keyser, Jr. et al. | |
| 5,049,862 A | 9/1991 | Dao et al. | |
| 5,083,270 A | 1/1992 | Gross et al. | |
| 5,120,906 A | 6/1992 | Protheroe et al. | |
| 5,126,936 A | 6/1992 | Champion et al. | |
| 5,126,939 A | 6/1992 | Carpentier et al. | |
| 5,198,642 A | 3/1993 | Deniger | |
| 5,202,825 A | 4/1993 | Miller et al. | |
| 5,202,826 A | 4/1993 | McCarthy | |
| 5,206,803 A | 4/1993 | Vitagliano et al. | |
| 5,212,789 A | 5/1993 | Rago | |
| 5,213,571 A | 5/1993 | Fujio et al. | |
| 5,218,539 A | 6/1993 | Elphick et al. | |
| 5,220,501 A | 6/1993 | Lawlor et al. | |
| 5,231,571 A | 7/1993 | D'Agostino | |
| 5,239,462 A | 8/1993 | Jones et al. | |
| 5,241,620 A | 8/1993 | Ruggiero | |
| 5,262,941 A | 11/1993 | Saladin et al. | |
| 5,274,547 A | 12/1993 | Zoffel et al. | |
| 5,287,268 A | 2/1994 | McCarthy | |
| 5,297,202 A | 3/1994 | Kapp et al. | |
| 5,301,320 A | 4/1994 | McAtee et al. | |
| 5,361,201 A | 11/1994 | Jost et al. | |
| 5,369,570 A | 11/1994 | Parad | |
| 5,383,113 A | 1/1995 | Kight et al. | |
| 5,537,315 A | 7/1996 | Mitcham | |
| 5,559,895 A | 9/1996 | Lee et al. | |
| 5,576,951 A | 11/1996 | Lockwood | |
| 5,604,341 A | 2/1997 | Grossi et al. | |
| 5,611,052 A | 3/1997 | Dykstra et al. | |
| 5,627,978 A | 5/1997 | Altom et al. | |
| 5,699,527 A | 12/1997 | Davidson | |
| 5,734,837 A | 3/1998 | Flores et al. | |
| 5,744,882 A | 4/1998 | Teshima et al. | |
| 5,774,882 A | 6/1998 | Keen et al. | |
| 5,774,883 A | 6/1998 | Andersen et al. | |
| 5,794,133 A | 8/1998 | Kashima | |
| 5,797,133 A | 8/1998 | Jones et al. | |
| 5,867,799 A | 2/1999 | Lang et al. | |
| 5,870,721 A * | 2/1999 | Norris | 705/38 |
| 5,878,403 A * | 3/1999 | DeFrancesco | G06Q 20/10 |
| | | | 705/35 |
| 5,893,128 A | 4/1999 | Nauckhoff | |
| 5,930,776 A | 7/1999 | Dykstra et al. | |
| 5,940,811 A | 8/1999 | Norris | |
| 5,940,812 A | 8/1999 | Tengel et al. | |
| 5,940,829 A | 8/1999 | Tsuiki et al. | |
| 5,950,169 A | 9/1999 | Borghesi et al. | |
| 5,960,404 A | 9/1999 | Chaar et al. | |
| 5,966,699 A | 10/1999 | Zandi | |
| 5,974,392 A | 10/1999 | Endo | |
| 6,014,645 A | 1/2000 | Cunningham | |
| 6,029,149 A * | 2/2000 | Dykstra et al. | 705/38 |
| 6,105,007 A | 8/2000 | Norris | |
| 6,135,349 A | 10/2000 | Zirkel | |
| 6,135,399 A | 10/2000 | Savoie et al. | |
| 6,208,979 B1 | 3/2001 | Sinclair | |
| 6,233,566 B1 | 5/2001 | Levine et al. | |
| 6,237,096 B1 * | 5/2001 | Bisbee | G06Q 20/00 |
| | | | 705/51 |
| 6,385,594 B1 * | 5/2002 | Lebda et al. | 705/38 |
| 6,587,841 B1 | 7/2003 | DeFrancesco et al. | |
| 6,603,487 B1 | 8/2003 | Bennett et al. | |
| 6,611,052 B2 | 8/2003 | Poo et al. | |
| 7,181,427 B1 | 2/2007 | DeFrancesco et al. | |
| 7,801,807 B2 | 9/2010 | DeFrancesco et al. | |
| 7,814,002 B2 | 10/2010 | DeFrancesco et al. | |
| 2003/0023528 A1 * | 1/2003 | Wilce | G06F 17/24 |
| | | | 705/35 |
| 2003/0191714 A1 * | 10/2003 | Norris | G06Q 20/10 |
| | | | 705/43 |
| 2004/0138992 A1 | 7/2004 | DeFrancesco et al. | |
| 2004/0138994 A1 | 7/2004 | DeFrancesco et al. | |
| 2004/0138997 A1 | 7/2004 | DeFrancesco et al. | |

OTHER PUBLICATIONS

Digital Handshake Secure Transaction Execution E-Sign and UETA Compliance, iLumin Corporation, 2001, 11 pages.
Digital Vault Authority, Technical White Paper, ILumin Corporation, 2001, 10 pages.
iLumin DHS Proposal, presented and prepared by Bob McGuinness of iLumin to DealerTrack on Oct. 1, 2001, 7 pages.
"Barnett Arm Links With Auto Dealers" Bank Systems & Technology, vol. 34, No. 4, Apr. 1997, p. 14, 2 pages.
"CMSI and HNC, Inc. Provide Credit Processing System" Bank Marketing, Aug. 1993, p. 45, 1 page.
"Department Store Reconfigures Credit Decision Process" Credit Risk Management Report, vol. 2, No. 20, Sep. 28, 1992, 2 pages.
"Opportunities, Obstacles in Subprime Loan Market" Credit Risk Management Report, vol. 6, Issue 4, Feb. 26, 1996, 3 pages.
"The Lure of the Subprime" Automative News, No. 5673, Aug. 12, 1996, p. 1i, 4 pages.
Baljko, "Automated Review System Drives BB&T's Subprime Loan Business" Bank Systems & Technology, vol. 34, No. 7, Jul. 1997, p. 62, 2 pages.
Clark, "Royal Bank to Emphasize Indirect Auto Lending" American Banker, vol. 163, No. 185, Sep. 28, 1998, p. 17, 2 pages.
Michaelson, "Outsource Financial Chooses CMSI" National Mortgage News, vol. 22, No. 39, Jun. 22, 1998, p. 39, 2 pages.
Moyer, "Due Soon from Wells Fargo: 10-Minute Car Loans" American Banker, vol. 161, No. 126, Jul. 2, 1996, p. 16, 2 pages.
Wortmann, "Re-Engineering Update: Where Banks are Going to Filt Along the Information Highway" American Banker, vol. 159, No. 98, Apr. 1994, p. 7A, 3 pages.
Office Action issued in related U.S. Pat. No. 5,878,403, mailed Mar. 31, 1998, 12 pages.
Notice of Allowance issued in related U.S. Pat. No. 5,878,403, mailed Jun. 23, 1998, 5 pages.
Office Action issued in related U.S. Pat. No. 6,587,841, mailed Sep. 27, 2001, 8 pages.
Notice of Allowance issued in related U.S. Pat. No. 6,587,841, mailed Feb. 12, 2003, 12 pages.
Office Action issued in related U.S. Appl. No. 10/441,534, mailed Jun. 6, 2007, 9 pages.
Office Action issued in related U.S. Appl. No. 10/649,397, mailed Jan. 10, 2008, 5 pages.
Office Action issued in related U.S. Appl. No. 10/650,389, mailed Oct. 3, 2007, 13 pages.
Office Action issued in related U.S. Appl. No. 10/650,596, mailed Dec. 19, 2007, 10 pages.
Office Action issued in related U.S. Appl. No. 10/702,568, mailed Oct. 3, 2007, 13 pages.
Office Action issued in related U.S. Pat. No. 7,181,427, mailed Jan. 19, 2000, 14 pages.
Final Office Action issued in related U.S. Pat. No. 7,181,427, mailed Dec. 20, 2000, 12 pages.
Office Action issued in related U.S. Pat. No. 7,181,427, mailed Jun. 6, 2001, 10 pages.
Office Action issued in related U.S. Pat. No. 7,181,427, mailed Dec. 21, 2001, 12 pages.

(56) References Cited

OTHER PUBLICATIONS

Office Action issued in related U.S. Pat. No. 7,181,427, mailed Sep. 25, 2002, 9 pages.
Office Action issued in related U.S. Pat. No. 7,181,427, mailed Mar. 19, 2003, 12 pages.
Final Office Action issued in related U.S. Pat. No. 7,181,427, mailed Feb. 1, 2005, 8 pages.
Office Action issued in related U.S. Pat. No. 7,181,427, mailed Aug. 1, 2005, 6 pages.
Notice of Allowance issued in related U.S. Pat. No. 7,181,427, mailed Nov. 15, 2006, 7 pages.
Office Action issued in related U.S. Appl. No. 09/247,222, mailed Jan. 28, 2000, 10 pages.
Office Action issued in related U.S. Appl. No. 09/247,222, mailed Apr. 21, 2000, 10 pages.
Notice of Allowance issued in related U.S. Appl. No. 09/247,222, mailed Aug. 2, 2000, 6 pages.
Office Action issued in related U.S. Appl. No. 09/247,222, mailed Sep. 8, 2006, 7 pages.
Final Office Action issued in related U.S. Appl. No. 09/247,222, mailed Jun. 5, 2007, 8 pages.
Office Action issued in related U.S. Appl. No. 09/247,222, mailed Feb. 25, 2008, 9 pages.
Office Action issued in related U.S. Pat. No. 6,208,979, mailed Apr. 21, 2000, 13 pages.
Notice of Allowance issued in related U.S. Pat. No. 6,208,979, mailed Aug. 14, 2000, 7 pages.
International Preliminary Report on Patentability, Chapter II, for corresponding PCT Application No. PCT/US2004/025866, completed Jun. 27, 2005, 16 pages.
International Search Report for corresponding PCT Application No. PCT/US2004/025866, mailed Feb. 18, 2005, 1 page.
Written Opinion for corresponding PCT Application No. PCT/US2004/025866, mailed Feb. 18, 2005, 3 pages.
Final Office Action issued in related U.S. Appl. No. 10/702,568, mailed May 28, 2007, 10 pages.
Final Office Action issued in U.S. Appl. No. 10/650,389, mailed Jul. 25, 2008, 9 pages.
Final Office Action issued in U.S. Appl. No. 10/650,596, mailed Jul. 25, 2008, 11 pages.
"Car Loans in Minutes," Bank Management, Bank Administration Institute, vol. 69, No. 4, Apr. 1993, p. A23.
"Atlanta-Based Coin Banking Systems Signs Alliance With NCR for Credit Authorization Solution," Business Wire, Business Wire, Inc., Apr. 3, 1991, 2 pages.
Atkinson, "Columbia Firm Helps Banks Ring up Loans on Telephone," Baltimore Business Journal, Baltimore Business Publications, Inc., vol. 6, No. 19, Sec. 2, Oct. 17, 1988, p. 7B.
Tyson, "Interlinq Mortgage Software Hits Big Time with Prudential Real Estate Subsidiary Deal," American Banker, Nov. 18, 1987, p. 12.
Day, "Cutting Corners at the Kiosk: New Services Widen Use of Electronic Devices," The Washington Post, Jul. 22, 1994, p. A1.
Kantrow, "National Electronic Network Will Link Car Dealers to Many Lenders," American Banker Weekly Review, Feb. 8, 1988, pp. 5 and 10.

McCall, "Microsoft, Banks Team up to Provide Home Banking," Associated Press, Aug. 3, 1994, 4 pages.
Sugawara, "Stocking up at the ATM: Citibank Machines to Allow Customers to Trade Shares," The Washington, Post, Oct. 6, 1994, p. D11.
Fix, "Shopping list: Car loan, canned corn," USA Today, Jul. 20, 1994, p. 6B.
Eckerson, "Network Automates Auto Loan Application Process; Speeds Loan Oks, Helps Buyers Find Best Rates," Network World, Network World, Inc., Mar. 6, 1989, p. 2.
Office Action issued in U.S. Appl. No. 11/648,943, mailed Dec. 23, 2008, 15 pages.
Examination Report issued in European Patent Application No. 99958841.1, mailed Nov. 20, 2006, 5 pages.
Office Action issued in U.S. Appl. No. 10/649,397, mailed Feb. 27, 2009, 10 pages.
Final Office Action issued in U.S. Appl. No. 10/441,534, mailed May 13, 2009, 9 pages.
Final Office Action issued in U.S. Appl. No. 10/650,596, mailed Jul. 8, 2009, 13 pages.
Order Ruling on Claim Construction Arguments, United States District Court for the Central District of California, *DealerTrack, Inc.* v. *David L. Huber, Finance Express, LLC, and John Doe Dealers; and DealerTrack, Inc.* v. *RouteOne LLC, David L. Huber, and Finance Express, LLC*, Case No. CV 06-2335 AG (FMOx), Sep. 27, 2008, 31 pages.
Order Granting Motion for Summary Judgment for Invalidity of '427 Patent, United States District Court for the Central District of California, *DealerTrack, Inc.* v. *David L. Huber, Finance Express, LLC, and John Doe Dealers*, Case No. CV 06-2335 AG (FMOx), Jul. 7, 2009, 7 pages.
Final Office Action issued in U.S. Appl. No. 10/649,397, mailed Oct. 30, 2009, 6 pages.
Final Office Action issued in U.S. Appl. No. 10/650,596, mailed Apr. 15, 2010, 10 pages.
Notice of Allowance issued in U.S. Appl. No. 10/441,534, mailed Dec. 3, 2009, 6 pages.
Notice of Allowance issued in U.S. Appl. No. 10/441,534, mailed Apr. 29, 2010, 6 pages.
Office Action issued in U.S. Appl. No. 10/650,381, mailed Aug. 18, 2009, 9 pages.
Notice of Allowance issued in U.S. Appl. No. 10/650,389, mailed Feb. 8, 2010, 9 pages.
Office Action issued in U.S. Appl. No. 10/649,397, mailed Jun. 10, 2010, 5 pages.
Notice of Allowance issued in U.S. Appl. No. 10/650,389, mailed Jun. 18, 2010, 9 pages.
Haverson "A Man with Grand Visions," Banking Technology, vol. 10, part 4, May 1993, pp. 30-32.
Jost "Neural Networks: A logical progression in credit and marketing decision systems," Credit World, International Credit Association, vol. 81, part 4, Mar./Apr. 1993, p. 26-33.
Tauhert "Commerce Branches off into PC Banking," Bank Systems and Technology, Miller Freeman, vol. 33, No. 4, Apr. 1996, p. 34-35.
"Interactive Banking Gets a Push up North," Bank Systems and Technology, Mill Freeman, Inc., vol. 31, part 3, Mar. 1994, p. 6.

\* cited by examiner

Figure 1 - Application Status Detail Screen - Approved/Counter-offered Applications Figure 2 – Application Status Detail – Ineligible Approved Application Figure 3 – Pending Application Status Detail Screen Figure 4 - Approved Application Status Detail Screen Figure 5 - Credit Bureau Summary

Credit Bureau Results

Applicant Information
John Banks
335 Madison Avenue
Garden City, NY 11530
SS#: 453-22-1195

Co-Applicant Information
Sharon Banks
335 Madison Avenue
Garden City, NY 11530
SS#: 477-22-1212

To view your applicant(s) credit report, click on the respective score.

| | Credit Bureau | Applicant | Co-Applicant | Combined |
|---|---|---|---|---|
| ○ | Equifax | 710 | 710 | 710/710 |
| ○ | Experian | 700 | 690 | 700/690 |
| ○ | TransUnion | 700 | Incomplete | Incomplete |
| ○ | Update Application / e-Contract with customer data only. | | | |

Request Alternate Bureau | Prefill Application / E-Contract

Figure 6 - Submit Application/eContract Screen

Submit An Application / eContract

Select a Vehicle

O New      O Used      O Demo

Select a Product Type:

O Retail      O Lease      O Balloon

Do You Have a Trade-In?:

O Yes      ⊙ No

Request Application or e-Contract:

O Application      O e-Contract

| Individual | Joint | | Business | Business With Co-Applicant |

If the applicant is married and lives in a community property state (Arizona, California, Idaho, Louisiana, Nevada, New Mexico, Texas, Washington, Wisconsin), you should also provide the personal credit information of the applicant's spouse in the co-applicant section. The applicant's spouse is not required to be a co-applicant for the credit requested unless he-she wishes to be a co-applicant.

Buyer / Co-Buyer Information

| Buyer First Name * | MI | Last Name * | Suffix (Jr./Sr./etc.) | | |
|---|---|---|---|---|---|
| John | | Banks | | | |

| Street # * | Street Name | * | Type * | Apt./Suite # | P.O. Box # | Rural Route |
|---|---|---|---|---|---|---|
| 335 | Madison | | AVENUE | | | |

| City * | State * | Zip * | Home Phone # * | | |
|---|---|---|---|---|---|
| Garden City | NY | 11530 | 518 | 555 | 1212 |

| Co-Buyer First Name * | MI | Last Name * | Suffix (Jr./Sr./etc.) |
|---|---|---|---|
| Sharon | | Banks | |

| Street # * | Street Name | * | Type * | Apt./Suite # | P.O. Box # | Rural Route |
|---|---|---|---|---|---|---|
| 335 | Madison | | AVENUE | | | |

| City * | State * | Zip * | Home Phone # * | | |
|---|---|---|---|---|---|
| Garden City | NY | 11530 | 518 | 555 | 1212 |

Lender requires any Buyer that is not going to be listed as an owner on the vehicle's title to sign a Co-signor Notice. Are both individuals on the retail contract listed as owners of the vehicle on the title?  ○ Yes   ○ No Buyer Not Listed   ○ No Co-Buyer Not Listed

Figure 7A

Vehicle Information

| N/U/O * | Year * | Make * | Model * | Trim |
|---|---|---|---|---|
| New | 2003 | Nissan | Maxima | Select |

| Other (If not listed above) | Year | Make | Model | Trim |
|---|---|---|---|---|
| | | | | |

| VIN # * | Mileage | MSRP * |
|---|---|---|
| VWWWD999688774 | 20 | $ 34,500 |

Primary Use For Which Vehicle Purchased:   ● Personal   ○ Agricultural   ○ Business Trade In:

| Year | Make | Model | Gross Allowance | Amount Owing | Net Trade |
|---|---|---|---|---|---|
| Other | Other | Other | $ 4,000.00 | $ 1,000.00 | $ 3,000.00 |

Other (if not above)

| 1994 | Honda | Civic |
|---|---|---|

Figure 7B

Financing Information

| | | | |
|---|---|---|---|
| Note Date: Jan 31 2003 | First Payment Date: * [Month] [Date] [Year] | | |
| Product: Retail | Term: * 48 | Customer Rate: * 7.74 % | |

| Cash Price (including sales tax of $ 1500.00, any accessories, their installation, and taxes) | 34,500.00 (1) |
|---|---|
| Down Payment | |
| Cash Down Payment | $ 2,700.00 |
| Net Trade-In (Description Above) | $ 3,000.00 |
| Total Down Payment | $ 5,700.00 (2) |
| Unpaid Balance of Cash Price (1 minus 2) | $ 28,800.00 (3) |
| Amounts Paid to Others on Customer's Behalf | |
| (a) To Public Officials | |
|    (i) License, title & registration fees | $ 200.00 |
|    (ii) Filing fees | $ |
|    (iii) Taxes (not in cash price above) | $ |
| (b) To Insurance Companies for | |
|    (i) Vendor's Single Interest Insurance | $ N/A |
|    (ii) Credit Life Insurance | $ |
|    (iii) Credit Disability Insurance | $ |
|    (iv) Other Insurance | $ N/A |
| (c) Other Charges | |

| To | For Optional | |
|---|---|---|
| [Default 1] | Warranty | $ 1,000.00 |
| To | For Optional | |
| [Default 1] | Service Contract | $ |
| To | For Optional | |
| [Default 1] | Gap | $ |
| To | For | |
| | Prior Lease / Loan Balance | $ |
| To | For | |
| | | $ |
| To | For | |
| | | $ |

| Total Amounts Paid to Others on Customer's Behalf (a plus b plus c) | $ 1,000.00 (4) |
|---|---|
| Amount Financed (3 plus 4) | $ 38,000.00 (5) |

Figure 7C

Warranty Credit Insurance

Warranty:      Name of Warranty Company      Warranty Amount
                 Acme Warranty Company          $1,000.00

Credit Insurance:      ☐ Life    ( ○ Buyer   ○ Joint)

(Check box if applicable)    At a premium of $_____ for a term of [____]
                       Name of Insurer
                       [_____]

☐ Disability, Accident and Health   ( ○ Buyer   ○ Joint)
                       At a premium of $_____ for a term of [____]
                       Name of Insurer
                       [_____]

☐ Other
                       At a premium of $_____ for a term of [____]
                       Name of Insurer
                       [_____]

Comments To Funding Analyst

Proof of income will be faxed.

[ Save ] [ Cancel ] [ Reset ]      [ Submit To Lender For Verification ]

FOR DEALER USE ONLY

Figure 7D

Figure 8 - Successful Submission Message – Data Verification

Figure 9 - eReview Contract Status

| Customer Information | |
|---|---|
| Applicant Name: | Wilson, Vincent |
| CoApplicant Name: | Wilson, Marie |
| Reference Number: | 0006612465730 |
| Status: | eReview |

| Vehicle Information | |
|---|---|
| N/U/D-Year: | New 2001 |
| Make: | Ford |
| Model/Trim: | Explorer |
| Vin #: | VWWD86966877744 |

| Financing Information | |
|---|---|
| Product: | Retail |
| Term: | 48 |
| Amt Financed: | $30,000.00 |
| Amt Disbursed: | $30,250.00 |
| Customer Rate: | 7.74% |
| Buy Rate: | 7.74% |
| Dealer Bonus: | $250.00 |
| Fees: | $.00 |
| Gap: | $.00 |
| Warranty: | $1,000.00 |
| First Pay Deduct: | $.00 |
| Dealer Subvention: | $.00 |
| Booking Date/Time: | 07/25/2002 01:57PM |

Comments To Funding Group:
Proof of income will be faxed.

Reasons for eReview:
* VIN Error
* Buyer Address Different From Approval.

You may contact Chase at the number below with any additional questions.

| AFC-d Information | | | |
|---|---|---|---|
| Name: | Flip Wilson | Fax Number: | (516)745-3744 |
| Phone Number: | (800)456-3758 ext.3347 | Lender Customer Service#: | (800)223-5050 |

Figure 10 - eLender Verified/eDT Verified Contract Status

| Rec Date | Reference # | Applicant | Lender | Product | Status | Booked Date/Time |
|---|---|---|---|---|---|---|
| 07/31/2002 | | Banks, John | Spot Delivery | Retail | e-DTVerified | |
| 02/25/2002 | 001234567890 | CabinPath Network | Chase | Retail | e-LenderVerified | |
| 02/25/2002 | 000691245230 | Wilson, Vincent | Chase | Retail | e-LenderVerified | |
| 01/10/2002 | 91234454547 | McNamara, Julie | Wells Fargo | Retail | e-LenderVerified | |
| 01/09/2002 | 000694578412 | Bookstore, James | Chase | Retail | Booked | 01/19/2002 09:28AM |
| 01/09/2002 | 000697454747 | Thompson, Patricia | Chase | Retail | e-Funded | 01/09/2002 01:56PM |
| 01/09/2002 | 000687974741 | Glennon, John | Chase | Retail | e-Funded | 01/09/2002 01:56PM |
| 01/09/2002 | 69765432101 | Esposito, James | Wells Fargo Accept | Lease | Funded | 01/12/2002 01:54PM |
| 12/22/2001 | 000745974587 | Carter, Claudine | Chase | Retail | Pending | |
| 12/21/2001 | 000645554000 | Sulti, Maria | Chase | Retail | Pending | |
| 12/21/2001 | 123458745474 | Coles, Anna | AmeriCredit | Retail | Booked | 12/27/2001 01:56PM |
| 12/20/2001 | 000754132144 | Samuels, Tony | Chase | Retail | Booked | 12/28/2001 01:30PM |

Printable Format    Download To Spreadsheet

Financing Information

| Note Date: Jan 31 2003 | First Payment Date: * Month | Date | Year |
|---|---|---|---|
| Product: Retail | Term: * | Customer Rate: * | % |

Contract Rate:

| Monthly Payment $ | Finance Charge $ | Total of Payments: $ |
|---|---|---|

| Cash Price (including sales tax of $ 1500.00, any accessories, their installation, and taxes) | 34,500.00 (1) |
|---|---|

Down Payment

| Cash Down Payment | $ | |
|---|---|---|
| Net Trade-In (Description Above) | $ | |
| Total Down Payment | $ | 5,700.00 (2) |
| Unpaid Balance of Cash Price (1 minus 2) | $ | 200.00 |

Amounts Paid to Others on Customer's Behalf (a) To Public Officials

| (i) License, title & registration fees | $ | 200.00 |
|---|---|---|
| (ii) Filing fees | $ | |
| (iii) Taxes (not in cash price above) | $ | |

(b) To Insurance Companies for

| (i) Vendor's Single Interest Insurance | $ | |
|---|---|---|
| (ii) Credit Life Insurance | $ | |
| (iii) Credit Disability Insurance | $ | |
| (iv) Other Insurance | $ | |

(c) Other Charges

| To | For Optional | |
|---|---|---|
| Acme Warranty Company | Warranty | $ 1,000.00 |
| To | For Optional | |
| | Service Contract | $ |
| To | For Optional | |
| | Gap | $ |
| | For | |
| | Prior Lease / Loan Balance | $ |
| | For | |
| | | $ |
| | For | |
| | | $ |

| Total Amount Paid to Others on Customer's Behalf (a plus b plus c) | $ | 1,000.00 (4) |
|---|---|---|
| Amount Financed (3 plus 4) | $ | 38,000.00 (5) |

Figure 11C

| Warranty Credit Insurance | | | |
|---|---|---|---|
| Warranty: | Name of Warranty Company<br>Acme Warranty Company | | Warranty Amount<br>$1,000.00 |

| GAP Protection | Provider | Term | Cost |
|---|---|---|---|
| | | | $ |

Credit Insurance: ☐ Life ( ○ Buyer ○ Joint)

(Check box if applicable) At a premium of $ _____ for a term of _____

Name of Insurer

☐ Disability, Accident and Health ( ○ Buyer ○ Joint)

At a premium of $ _____ for a term of _____

Name of Insurer

☐ Other

At a premium of $ _____ for a term of _____

Name of Insurer

| Save | Cancel | Reset |
|---|---|---|

You have selected to Spot Deliver this deal. A lender will not verify this contract data prior to you obtaining customer signatures. Press "Continue" to proceed.

Continue

FOR DEALER USE ONLY

Figure 11D

Figure 12 - Contract Status Detail Page – Lender Verified Data

Any Lender Contract Status
This Lender supports same day funding if all Contract data, including additional faxed documentation, is in house by 4:00 p.m. local time Monday thru Friday. If received after this time, funds will be remitted the following business day.

Customer Information

| | |
|---|---|
| Applicant Name: | Wilson, Vincent |
| CoApplicant Name: | Wilson, Maria |
| Reference Number: | 0006812452230 |
| Status: | 6 - LENDER VERIFIED |

Vehicle Information

| | |
|---|---|
| N/U/D-Year: | New 2001 |
| Make: | Ford |
| Model/Trim: | Explorer |
| Vin #: | VWWVC999888777444 |

Financing Information

| | |
|---|---|
| Product: | Retail |
| Term: | 48 |
| Amt Financed: | $30,000.00 |
| Amt Disbursed: | $30,250.00 |
| Customer Rate: | 7.74% |
| Buy Rate: | 7.74% |
| Dealer Bonus: | $250.00 |
| Fees: | $.00 |
| Gap: | $.00 |
| Warranty: | $1,000.00 |
| First Pay Deduct: | $.00 |
| Dealer Subvention: | $.00 |
| Booking Date/Time: | |

Comments To Funding Analyst

Proof of income will be faxed.

Analyst Information

| Name: | Flip Wilson | Fax Number: | (516)745-3244 |
|---|---|---|---|
| Phone Number: | (800)458-3755 ext.3947 | Lender Customer Service#: | (800)223-5050 |

"Print Review Copy" of the contract for the buyer.
Please close the viewing window to continue.

[ Print Review Copy ]

[ Cancel ] [ Modify ]

Back to Contract Summary

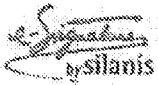
Figure 13 - AWS Web Overview Page

Figure 14 - Signature Page

To obtain signatures, click on the first signature box for each individual. You may save signatures only after obtaining all required signatures for each individual.

| Buyer Signatures | Co-Buyer Signatures |
|---|---|
| Credit Insurance | Credit Insurance |
| I, Vincent Wilson, as the Buyer, HAVE READ the disclosure relating to Credit Insurance and AGREE to purchase Credit Insurance as identified in this Retail Installment Contract # 000691245230. | I, Marie Wilson, as the Co-Buyer, HAVE READ the disclosures relating to Credit Insurance and AGREE to purchase Credit Insurance as identified in this Retail Installment Contract # 000361245230. |
| Contract Terms and Conditions | Contract Terms and Conditions |
| I, Vincent Wilson, as the Buyer, HAVE READ and AGREE TO BE BOUND by the Terms and Conditions of this Retail Installment Contract # 000691245230. | I, Marie Wilson, as the Co-Buyer, HAVE READ and AGREE TO BE BOUND by the Terms and Conditions of this Retail Installment Contract # 000691245230. |
|  | Cosginor Notice |
|  | I, Marie Wilson, as the Co-Buyer, HAVE READ and ACKNOWLEDGE the Notice to Co-Signor # 000691245230. |

Dealer Signatures

DEALER ACCEPTS CONTRACT.
I, as a designated Dealer Official, ACCEPT and AGREE to the terms of this Retail Installment Contract # 000691245230.

Title: _____

This allows you to save the signatures you have obtained and return to complete the contract later.
[ Save ]

[ Cancel ]     [ Modify ]

Back to Contract Details

Figure 15 - Error Message if Signatures have not been Save
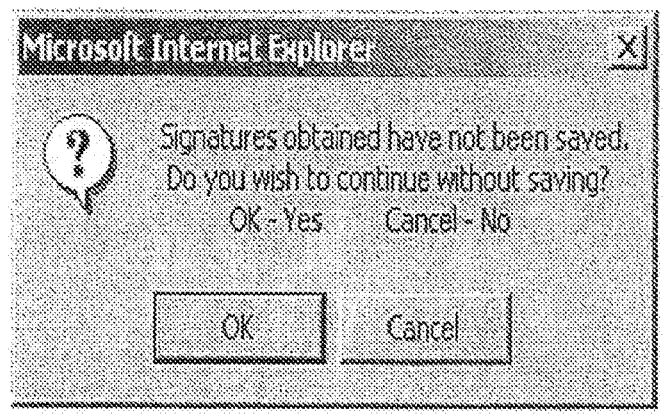

Figure 16 - Contract Status Details Page (Lender Verified Data) -
No Signatures Obtained

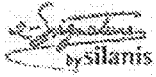
Figure 17 - AWS Overview Page – ALL Customer Signatures Obtained

Figure 18 – Refresh – Contract Status Detail ePartially Signed

Chase supports same day funding if all Contract data, including additional faxed documentation, is in house by 4:00 p.m. local time Monday thru Friday. If received after this time, funds will be remitted the following business day.

Your signatures are being processed. Please 'Refresh' the screen.  [Refresh]

| Customer Information | |
|---|---|
| Applicant Name: | Wilson, Vincent |
| CoApplicant Name: | Wilson, Marie |
| Reference Number: | 000691245238 |
| Status: | ePartially Signed |

| Vehicle Information | |
|---|---|
| N/U/D-Year: | New 2001 |
| Make: | Ford |
| Model/Trim: | Explorer |
| Vin #: | WWWD998888777444 |

| Financing Information | |
|---|---|
| Product: | Retail |
| Term: | 48 |
| Amt Financed: | $30,000.00 |
| Amt Disbursed: | $30,250.00 |
| Customer Rate: | 7.74% |
| Buy Rate: | 7.74% |
| Dealer Bonus: | $250.00 |
| Fees: | $.00 |
| Gap: | $.00 |
| Warranty: | $1,000.00 |
| First Pay Deduct: | $.00 |
| Dealer Subvention: | $.00 |
| Booking Date/Time: | |

Comments To Funding Analyst
Proof of income will be faxed.

| Analyst Information | | | |
|---|---|---|---|
| Name: | Flip Wilson | Fax Number: | (518)745-3244 |
| Phone Number: | (900)458-3756 ext.3847 | Lender Customer Service#: | (800)223-6050 |

[Comments To Funding Analyst]

[Print Review Copy]

Back to Contract Summary

Figure 19 – Printing a Partially Signed eContract

Chase supports same day funding if all Contract data, including additional faxed documentation, is in house by 4:00 p.m. local time Monday thru Friday. If received after this time, funds will be remitted the following business day.

Customer Information

| | |
|---|---|
| Applicant Name: | Wilson, Vincent |
| CoApplicant Name: | Wilson, Marie |
| Reference Number: | 000691745230 |
| Status: | Partially Signed |

Vehicle Information

| | |
|---|---|
| N/U/D-Year: | New 2001 |
| Make: | Ford |
| Model/Trim: | Explorer |
| Vin #: | WWWD999998777444 |

Financing Information

| | |
|---|---|
| Product: | Retail |
| Term: | 48 |
| Amt Financed: | $30,000.00 |
| Amt Disbursed: | $30,250.00 |
| Customer Rate: | 7.74% |
| Buy Rate: | 7.74% |
| Dealer Bonus: | $250.00 |
| Fees: | $.00 |
| Gap: | $.00 |
| Warranty: | $1,000.00 |
| First Pay Deduct: | $.00 |
| Dealer Subvention: | $.00 |
| Booking Date/Time: | |

Comments To Funding Analyst

Proof of income will be faxed.

Analyst Information

| Name: | Flip Wilson | Fax Number: | (516)745-3244 |
|---|---|---|---|
| Phone Number: | (800)456-3758 ext.3947 | Lender Customer Service#: | (800)723-5050 |

| Optional: Click below to View & Print Copy of contract with buyer(s) signatures. | Dealer signatures are required. Please select 'Continue' to proceed. |
|---|---|
| View & Print Copy | Continue |

Cancel    Modify

Back to Contract Summary

Figure 20 - ALL signatures have been captured (including dealers')

Figure 21 – Contract Status Detail – Refresh eSigned Status

Chase supports same day funding if all Contract data, including additional faxed documentation, is in house by 4:00 p.m. local time Monday thru Friday. If received after this time, funds will be remitted the following business day.

Your signatures are being processed. Please 'Refresh' the screen. [ Refresh ]

Customer Information

| | |
|---|---|
| Applicant Name: | Wilson, Vincent |
| CoApplicant Name: | Wilson, Marie |
| Reference Number: | 000691245230 |
| Status: | e-Signed |

Vehicle Information

| | |
|---|---|
| N/U/O-Year: | New 2001 |
| Make: | Ford |
| Model/Trim: | Explorer |
| Vin #: | WWWD999888777444 |

Financing Information

| | |
|---|---|
| Product: | Retail |
| Term: | 48 |
| Amt Financed: | $30,000.00 |
| Amt Disbursed: | $30,250.00 |
| Customer Rate: | 7.74% |
| Buy Rate: | 7.74% |
| Dealer Bonus: | $250.00 |
| Fees: | $.00 |
| Gap: | $.00 |
| Warranty: | $1,000.00 |
| First Pay Deduct: | $.00 |
| Dealer Subvention: | $.00 |
| Booking Date/Time: | |

Comments To Funding Analyst

Proof of income will be faxed.

Analyst Information

| | | | |
|---|---|---|---|
| Name: | Flip Wilson | Fax Number: | (518)745-3244 |
| Phone Number: | (800)458-3756 ext.3947 | Lender Customer Service#: | (800)223-5050 |

[ Comments To Funding Analyst ]

[ Print Review Copy ]

Back to Contract Summary

Figure 22 - Contract Status Detail - eSigned Status w/Print & Submit

Figure 23 - Contract Status Detail - After Print Final Copies AND Previous Credit Submittal - Spot Delivery

Spot Delivery Contract Status

| Customer Information | |
|---|---|
| Applicant Name: | Banks, John |
| CoApplicant Name: | Banks, Sharon |
| Reference Number: | |
| Status: | e-Signed |

| Vehicle Information | |
|---|---|
| N/U/D-Year: | New 2003 |
| Make: | Ford |
| Model/Trim: | Explorer |
| Vin #: | WWW0999868777444 |

| Financing Information | |
|---|---|
| Requested Product: | Retail |
| Term: | 48 |
| Amt Requested: | $30,000.00 |
| Customer Rate: | 7.74% |
| Fees: | $.00 |
| Gap: | $.00 |
| Warranty: | $1,000.00 |
| First Pay Deduct: | $.00 |
| Booking Date/Time: | |

| STEP 1 | STEP 2 |
|---|---|
| Print all necessary copies for the buyer(s) and your records. | All signatures have been obtained. Please select the lender(s) that you wish to submit this e-Contract to. |
| Print Signed Copy | Select Lenders |

Cancel  Modify

Back to Contract Summary

Figure 24 - Contract Status Detail - ALL Signatures Obtained - NO CREDIT APPLICATION SUBMITTED Figure 25 - Select Lender(s) Screen - Spot Delivery or Submit to Other Lender -
Only Available if Prior Credit Application Submitted

Select Lenders

| YOU HAVE SELECTED | |
|---|---|
| Vehicle/Product/Credit | New Retail Joint |
| Primary Inforamtion | John Banks |
| Requested Vehicle | 2003 Ford Explorer |
| Term/Cash Cap or Unpaid Bal. | 48 monts/$30,000 |
| Co Applicant Information | Sharon Banks |

This application has been approved by the following e-Contract Lender(s). Please select one lender from this list whom you would like to submit the e-Contract.
Optional: If you would like to submit this customers application to other lenders you may do so below.

Select e-Contract Lender

| Lender | Lender |
|---|---|
| ☑ Any Lender | ☐ AmeriCredit |
| ☐ Capital One | ☐ Chase Manhattan Bank |
| ☐ Wells Fargo | |

| Next Step | Optional |
|---|---|
| Compare Application & Contract | Submit Application To Other Lenders |

Cancel | Modify

Figure 26:
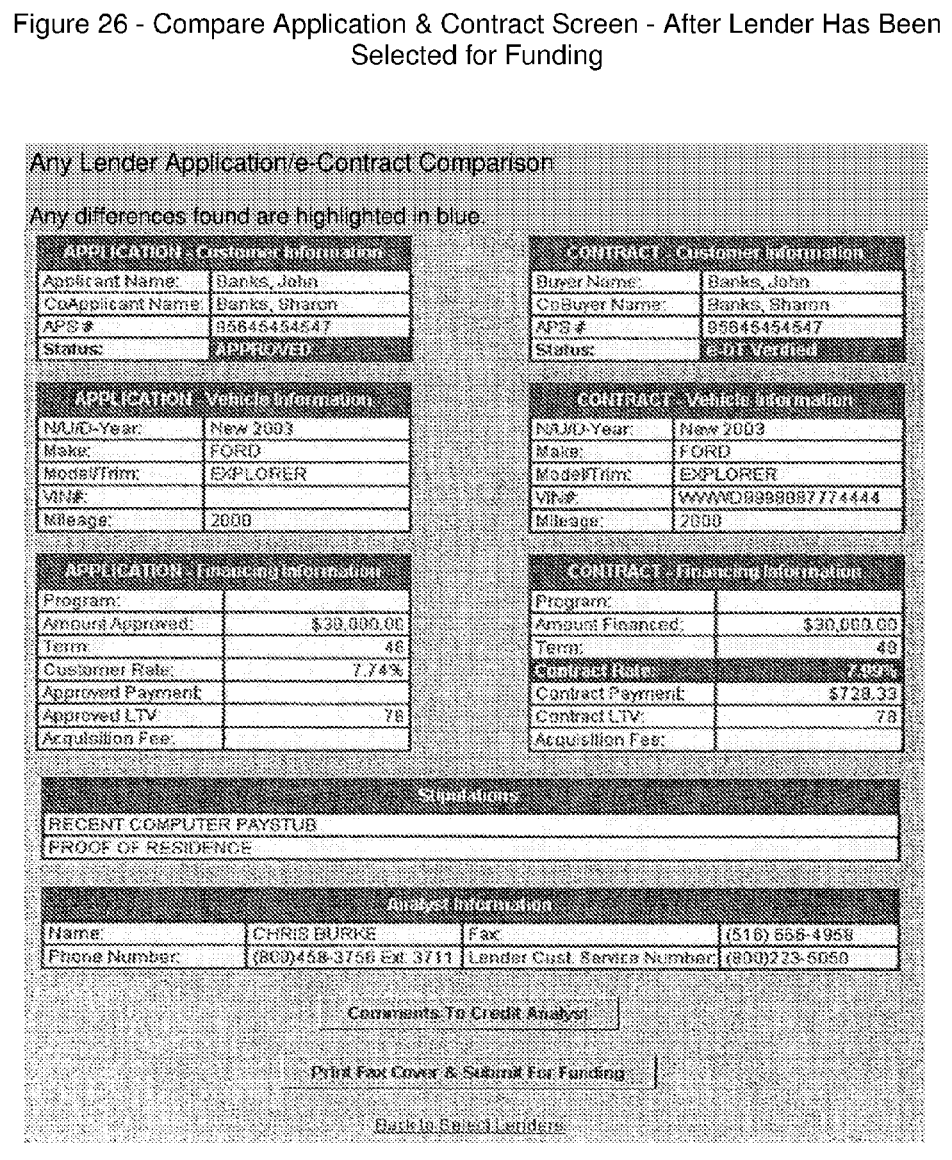

Figure 26 - Compare Application & Contract Screen - After Lender Has Been Selected for Funding Figure 27 - Accessing the eContract via Contract Status

Figure 29

Master eContracting Flow Chart (Verification - Spot Delivery and Bypass Verification Processes)

Definitions:

1) "Standard Edits" - Edits to reside on DealerTrack system that will notify the user of generic errors identified by DealerTrack. Example: Days to first payment must be between 19-51 days.

2) "Upfront Financing Source Edits" - Edits that are included on the DealerTrack system that are created, updated and managed by either; each participating financing source or DealerTrack, on behalf of a financing source. E.G. APR, Monthly Payment Amount, Total of Payments, Finance Charge.

3) "Backend Financing Source Edits" - Edits to reside on the financing sources back-end system that will notify the user of specific errors created by the financing source. Example: Amount financed outside program parameters.

4) "Financing Source Calculations" - The financing source provides their Dealers with the following information upon verification of contract data:
a) APR
b) Payment Calculation
c) Total of Payments
d) Finance Charge 5) "Force" print - The review copy of the eContract is automatically sent to the dealers default printer.

6) "eSignature" - A signature captured using a signature pad or other legally permissible means supplied along with software to the dealer. Authentication of the eSignatures is completed by the DealerTrack system utilizing the appropriate software.

7) "Vault" - secured storage of select electronic documents. DealerTrack acts as custodian. Dealers and Financing Sources have access to their respective eContracts electronic documents stored in the Vault. Permissions for access is allowed using the DealerTrack user administration function.

8) "Ownership Record" - Audit trail/registry of ownership changes from deposit through sale to secondary market.

9) "Bar-Coded Fax Cover Sheet" - Fax cover sheet printed along with contract copies that contains a bar-code identifier, such as; financing source application id#) to assist in matching the eContract residing on the financing source's imaging system to ancillary documentation faxed from dealer. The bar-code cover sheet is created by the DealerTrack system indicating all ancillary documentation required by the financing source based on information provided by the financing source to the system.

10) "Flattened PDF" - DealerTrack creates a read-only copy of the PDF which is a "non-authoritative" copy

Figure 38

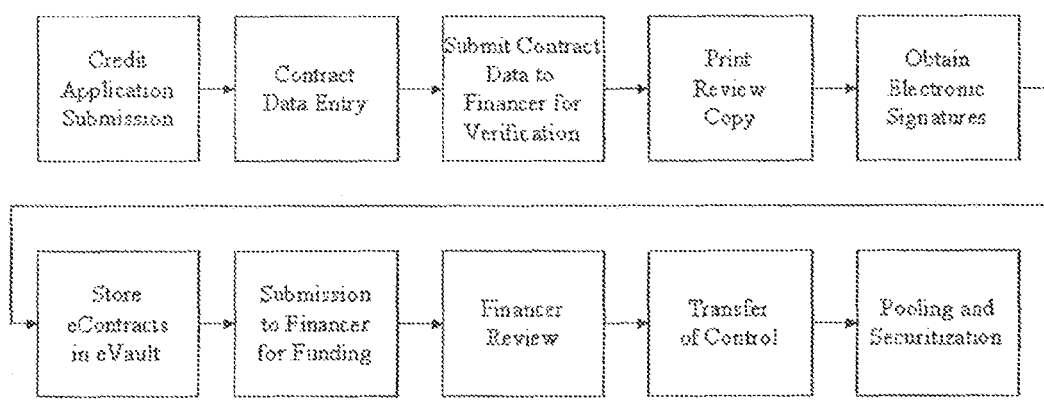
Figure 40 - eContracting Flow Chart

Figure 41:
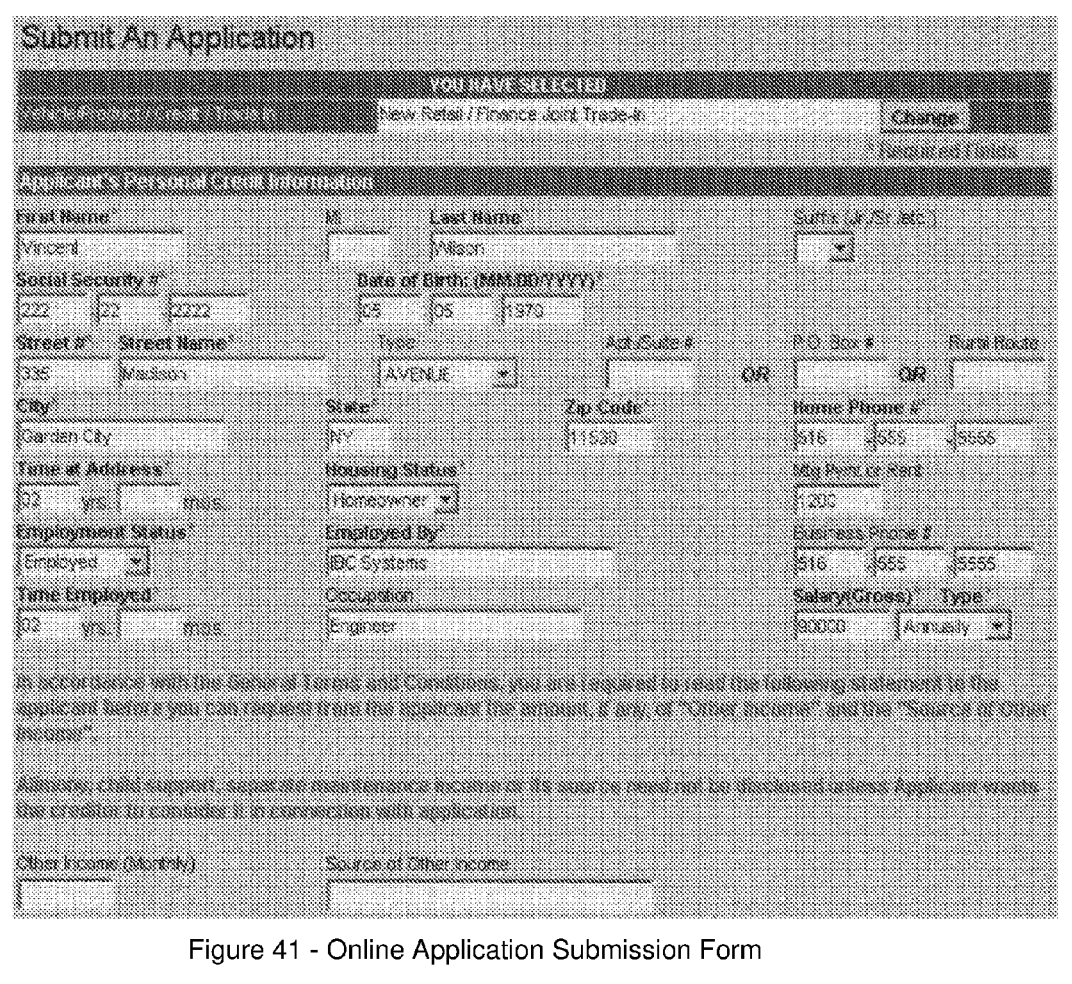

Figure 41 - Online Application Submission Form

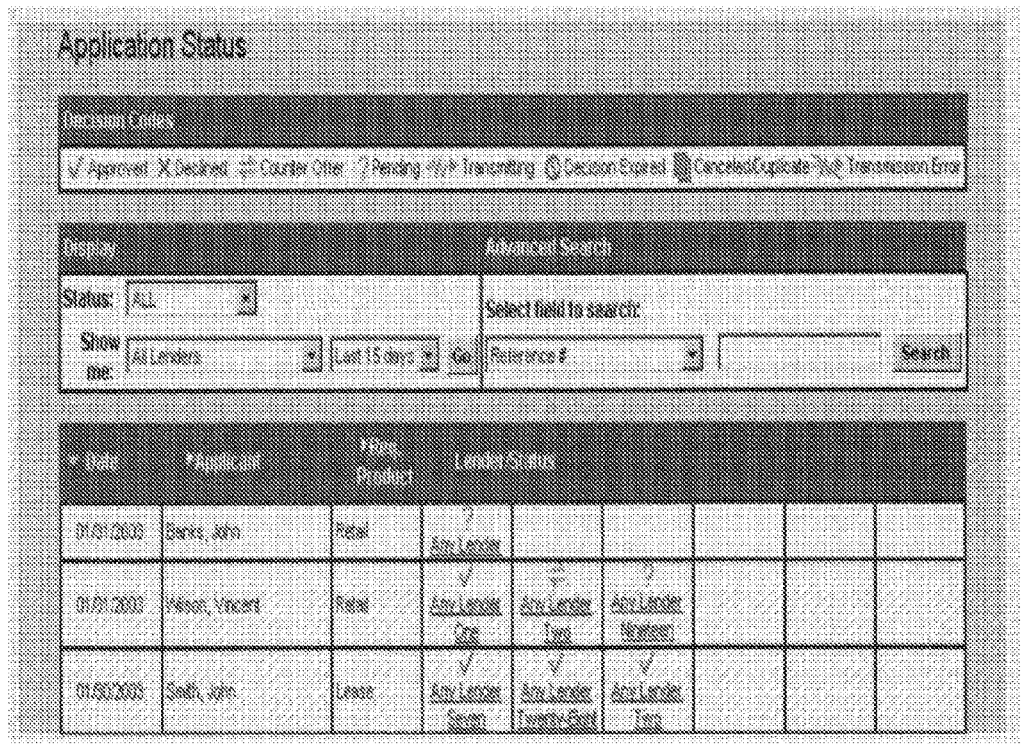
Figure 42 - Application Status Screen

Figure 43:
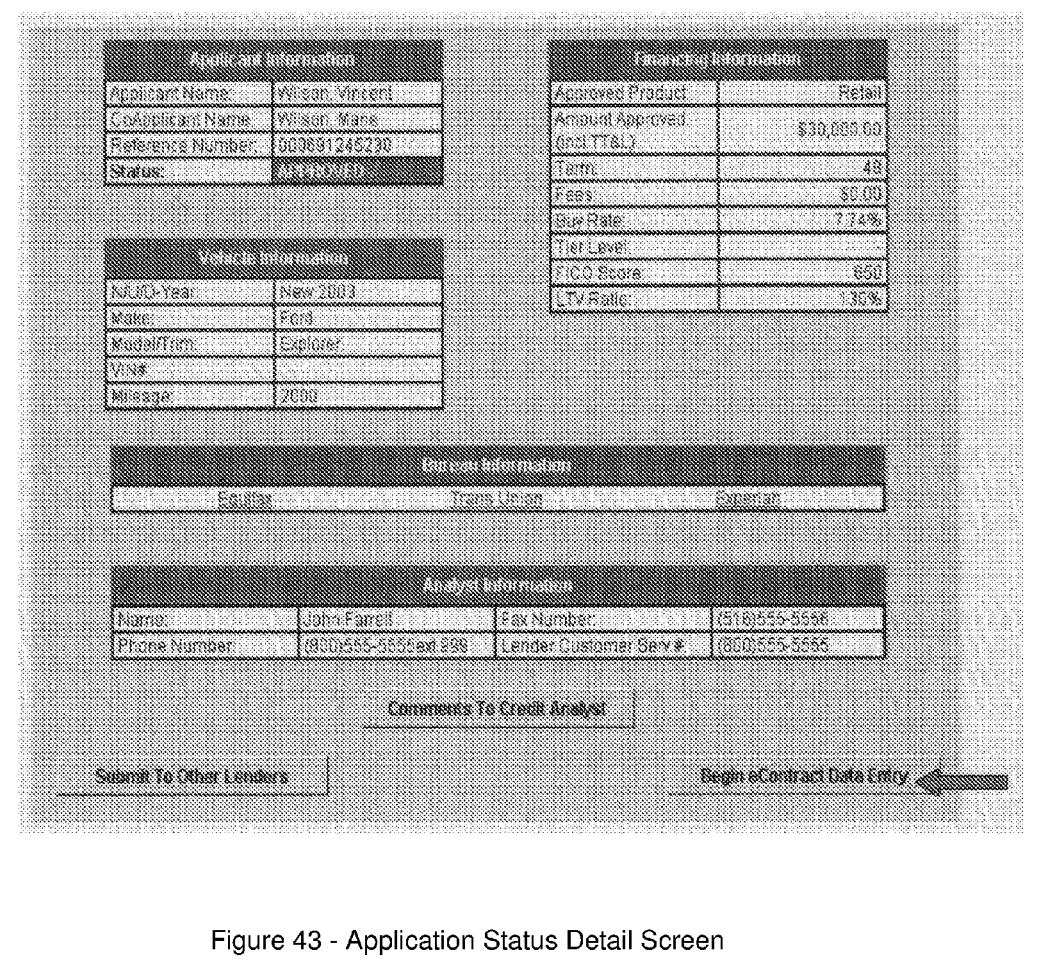

Figure 43 - Application Status Detail Screen

Figure 44:
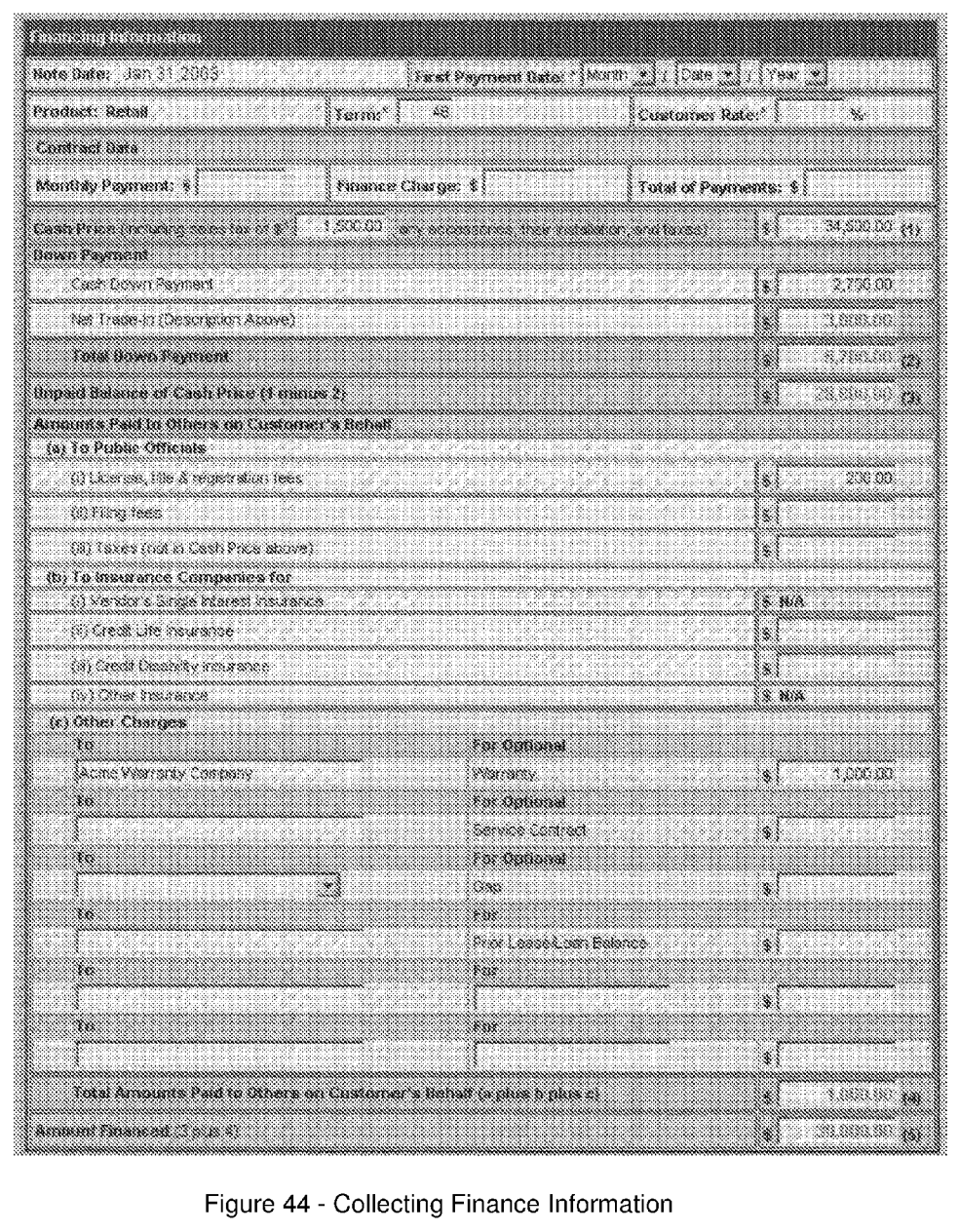

Figure 44 - Collecting Finance Information

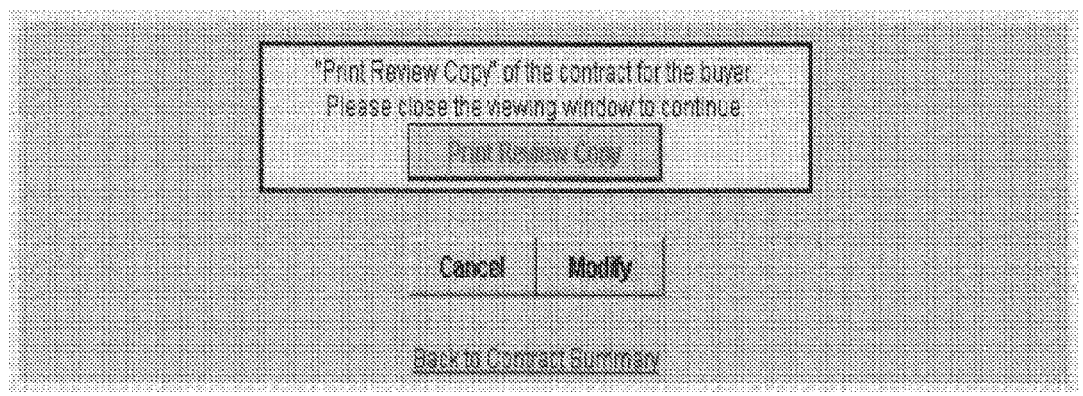
Figure 45 - Print Paper Review Copy

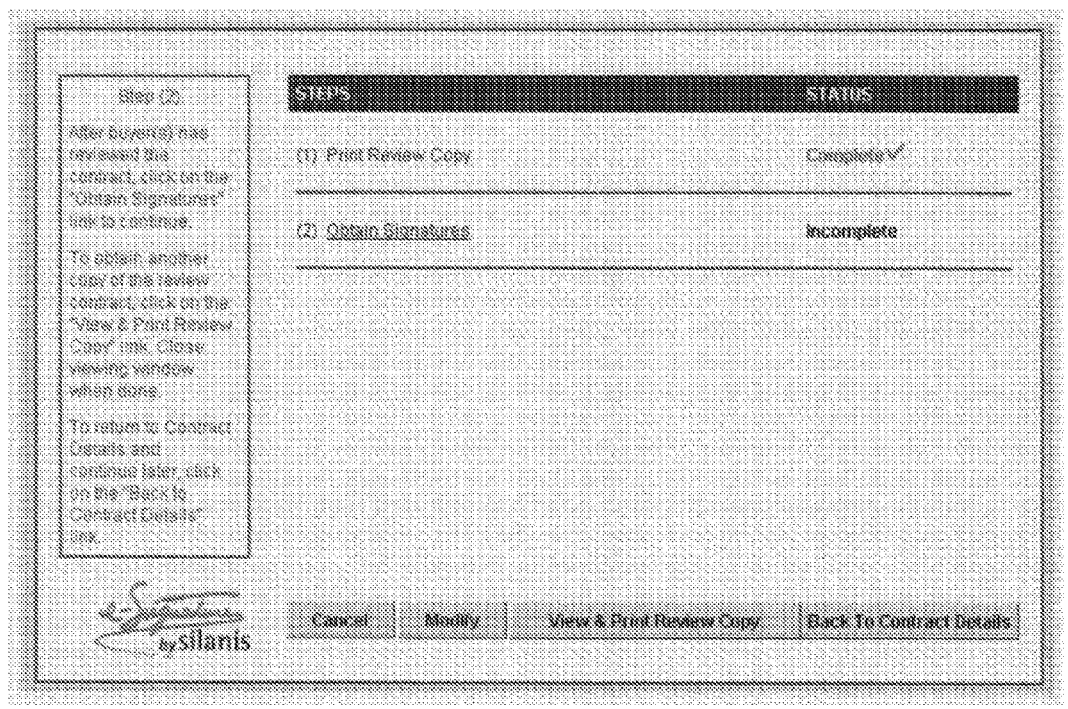
Figure 46 - Print Review Screen

Figure 47 - Signature Capture Screen

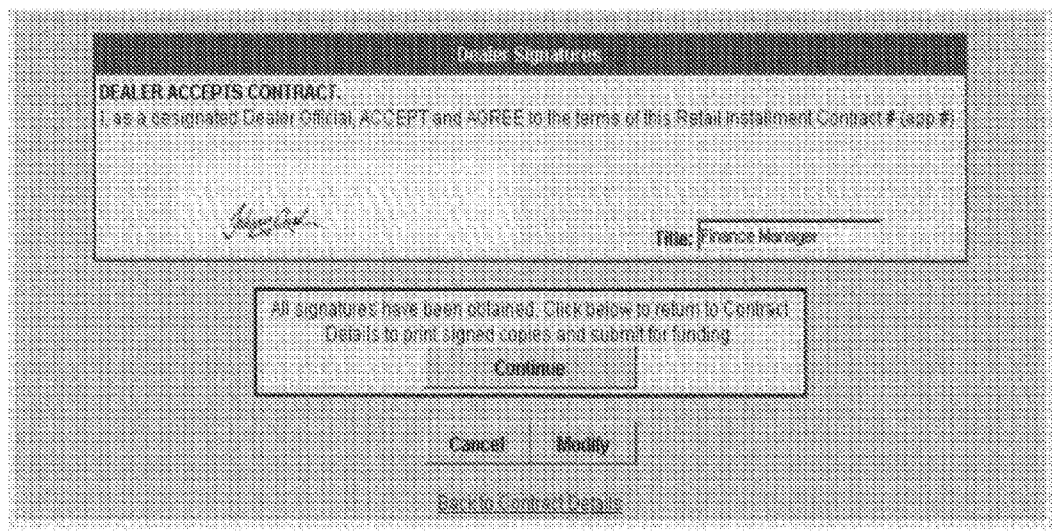
Figure 48 - Fully Executed Signature Capture Screen (Partial View)

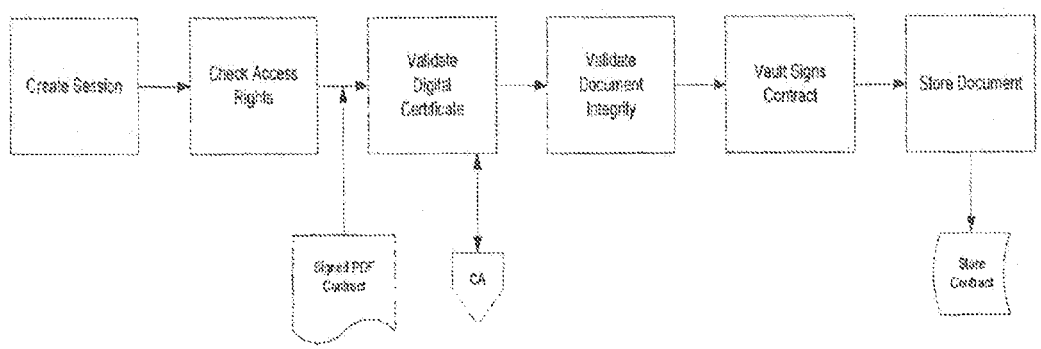
Figure 49 - Storing of Documents in the Vault

| Field Name | Description |
|---|---|
| DealerTrack ID # (application) | Unique DealerTrack ID # associated with the application |
| Lender ID # (application/contract) | Unique Lender ID # associated with the application/contract |
| Borrower Name | First Name, Middle Initial, Last Name of Borrower |
| Co-Borrower Name | First Name, Middle Initial, Last Name of Co-Borrower (if applicable) |
| Transferor Organization Name | Name of selling organization |
| Transferor Organization Address | Address of selling organization |
| Transferee Organization Name | Name of buying organization |
| Transferee Organization Address | Address of buying organization |
| Date | MM/DD/YYYY for each ownership record entry |
| Time | HHMMSS for each ownership record entry |
| Transaction Type | Deposit, Transfer, Export (electronic/paper), Export to Lender, Payoff, Charge-off, Termination |
| User ID | System login id for user who initiated each of the following transactions: Export (electronic/paper), Export to Lender, Payoff, Charge-off, Termination |
| User Name | First Name, Middle Initial, Last Name of user who initiated each of the following transactions: Export (electronic/paper), Export to Lender, Payoff, Charge-off, Termination |

Figure 50 - Ownership Record Fields

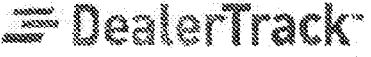
Figure 51 - Bar-coded Fax Cover Sheet

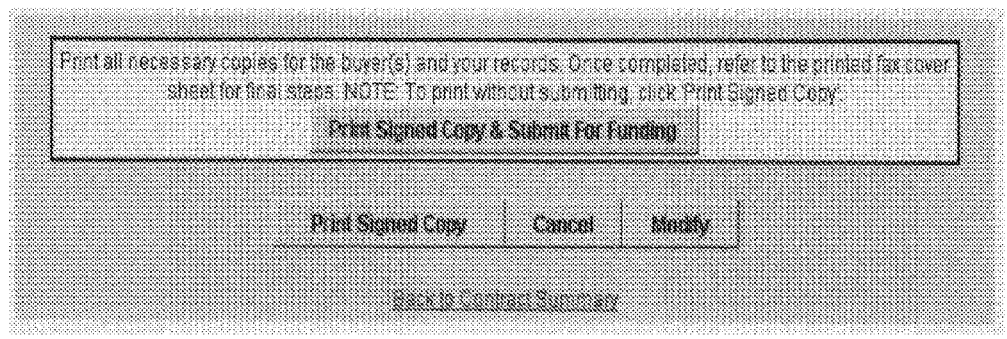
Figure 52 - Submit to Financer for Funding

Figure 53 - Spot/Bypass Process

Figure 54:
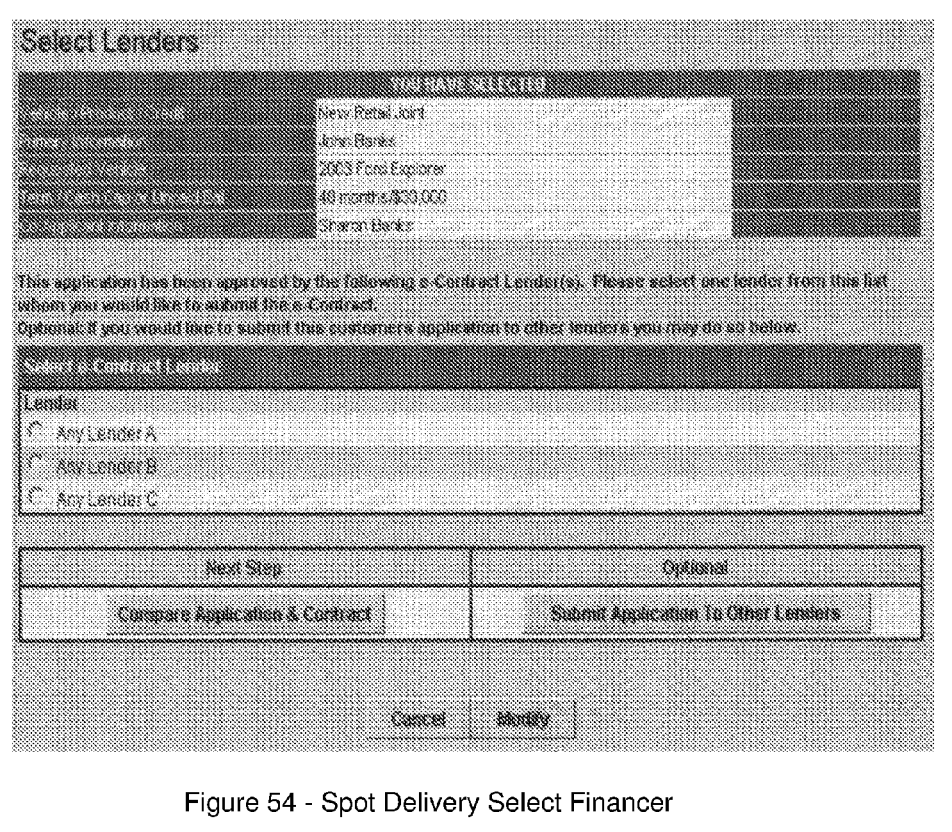

Figure 54 - Spot Delivery Select Financer

Figure 55:
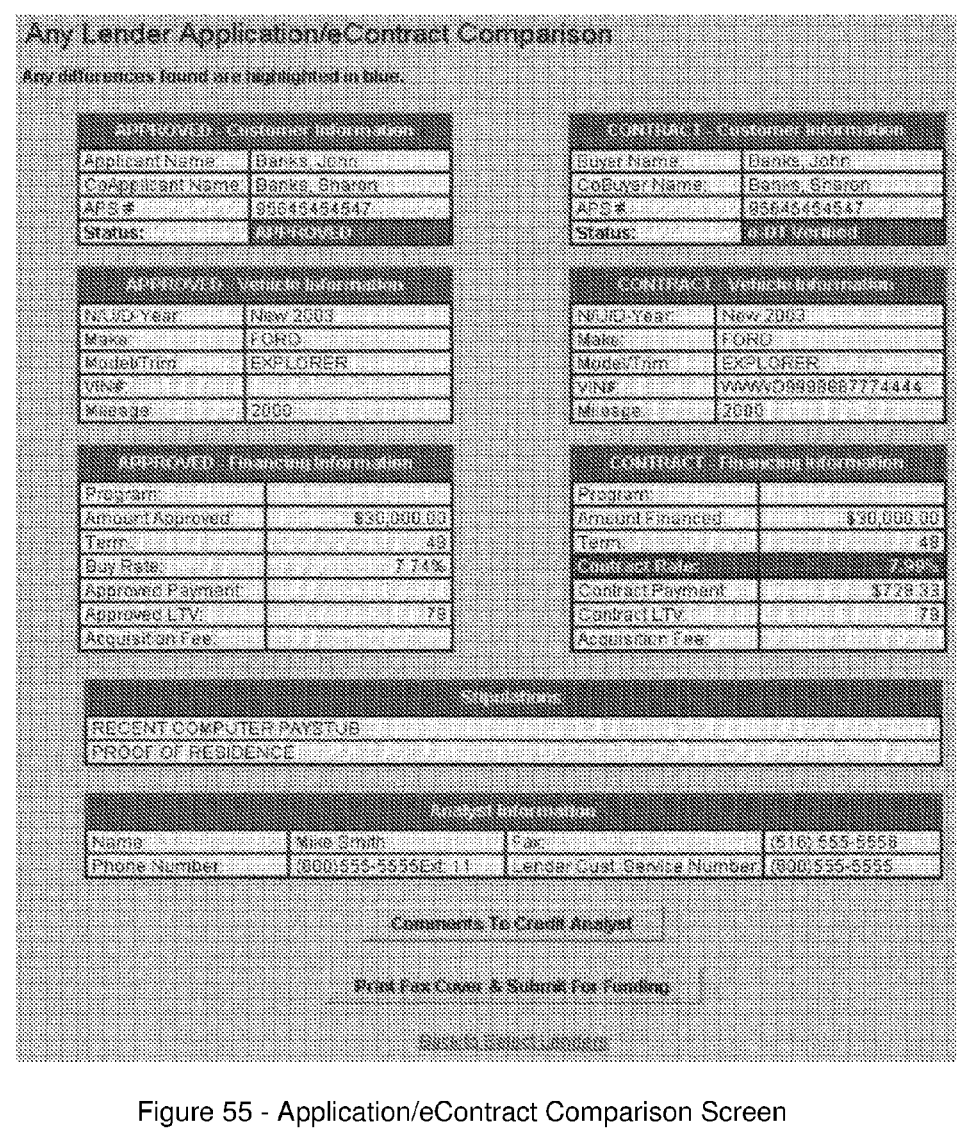

Figure 55 - Application/eContract Comparison Screen

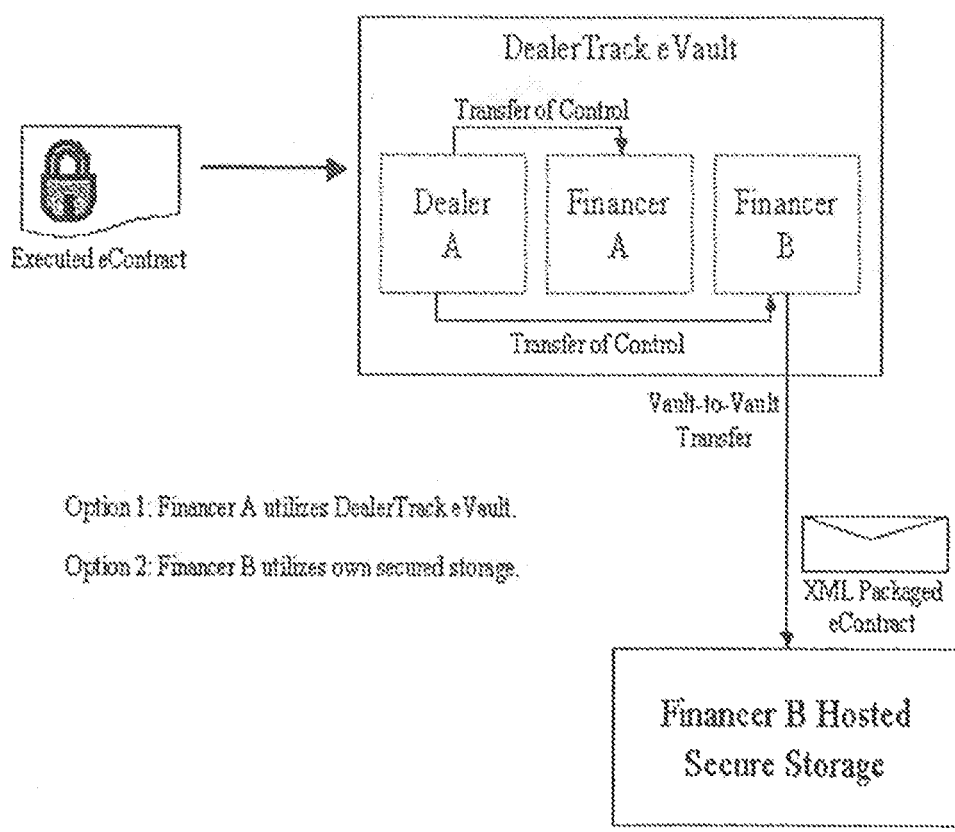
Figure 56 - eContract Storage Alternatives

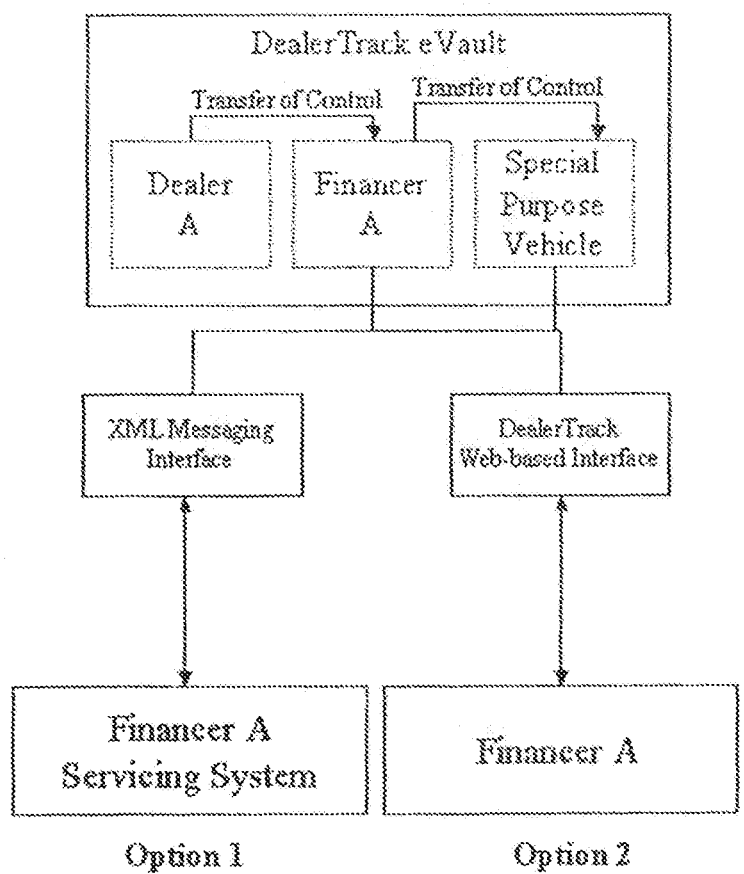
Figure 57 - Vault Access and Contract Management

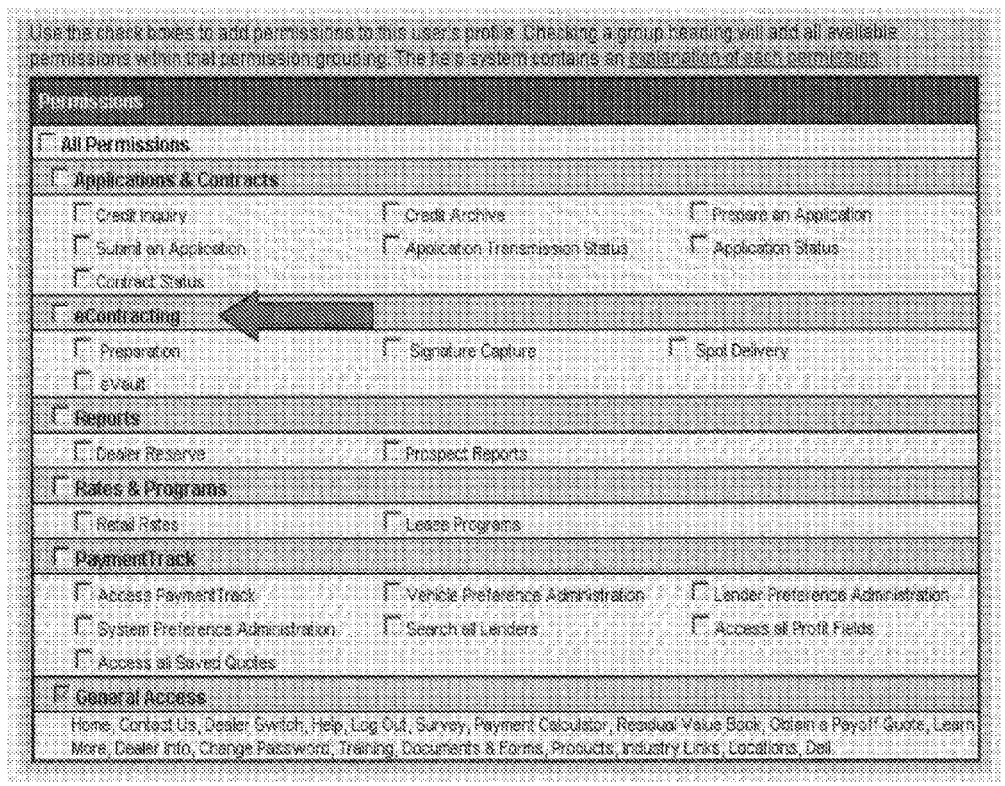
Figure 58 - Dealer User Administration Screen

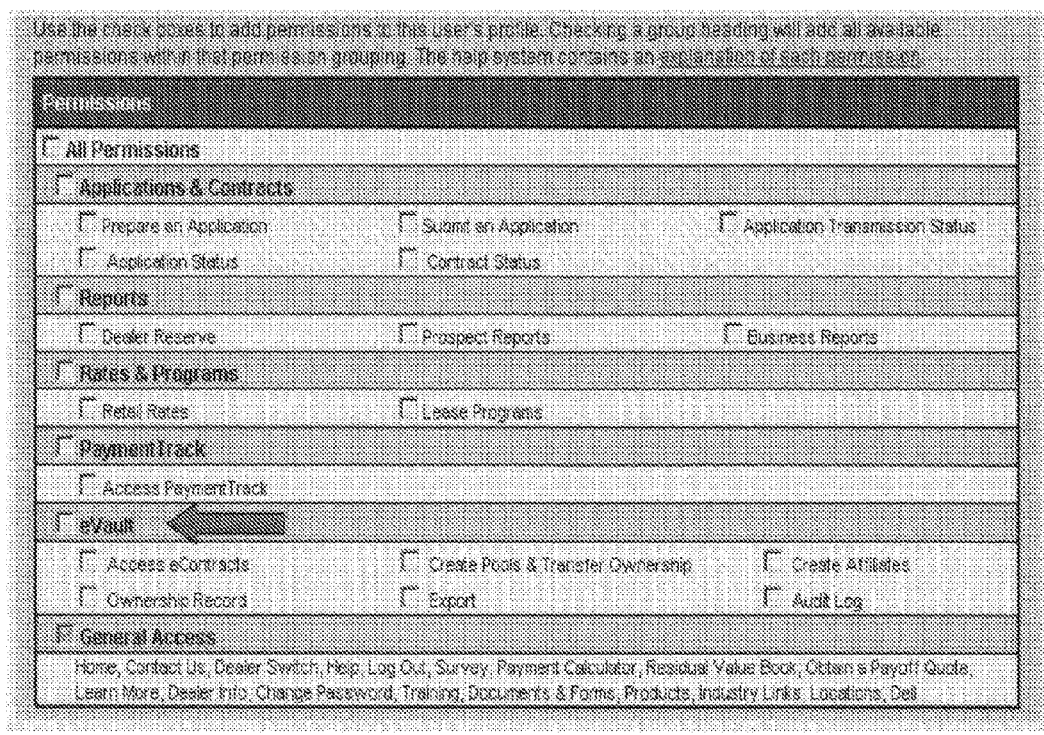
Figure 59 - Financer User Administration Screen

INTEGRATED ELECTRONIC CREDIT APPLICATION, CONTRACTING AND SECURITIZATION SYSTEM AND METHOD

CROSS-REFERENCE TO RELATED APPLICATIONS

This application claims the benefit of priority to U.S. Application No. 60/491,621, filed Jul. 31, 2003, the entire disclosure of which is hereby incorporated by reference as if set forth at length herein.

FIELD OF THE INVENTION

The present invention (also referred to as DealerTrack™, or the DealerTrack™ system/method/product) generally relates to credit application processing and more specifically to an integrated electronic credit application, contracting and securitization system, process, apparatus and article of manufacture, particularly suitable for the automotive industry.

COPYRIGHT/TRADEMARK STATEMENT

At least a portion of the disclosure of this document may contain material, which is subject to copyright/trademark protection. The copyright/trademark owner has no objection to the facsimile reproduction by anyone of the patent document or the patent disclosure, as it appears in the Patent and Trademark Office patent file or records, but otherwise reserves all copyright/trademark rights whatsoever.

BRIEF DESCRIPTION OF THE DRAWINGS

The FIGS. 1-59 herein depict exemplary embodiments of the present invention constructed in accordance with the teachings expressed herein.

DESCRIPTION OF THE INVENTION

Figure 28:
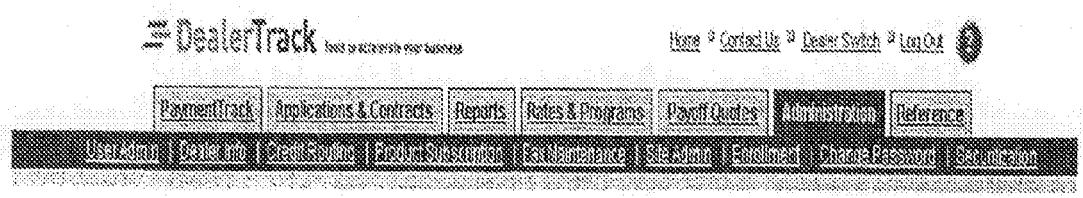

Aspects, features and advantages of the present invention will become better understood with regard to the accompanying description with reference to the drawing figures. What follows are one or more embodiments of the present invention. It should be apparent to those skilled in the art that those embodiments provided herein are illustrative only and not limiting, having been presented by way of example only. All the features disclosed in this description may be replaced by alternative features serving the same purpose, and equivalents or similar purpose, unless expressly stated otherwise. Therefore, numerous other embodiments of the modifications thereof are contemplated as falling within the scope of the present invention as defined herein and equivalents thereto. Use of absolute terms, such as "will not," "will," "shall," "shall not," "must," and "must not," are not meant to limit the present invention as the embodiments disclosed herein are merely exemplary.

The present invention is an integrated electronic credit application, contracting and securitization system, process, apparatus and article of manufacture, suitable for the automotive industry. In one embodiment, the present invention comprises the following integrated components: a Credit Application Module, an eContracting Module and an eDocument Storage Module.

Credit Application Module—Overview

The Credit Application Module is "a centralized credit application entry and routing system which accepts applications from, for example, automotive dealerships, electronically and selectively forwards them to funding sources, including funding sources having computerized credit application systems." Exemplary embodiments of the Credit Application Module are set forth in U.S. Pat. No. 5,878,403, which is incorporated herein by reference. Selected information acquired and generated by the Credit Application Module, including for example, customer information, lending/funding decision, etc, is then used as input to the eContracting Module.

eContracting Module—Overview

The eContracting Module is an electronic contracting and same day funding system which electronically transmits contract information to financing sources. Details of exemplary embodiments of the eContracting Module are provided in the section entitled: "eContracting Functional Requirements".

eDocument Storage Module—Overview

The eDocument Storage Module "implements digital encryption for the electronic transmission, storage and retrieval of authenticated documents and that enables the establishment of the identity of the originator of an electronic document and of the integrity of the information contained in such a document. Together these provide irrevocable proof of authenticity of the document. The system and method of the present invention provides for "paper-less" commercial transactions.

After an eContract is created and signed it is deposited, along with any other ancillary documents/information, into a "Vault" and an authoritative copy of the eContract is designated. An "Ownership Record" is created listing the dealer and/or the financing source as the owner/control party.

Details of exemplary embodiments of the eDocument Storage Module are provided in the section entitled: "Securitization Vault, Functional Requirements".

Additional details of exemplary embodiments of the eDocument Storage Module are set forth in U.S. Pat. Nos. 5,615,268, 5,748,738, 6,237,096 and 6,367,013, Publication Nos. 2001/00002485 and 2002/0184217, each of which is incorporated herein by reference.

Operational Flow

Exemplary operational flows of the overall system and method in accordance with the present invention are shown by FIGS. 34-39 entitled "Master eContracting Flow Chart".

APPENDIX

Additional Information

Additional aspects, features and advantages of the present invention is provided in the section entitled: "Electronic Contracting and Securitization for the Automotive Finance Industry, Overview" supplanted with FIGS. 40-59.

eContracting Functional Requirements eContracting Functional Overview
- DealerTrack will provide the dealers approved for eContracting:
    - An eContract data entry screen prefilled with customer, vehicle and financial data from lender approved or counter-offered retail applications.
        o Spot Delivery Phase I:
            - The Data Entry Screen will be prefilled with available data from a pending application.
        o Spot Delivery Phase II:
            - The Data Entry Screen will be prefilled with available data from a pulled Credit Bureau in the Spot Delivery process.
            - The Data Entry Screen will not be prefilled if the dealer accesses the screen from the "Submit Application/eContract" submenu in the Spot Delivery process.
    - An electronic version of standardized retail installment contracts approved by the lender and completely filled out with the applicable contract data.
        o In those states that require a Spanish language version of the Retail Installment contract, DealerTrack will provide this onsite within Docs & Forms and onscreen within the eContracting function.
        o The contract PDF will contain a DealerTrack created reference number in the footer of the document which will tie into the reference number used on the Signature Pad LCD screen verbiage.
    - A bar-coded fax cover sheet itemizing ancillary documentation to be faxed to the lender for matching purposes.
        o The bar-code will be created using the lender APS #. The bar-code criteria will be sent to the lender within the XML data stream when the signed eContract is sent for funding review.
        o The fax cover sheet will be separate from the eContract PDF for printing purposes.
    - Signature pads and related software to obtain eSignatures.
- Via DealerTrack, the lender will provide:
    - Their dealers with verified contract data including a lender calculated APR, Monthly Payment, Total of Payments, and Finance Charge (applicable if the lender participates in data verification).
    - DealerTrack with bar code criteria (APS #) at the time of application submittal that will be used on the DealerTrack fax cover sheet to match the imaged eContract residing on the lenders imaging system to dealer faxed ancillary documentation.

- Required ancillary documentation requirements, including stipulations, for the fax cover sheet at the time of Credit Approval or Counter-offer.
- DealerTrack will provide the lender:
  - The ability to confirm contract data prior to receipt of the signed retail installment eContract (applicable if the lender participates in data verification and the dealer has not elected to spot deliver the customer).
  - A signature bound PDF version of the completed retail installment eContract to be saved in the lenders imaging system.
  - The ability to match dealer faxed ancillary documentation with the eContract residing on the lenders imaging system by referencing the bar-coded fax cover sheet.

eContracting Functional Detail

Accessing the eContract Data Entry Screen

Access to the Data Entry Screen will be available in the following 4 manners:
1. Approved/Counter Offered Applications.
2. Spot Phase I – Pending Applications.
3. Spot Phase II – Credit Bureau Summary/Detail.
4. Spot Phase II – Submit Application/eContract

Approved/Counter-offered Applications

Figure 1:
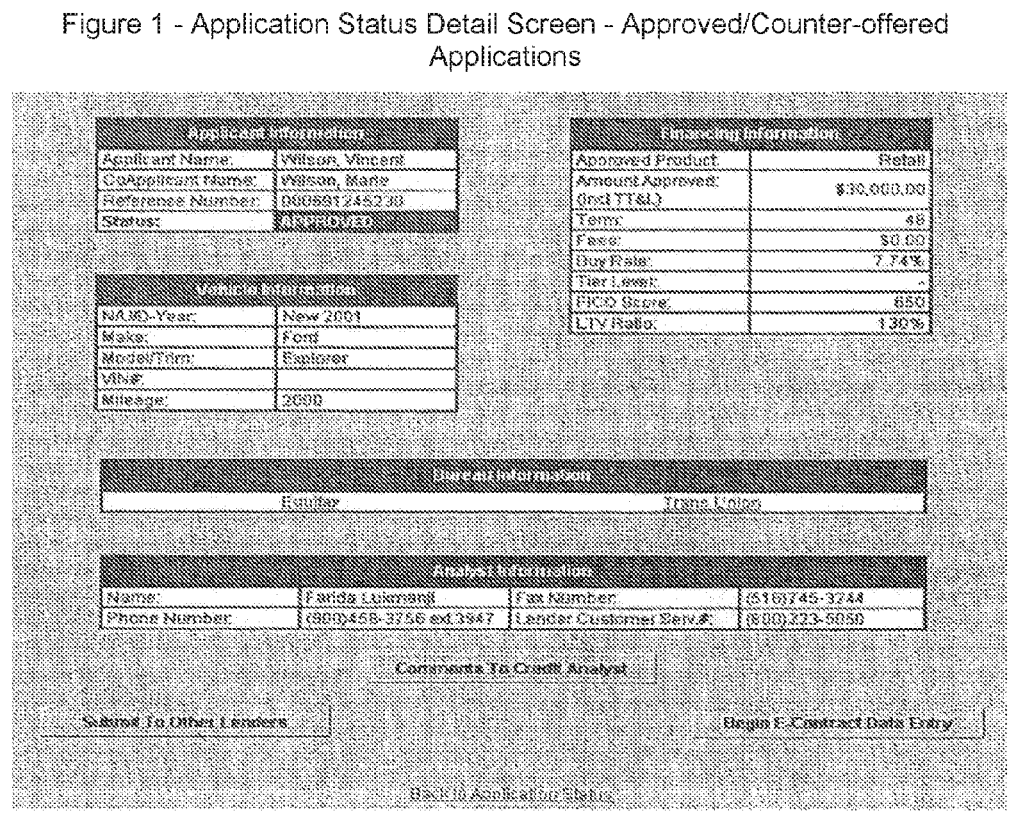
Figure 2:
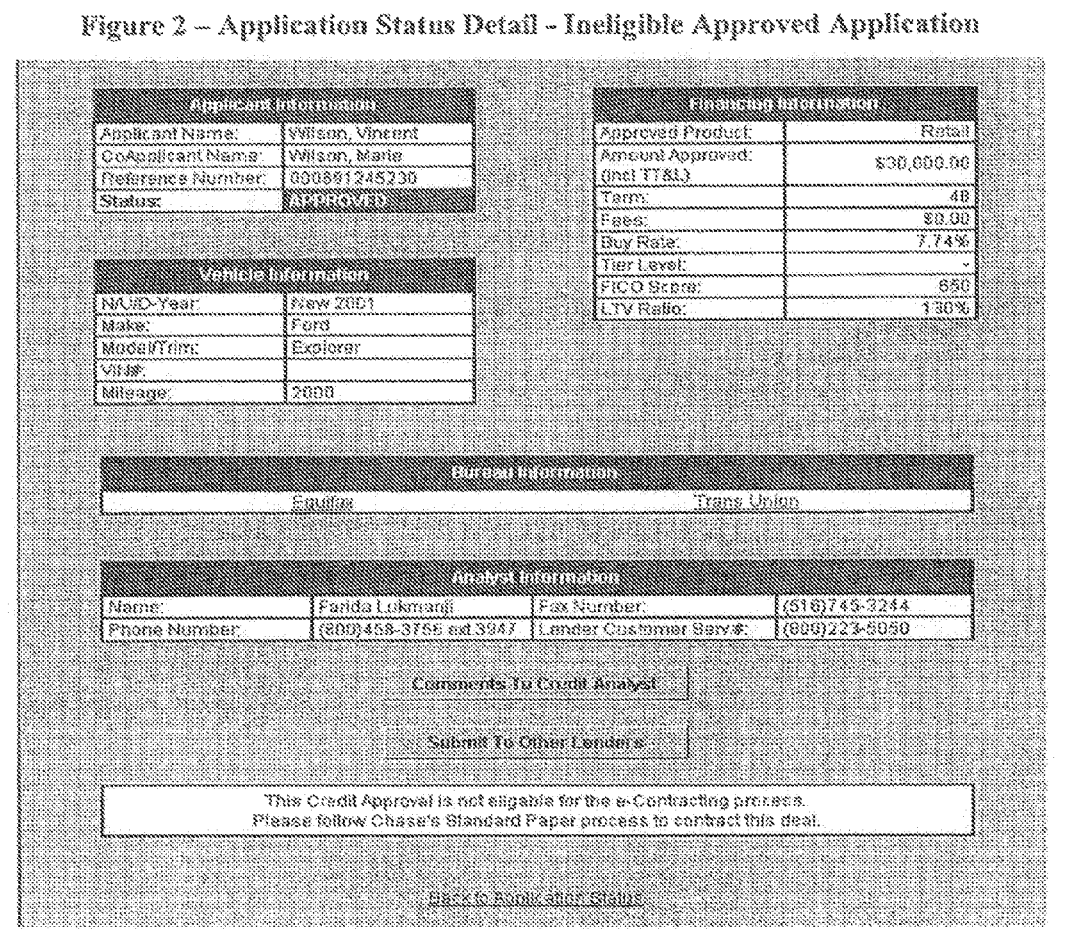

Dealers will access the eContract Data Entry screen via an Approved or Counter-offered Application Status Detail screen. The Application Status Detail screen will present the dealer with the option to "Begin eContract Data Entry" (Figure 1). The button, along with all other functional buttons ("Comments to Credit Analyst", "Add Co-Applicant", "Submit to Other Lenders") will be removed once an eContract Data Entry screen has been saved or submitted to any eContract participating lender for verification (if applicable) or a paper contract is in house. In place of these buttons will be a notice indicating that there is an existing eContract in progress; "The eContracting process for this customer has already begun. Select 'Continue' to access this deal". DealerTrack will provide the dealer with a link that will take the dealer to the appropriate eContract location relating to that deal. "Begin eContract Data Entry", along with all other functional buttons ("Comments to Credit Analyst", "Add Co-Applicant", "Submit to Other Lenders"), will reappear if the dealer chooses to cancel the eContracting process. "Begin eContracting Data Entry" will only be available until the credit approval expires (Lender to send indicator of expiration). Note: Lenders will have the ability to indicate if a customer is not eligible for eContracting, DealerTrack will display the following message in place of the "Begin eContract Data Entry"; "This credit approval/counter-offer is not eligible for the eContracting process. Please follow (lender's name) standard paper process to contract this deal" (Figure 2).

Button Functionality:

- *Begin eContract Data Entry*: DealerTrack will present the dealer with the eContract Data Entry screen prefilled with available application data.

Accessing the eContract Data Entry Screen – Spot Delivery

Approved dealer users will have the ability to access the eContract Data entry screen through the Spot Delivery process in three ways:
1. Phase I – Pending Applications.
2. Phase II - Using DealerTrack's credit bureau functionality.
3. Phase II - From Submit An Application/eContract screen.

Pending Applications (Spot Delivery – Phase I)

Figure 3:
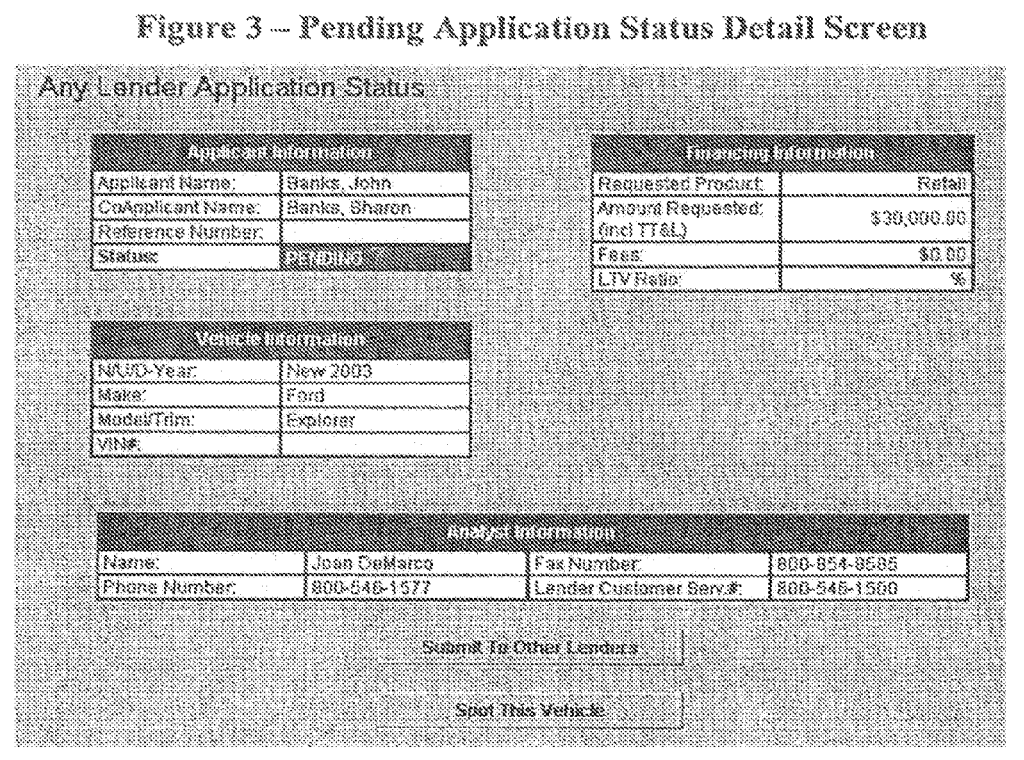

Dealers will access the eContract Data Entry screen via a Pending (Figure 3) or Approved/Counter-offered (Figure 4) Application Status Detail screen. The Pending Application Status Detail screen will present the dealer with the option to "Spot This Vehicle", and the Approved/Counter-offered Application Status Detail screen will present the dealer with option II "Bypass Verification". The button, along with all other functional buttons ("Comments to Credit Analyst", "Add Co-Applicant", "Submit to Other Lenders") will be removed once an eContract Data Entry screen has been saved or submitted to any eContract participating lender for verification (if applicable) or a contract for that customer is in any contract status, eContracting or paper. In place of these buttons will be a notice indicating that there is an existing eContract in progress; "The eContracting process for this customer has already begun. Select 'Continue' to access this deal."
DealerTrack will provide the dealer with a link that will take the dealer to the appropriate eContract location relating to that deal. "Begin eContract Data Entry", along with all other functional buttons ("Comments to Credit Analyst", "Add Co-Applicant", "Submit to Other Lenders"), will reappear if the dealer chooses to cancel the eContracting process.

Button Functionality:
- *Spot This Vehicle*: DealerTrack will present the dealer with the eContract Data Entry screen prefilled with available application data.

Button Functionality:
*Bypass Verification*: DealerTrack will present the dealer with the eContract Data Entry screen prefilled with available application data.

Credit Bureau Summary/Detail (Spot Delivery – Phase II)

Dealers will access the Submit An Application/eContract screen from the Credit Bureau Summary (Figure 5) or Credit Bureau Detail screens. Once the selection has been made, the dealer will be presented with the Submit Application/eContract screen. Note that the button "Prefill Application/eContract" will only appear for those dealers enrolled in eContracting and users who have Spot permission.

Radio Button Functionality:
- *Equifax:* Will prefill the Application/eContract Data Entry screen with Equifax data if "Prefill Application/eContract" button selected.
- *Experian:* Will prefill the Application/eContract Data Entry screen with Experian data if "Prefill Application/eContract" button selected.
- *TransUnion:* Will prefill the Application/eContract Data Entry screen with TransUnion data if "Prefill Application/eContract" button selected.
- *Update Application/eContract with customer data only:* Will prefill the Application/eContract Data Entry screen with customer data only if "Prefill Application/eContract" button selected.

Action Button Functionality:
- *Prefill Application/eContract:* Will present the dealer with the Submit Application/eContract screen (Figure 6).

Submit Application/eContract (Spot Delivery – Phase II)

Dealers will access the eContract Data Entry screen via the Submit Application/eContract submenu (Figure 6). This option will only appear for those dealers active in eContracting and users that have Spot Delivery permission. The Submit Application/eContract screen will give the dealer the ability to provide vehicle, product, trade-in, and deal type data. Note: this screen is also accessed from a pulled Credit Bureau where the dealer has selected the "Prefill Application/eContract" button.

Radio Button Functionality:
- *Select a Vehicle Type:* Will enable DealerTrack to present the Dealer with the required Contract Data Entry screen.
    - New Vehicle
    - Used Vehicle
    - Demo
- *Select a Product Type:* Will enable DealerTrack to present the dealer with the required Contract Data Entry screen.
    - Retail
    - Lease – not currently available. DealerTrack will present the dealer with a pop-up indicating "eContracting is not currently available for Lease products".
    - Balloon - not currently available. DealerTrack will present the dealer with a pop-up indicating "eContracting is not currently available for Balloon products".
- *Trade-in:* Will enable DealerTrack to present the dealer with the required Contract Data Entry screen.
    - Yes
    - No
- *Request Application or eContract:* Will enable DealerTrack to present the dealer with the required Application or Contract Data Entry screen.
    - Application – Will bring the dealer to the Application Data Entry screen.

- eContract – Will bring the dealer to the eContract Data Entry screen.

Button Functionality:
- *Individual:* DealerTrack will present an Application or Contract Data Entry screen applicable to an individual.
- *Joint:* DealerTrack will present an Application or Contract Data Entry screen applicable to a buyer and co-buyer.
- *Business:* DealerTrack will present an Application or Contract Data Entry screen applicable to a business.
- *Business with Co-Applicant:* DealerTrack will present an Application or Contract Data Entry screen applicable to a business with co-applicant.

eContracting Data Entry Screen Functionality
- Access to the eContract Data Entry screen will be given in the following manners (previously described):
  - Approved/Counter-offered applications
  - Pending applications (Spot Phase I)
  - Credit Bureau Summary/Detail (Spot Phase II)
  - Submit Application/eContract) (Spot Phase II)
- DealerTrack will present the eContract Data Entry screen. The appropriate contract data fields will be displayed. Available data from the Approved, Counter-offered or Pending application (if applicable) will prefill the appropriate data fields.
  - Note: If the dealer has accessed the Data Entry screen from a pulled Credit Bureau, the applicable data will be prefilled. If the dealer is accessing the Data Entry Screen without any previous data being obtained (Submit Application/eContract) the screen will be empty of data.
- DealerTrack will place the cursor at the first required data entry field in which data has not yet been obtained.
- The dealer will complete the remaining required data entry fields along with any customer requested options using the tab function or clicking in the appropriate field.
- Upon completion of the eContract Data Entry screen, the dealer will submit this data to DealerTrack in the following manners:
  - If the lender participates in data verification, the dealer will click "Submit to Lender for Verification" (Figure 7).
  - If the lender does not participate in data verification or the dealer has elected to use Spot Delivery functionality, the dealer will click "Continue" (Figure 11).
    - *Note: The dealer will have the following additional options available on the eContract Data Entry screen:
      - *Save* the data and return to the contract status screen. When the dealer reenters the deal via the Contract Status Detail screen, he will be returned to the eContracting Data Entry screen via the button "Continue eContract". The eContract Data Entry screen will retain the saved data.

- o *Cancel* – Pop-up box: "Canceling will delete all eContract information and return you to Application Status. Are you sure this is what you want to do? Yes/No". If the dealer accepts, return to the Application Status screen. Begin eContract Data Entry functional button, along with all other functional buttons ("Comments to Credit Analyst", "Add Co-Applicant", "Submit to Other Lenders"), will reappear in the Application Status Detail screen. DealerTrack will message the lender advising that the dealer wishes to cancel the eContracting process.
- o *Reset* the data to the most current approved, counter-offered or data entered (Spot Delivery) application information.
- DealerTrack will scan the data for "web edit" errors.

DealerTrack Web Edits/Standard Edits

- "Web edits" or "Standard Edits" reside on the DealerTrack system and will alert the dealer to specific errors identified by the system.
  - o DealerTrack web edits:
    - Required Co-Signor Notice input from the dealer:
      - o "Lender requires any Buyer that is not going to be listed as an owner on the vehicle's title to sign a Co-Signor Notice. Are both individuals on the retail installment contract listed as owners of the vehicle on the title?"
        - Yes
          - In the case of an individual or business loan with a personal guarantor the answer will be defaulted to "Yes" and all other options will be locked.
        - No, Buyer not listed.
          - Will require the Buyer to sign the Co-Signor Notice.
        - No, Co-Buyer not listed.
          - Will require the Co-Buyer to sign the Co-Signor Notice.
  - o Confirmations that all required data entry fields have been completed.
  - o The First Payment Date is between 19-51 days of the Note Date.
  - o MSRP will be required on new vehicles.
  - o States in which GAP is offered:
    - GAP will be hard-coded in the second "For" field.
    - The "To" field will incorporate a drop-down box that is prefilled with the following:
      - "(Lender Name) – Paid in Financing" (if applicable) – Will require the dealer to complete a GAP Waiver Form.

- o The dealer will be required to enter the purchase amount of GAP in the Financing Information section.
- o Provider (Lender Name – if applicable) and cost will prefill in "Provider" and "Cost" fields within the Warranty/Credit Insurance section.
- o The "Term" field of the GAP within the Warranty/Credit Insurance section will prefill with the term of the contract. It will be editable to the dealer.
- "(Lender Name) – Paid in Cash" – Will require the dealer the complete a GAP Waiver form.
    - o The purchase amount in the Financing Information section will be locked.
    - o Provider (Lender Name – if applicable) will prefill in the "Provider" field within the Warranty/Credit Insurance section.
    - o The "Term" field will prefill with the term of the contract. It will be editable to the dealer. The dealer will be required to complete the "Cost" field of the GAP within the Warranty/Credit Insurance section.
- "Other – Included in Financing"
    - o The dealer will be required to enter the purchase amount of GAP in the Financing Information section.
    - o The dealer will be required to complete the "Provider" field and DealerTrack will prefill the "Term" field with the term of the contract within the Warranty/Credit Insurance section. This field will be editable to the dealer.
- "Other – Paid in Cash"
    - o The purchase amount in the Financing Information section will be locked.
    - o The dealer will be required to enter the "Provider" and "Cost" fields of the GAP within the Warranty/Credit Insurance section. DealerTrack will prefill the "Term" field with the term of the contract. This field will be editable to the dealer.
- o Negative Equity will be reflected in the $4^{th}$ To/For field in the financing section.

- The dealer will be required to enter the lenders name in the "To" field.
- "For" will prefill with "Prior Lease/Loan Balance" calculated by DealerTrack.
- The amount will prefill with the negative equity amount figured in the "Trade-in" section of "Vehicle Information".
  - Origination Fee – If a state allows for an origination fee, and the lender charges this fee, the dealer will be required to indicate the following via a radio button in the data entry screen:
    - "Included in Financing"
      - This will require the dealer to enter the amount of the origination fee.
    - "Paid in Cash"
      - This will require the dealer to enter the amount of the origination fee. DealerTrack will subtract this amount from the Total Amount Financed.
    - "Bump Rate"
    - "Not Required (reason)"
  - DealerTrack will display the Approved Amount from an Approved or Countered Credit Application on the data entry screen for the dealer to review.
  - DealerTrack will validate the following dealer entered amounts by using a Reg-Z Calculator to ensure compliance with legal limits:
    - Finance Charge
    - Monthly Payment
    - Total of Payments
    - APR
- If the "web edits" identify errors:
  - DealerTrack will return the dealer to the eContract Data Entry screen.
  - DealerTrack will present the errors on the eContract Data Entry screen for dealer correction.
  - Dealer will make corrections and click:
    - "Submit to Lender for Verification" if lender participates in verification.
      - NOTE: Comment to appear above button that reads: "This Lender Supports Contract Data Verification"
    - "Continue" if the lender does not participate in data verification or the dealer has elected to use Spot Delivery functionality.
  - Once passed DealerTrack web edits, the status reflected in Contract Status will be "eDTVerified" (Figure 10).
    - NOTE: Comment to appear above button:

- Bypass – "This Lender Does Not Support Contract Data Verification. A lender will not verify this contract data prior to you obtaining customer signatures. Press 'Continue' to proceed".
- Spot – "You have elected to Spot Deliver this deal. A lender will not verify this contract data prior to you obtaining customer signatures. Press 'Continue' to proceed".

Lender Verification of eContract Data

*(Note: Not applicable for Bypass Verification or Spot Delivery Processes).*
- After submitting the data to the lender for verification:
  - The dealer will not have the ability to change the eContract data until an eError or eLender Verified response has been received.
  - DealerTrack will notify the dealer of submission via a change in contract status (eSubmitted).
  - The lender will message DealerTrack informing of receipt.
    o Should there be an error in transmission, DealerTrack will alert the dealer via a change in Contract Status (eSubmit Error). DealerTrack will provide an 800 # for the dealer to contact for assistance.
  - DealerTrack will alert the dealer of the successful submission via a change is Contract Status, eReceived (Figure 8).
- DealerTrack will submit the data to the lender's system for verification.
- The lender will scan the data for errors based upon backend system "lender edits".
  - "Lender edits" are created by the lender, reside on the lenders backend system and will identify specific errors. Example: Amount financed outside program parameters.
  - If "lender edits" identify errors:
    o Lender will forward DealerTrack a listing of errors.
    o DealerTrack will alert the dealer of errors via a change in contract status (eError).
    o The dealer will enter the eContract Data Entry screen via the Contract Status Detail screen by clicking "Continue eContract" button.
    o DealerTrack will present the itemized errors and lender comments on the eContract Data Entry screen for dealer correction.
    o Dealer will make corrections and click "Submit to Lender for Verification".
  - OPTIONAL: If the lenders backend processing system finds errors, the lender has the option to reroute the deal to their credit or funding analyst for review.
    o Lender will forward DealerTrack a message indicating the deal is under review along with reasons for review.

o DealerTrack will alert the dealer that the deal is under review via a change in the contract status (eReview) and display reasons for review to the dealer (Figure 9).
o If the lender finds that the new contract data is unacceptable:
- The credit or funding analyst has the option to send comments itemizing the errors to the dealer.
- The lender will send DealerTrack a message indicating an error in contract data.
- DealerTrack will alert the dealer of change in status via a change in contract status (eError).
- The dealer will enter the Contract Data Entry Screen to view the error(s) identified by the lender.
- The dealer can make corrections and resubmit to the lender for verification, or cancel the eContracting process.
o If the lender finds that the new contract data is acceptable:
- The credit or funding analyst has the option to send comments to the dealer.
- DealerTrack will alert the dealer of change in status via a change in contract status (eLender Verified).
- Once the information is verified via the lenders backend processing system the lender will forward the lender calculated APR, Monthly Payment, and Finance Charge along with the bar-code criteria (sent at the time of application approval/counter-offer) to be referenced on the fax cover sheet.
- Dealer Track will alert the dealer of change in status via a change in the contract status, eLender Verified (Figure 10).

Button Functionality
- *Save* – Saves the dealer entered data and returns the dealer to the Contract Status screen. Dealer may reenter the deal via the Contract Status screen link indicating a status of eSaved.
- *Cancel* – Pop-up box: "Canceling will delete all eContract information and return you to Application Status. Are you sure this is what you want to do? Yes/No". If the dealer accepts, return to the Application Status Detail screen. Begin eContract Data Entry Screen functional button, along with all other functional buttons ("Comments to Credit Analyst", "Add Co-Applicant", "Submit to Other Lenders"), will reappear in the Application Status Detail screen. DealerTrack will message the lender advising that the dealer wishes to cancel the eContracting process.
- *Reset* – Will reset the data to the most current approved application information.
- *Submit to Lender for Verification* – Submit info to lender. Return dealer to Contract Status screen.

Link:
- *Wilson, Vincent* - Will take the dealer to the Contract Status Detail Screen.

Link:
- *Banks, John* – Will take the dealer to the Contract Status Detail screen in the Spot Delivery Process. The dealer will be able to generate the eContract from this point.
- *Wilson, Vincent* – Will take the dealer to the Contract Status Detail screen in the Data Verification Process. The dealer will be able to generate the eContract from this point.

Button Functionality
- *Save* – Saves the dealer entered data and returns the dealer to the Contract Status screen. Dealer may reenter the deal via the Contract Status screen link indicating a status of eSaved.
- *Cancel* – Pop-up box: "Canceling will delete all eContract information and return you to Application Status. Are you sure this is what you want to do? Yes/No". If the dealer accepts, return to the Application Status Detail screen. Begin eContract Data Entry Screen functional button, along with all other functional buttons ("Comments to Credit Analyst", "Add Co-Applicant", "Submit to Other Lenders"), will reappear in the Application Status Detail screen. DealerTrack will message the lender advising that the dealer wishes to cancel the eContracting process.
- *Reset* – Will reset the data to the available customer/collateral data if accessed from a pulled credit bureau or pending application. If accessed through Submit and Application/eContract, and no data is available, this will clear the screen.
- *Continue* – Submit the contract data to DealerTrack to pass through web-edits. Return dealer to the contract status screen.

Printing for Customer Review
A print event must be detected prior to the dealer having the ability to capture signatures. DealerTrack provides a forced-print that will print the review copy of the contract for the customer(s) (excluding the fax cover sheet). The printed copies will contain a watermark indicating "Copy" on each page.
- NOTE: An eSigned contract is good for 19 days from the Note Date. If an eContract has not been submitted to the lender within this time period:
    - DealerTrack will delete all eContracting data, and indicate an eCancelled status on the Contract Status Detail Page to the dealer.
    - A message will appear within the Contract Status Details page indicating; "The eLender Verified/eDT Verified (whichever is applicable) status for this customer has expired. Please select 'Continue' to return to the Data Entry Screen".
- NOTE: The following state requirements for printing:
    - CA – Must be printed front/back of legal size paper in color.
    - MI – Must be printed in color.

Functionality
- The dealer will select "Print Review Copy" and Dealer dealer with the unsigned, data merged, eContract PDF cover sheet) in a separate browser window.
- The Silanis "Forced Print" will send the print request to the printer for printing.
- In addition, "Print Review Copy" will constitute a hand-off from ⊾ DealerTrack server to the ApproveIT Web Server (AWS).
- The dealer will have the ability to Modify or Cancel the eContracting proc⊾ ᴊss using the functional buttons ("Modify" and "Cancel") provided within the AWS Overview Page.
    - Note: If dealer has accessed the eContract Data Entry screen via an Approved Application, message will appear indicating (Figure 12):
        o "(Lender's name) supports same day funding if all contract data, including faxed ancillary documentation, is in house and verifiable by X:XX PM Local time Monday through Friday. If received after this time, funds will be remitted the following business day."

Action Buttons:
- "Print Review Copy":
    o Constitutes the handoff to ApproveIT Web Server (AWS).
    o The Silanis "Forced Print" will send the print request to the dealers' default printer for printing.
        ▪ Printed copies will include a "Copy" watermark on all pages.
    o Open the Overview Page in AWS
- "Cancel" – Pop-up box indicating: "Canceling will delete all eContract information and return you to Application Status. Are you sure this is what you want to do? Yes/No". If the dealer clicks "Yes" then return dealer to the Application Status screen. "Begin eContract Data Entry" functional button, along with all other functional buttons ("Comments to Credit Analyst", "Add Co-Applicant", "Submit to Other Lenders"), will reappear in the Application Status Detail screen. DealerTrack will message the lender advising that the dealer wishes to cancel the eContracting process. If the dealer clicks "No" then return the dealer to the current page.
- "Modify" – If lender participates in data verification, pop-up box indicating: "Data will have to be resubmitted to Lender for verification Are you sure this is what you want to do? Yes/No". If the dealer clicks "Yes" then return the dealer to the Data Entry screen retaining dealer entered/Lender approved data. PDF version of eContract, and fax cover sheet (if applicable) will be deleted. If the dealer clicks "No" then return the dealer to the current page.
    o If lender does not participate in data verification or dealer has elected to spot deliver the vehicle, pop-up box indicating; "Do you wish to Modify Contract Data? Yes/No". If the dealer clicks "Yes" then return the dealer to the Data Entry Screen retaining dealer-entered data. PDF version of eContract, and fax cover sheet (if applicable) will be deleted. If the dealer clicks "No" then return dealer to the current page.

Hyperlinks:
- "Back to Contract Summary" – Return the dealer to the Contract Summary page.

AWS Overview Page

Once the dealer has printed the review copy of the contract, the contract-viewing window will close and the AWS Overview Page will be displayed (Figure 13). This page will contain next step instructions for the dealer, indicate status' of signature capture, and provide the dealer with Cancel and Modify functionality as well as allowing the dealer to print additional Review Copies or return to the DealerTrack Contract Details page.

Functionality

- Once the review copy of the contract has been printed, the contract-viewing window will close.
- The AWS Overview Page will be displayed.
- The dealer will review the next step instructions.
    - Step 1 will default to Complete as print event has occurred.
    - Step 2 will indicate a status of Incomplete as no signatures have been captured.
- The dealer will select "Obtain Signatures".
    - AWS will present the dealer with the Signature Capture page.
- The dealer will have additional options to Cancel or Modify the eContract. In addition, the dealer may obtain another review copy of the contract by selecting "View & Print Review Copy" or return to the Contract Detail page by selecting "Back to Contract Details".

Hyperlinks:
- "Obtain Signatures" – Brings the dealer to the Signature Page.
- "Cancel" – Pop-up box indicating: "Canceling will delete all eContract information and return you to Application Status. Are you sure this is what you want to do? Yes/No". If the dealer clicks "Yes" then return dealer to the Application Status screen. "Begin eContract Data Entry" functional button, along with all other functional buttons ("Comments to Credit Analyst", "Add Co-Applicant", "Submit to Other Lenders"), will reappear in the Application Status Detail screen. DealerTrack will message the lender advising that the dealer wishes to cancel the eContracting process. If the dealer clicks "No" then return the dealer to the current page.
- "Modify" – If lender participates in data verification, pop-up box indicating; "Data will have to be resubmitted to Lender for verification Are you sure this is what you want to do? Yes/No". If the dealer clicks "Yes" then return the dealer to the Data Entry screen retaining dealer entered/Lender approved data. PDF version of eContract, and fax cover sheet (if applicable) will be deleted. If the dealer clicks "No" then return the dealer to the current page.

- o If lender does not participate in data verification or dealer has elected to spot deliver the vehicle, pop-up box indicating; "Do you wish to Modify Contract Data? Yes/No". If the dealer clicks "Yes" then return the dealer to the Data Entry Screen retaining dealer-entered data. PDF version of eContract, and fax cover sheet (if applicable) will be deleted. If the dealer clicks "No" then return dealer to the current page.
- "View & Print Review Copy" – Opens the PDF file in a separate browser and allows the dealer to print additional review copies of the contract. NOTE: This action does not bring up the print dialogue box. Printing will occur using the standard Adobe print functionality.
- "Back to Contract Details" – Returns the dealer to the Contract Status Detail page.

Obtaining Signatures

DealerTrack will provide the dealer with a signature page to capture the required signatures. DealerTrack will identify the signature fields requiring signatures based upon previous information obtained (Buyer, Co-Buyer, Dealer, Warranty, Accident/Health, GAP). Signature fields will be organized into blocks of Buyer, Co-Buyer (if applicable), and Dealer. Each signature field will contain verbiage relevant to the contractual requirements. This text will also appear within the LCD screen of the Signature Pad for the customer to review. Note: If a date is required for the signature, the AWS will note the date of the signature capture to be captured on the Contract PDF.

Functionality:

- Once the dealer selects "Obtain Signatures" DealerTrack will provide the dealer with an HTML Signature Page outlining all signatures required for the Buyer, Co-Buyer (if applicable), and Dealer.
    - o The Signature Page will include on screen descriptions for each required signature field for the dealer to refer the customer to the appropriate field on the printed review copy (Figure 14).
        - The descriptions will also appear within the LCD screen of the signature pad referring the customer to the appropriate field on the printed review copy.
        - Both the on-screen and LCD descriptions will reference the DealerTrack created reference number that will match that on the printed review copy of the contract (within the footer of each page) and the customers approval or counter-offer.
        - The signer will have the ability to recapture signatures as many times as desired before securing to the eContract, however, once secured, the signature cannot be deleted.
- The dealer will click on each signature field and capture the appropriate signature.
- The dealer will repeat this process until all customer signatures have been captured.
- The Dealer will have the ability to save a partially signed eContract once each signature section has been completed (Buyer Section, Co-Buyer Section - if applicable). If there is a Co-Buyer and either the full Buyer, or Co-Buyer sections have been saved, the ePartially signed status is good for 5 days from the Note Date (until ALL CUSTOMER signatures are obtained). See page 28, Saving Signatures, for further explanation.
    - The dealer will have the ability to Print a signed customer's copy of the eContract once all customer signatures have been obtained. The dealer will not be able to submit the eContract to the lender until the dealer's signature has been obtained (see page 30, Partially Signed Contracts, for further explanation).
- Once all the required signatures have been obtained, the dealer will click "Continue" which will do the following:
    - All signatures obtained within the HTML eSignature Page are uploaded to DealerTrack where they are securely bound to the eContract to generate the signature bound original.
    - Return the dealer to the Contract Status Detail screen indicating a status of eSigned.

Action Buttons:
- "Save"
    - Dynamic – Only available after a complete block of signatures has been captured (e.g. all the Buyers signatures boxes have been signed, 2 of 2).
    - Will bind the available signatures and date fields (if applicable) to the PDF.
    - Return the dealer to the Overview Page.
- "Cancel" – Pop-up box indicating: "Canceling will delete all eContract information and return you to Application Status. Are you sure this is what you want to do? Yes/No". If the dealer clicks "Yes" then return dealer to the Application Status screen. "Begin eContract Data Entry" functional button, along with all other functional buttons ("Comments to Credit Analyst", "Add Co-Applicant", "Submit to Other Lenders"), will reappear in the Application Status Detail screen. DealerTrack will message the lender advising that the dealer wishes to cancel the eContracting process. If the dealer clicks "No" then return the dealer to the current page.
- "Modify" – If lender participates in data verification, pop-up box indicating; "Data will have to be resubmitted to Lender for verification Are you sure this is what you want to do? Yes/No". If the dealer clicks "Yes" then return the dealer to the Data Entry screen retaining dealer entered/Lender approved data. PDF version of eContract, and fax cover sheet (if applicable) will be deleted. If the dealer clicks "No" then return the dealer to the current page.
    - If lender does not participate in data verification or dealer has elected to spot deliver the vehicle, pop-up box indicating; "Do you wish to Modify Contract Data? Yes/No". If the dealer clicks "Yes" then return the dealer to the Data Entry Screen retaining dealer-entered data. PDF version of eContract, and fax cover sheet (if applicable) will be deleted. If the dealer clicks "No" then return dealer to the current page.

Hyperlinks:

- "Back to Contract Details" – Returns the dealer to the Contract Status Detail page. Pop-up will appear if signatures captured, but not saved (Figure 15).

Figure 15 - Error Message if Signatures have not been Save

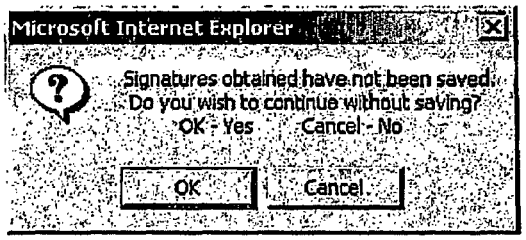

- "OK" – Return the dealer to the Contract Detail page. Do not save/bind signatures and dates.
- "Cancel" – Close the pop-up.

Saving Signatures

Figure 16:
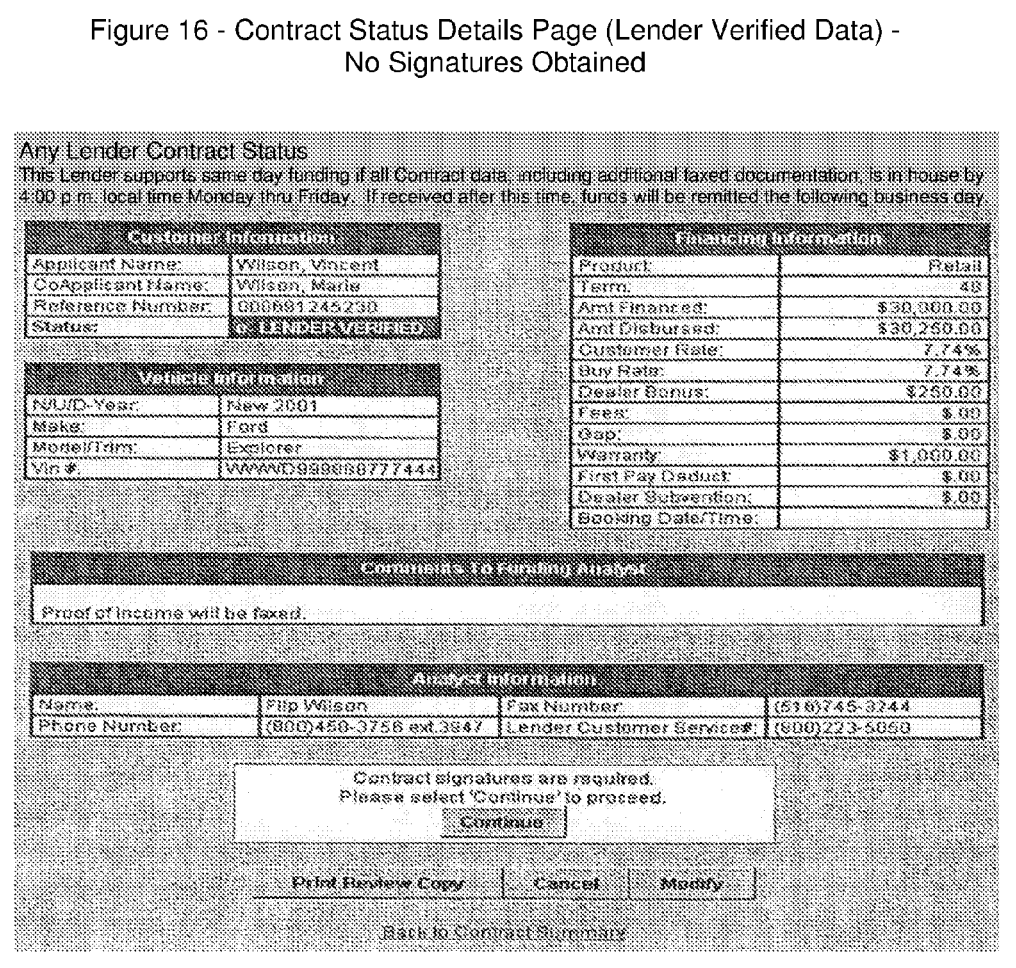

The dealer will have the ability to save blocks of captured signatures without submitting to the lender. Saved signatures will be indicated on both the AWS Overview page and the Contract Status Detail page itemizing additional signatures required. If no signatures have been obtained, and the dealer has exited the AWS Overview page or Signature Capture page (without saving), the forced review print will not be required from Contract Status Details, and the dealer will return to the AWS Overview page by selecting "Continue" from the Contract Status Details page (Figure 16).

- NOTE: Signatures may be saved for 5 days from the Note Date. If ALL Signatures, including the dealers, have not been obtained within this time period:
    - DealerTrack will delete all eContracting data, and indicate an eCancelled status on the Contract Status Detail Page to the dealer.
    - A message will appear within the Contract Status Details page indicating; "The e(DT/Lender) Verified status for this customer has expired. Please select 'Continue' to return to the Data Entry Screen."

Functionality:
- The Contract Status Detail screen will be dynamic in that the statement appearing in the "Continue" box will change based upon missing signatures:
    - Contract Signatures Required – No signatures obtained.
    - Buyer Signatures Required – Co-Buyer (if applicable) and/or Dealer have signed.
    - Co-Buyer Signatures Required (if applicable) – Buyer and Dealer have signed.
    - Dealer Signature(s) Required – Buyer and Co-Buyer (if applicable) have signed.
    - Buyer and Co-Buyer (if applicable) Signatures Required – Dealer has signed.
    - Buyer and Dealer Signatures Required – Co-Buyer has signed.

o Co-Buyer and Dealer Signatures Required. – Buyer has signed. Only applicable if deal has a Co-Buyer.

Action Buttons:
- "Continue" – Brings the dealer to the AWS "Overview Page".
- "Print Review Copy" – Will open the Review copy of the PDF in a separate browser. The dealer can print copies using Adobe print functionality.
    o This function will be available to the dealer until ALL customer signatures (Buyer and Co-Buyer – if applicable) have been captured. It will then be replaced by "View and Print Copy" functionality.
    o Printed copy will contain the watermark "Copy" on each page.
- "Cancel" – Pop-up box indicating: "Canceling will delete all eContract information and return you to Application Status. Are you sure this is what you want to do? Yes/No". If the dealer clicks "Yes" then return dealer to the Application Status screen. "Begin eContract Data Entry" functional button, along with all other functional buttons ("Comments to Credit Analyst", "Add Co-Applicant", "Submit to Other Lenders"), will reappear in the Application Status Detail screen. DealerTrack will message the lender advising that the dealer wishes to cancel the eContracting process. If the dealer clicks "No" then return the dealer to the current page.
- "Modify" – If lender participates in data verification, pop-up box indicating; "Data will have to be resubmitted to Lender for verification Are you sure this is what you want to do? Yes/No". If the dealer clicks "Yes" then return the dealer to the Data Entry screen retaining dealer entered/Lender approved data. PDF version of eContract, and fax cover sheet (if applicable) will be deleted. If the dealer clicks "No" then return the dealer to the current page.
    o If lender does not participate in data verification or dealer has elected to spot deliver the vehicle, pop-up box indicating; "Do you wish to Modify Contract Data? Yes/No". If the dealer clicks "Yes" then return the dealer to the Data Entry Screen retaining dealer-entered data. PDF version of eContract, and fax cover sheet (if applicable) will be deleted. If the dealer clicks "No" then return dealer to the current page.

Hyperlinks:
- "Back to Contract Summary" – Return the dealer to the Contract Summary page.

Partially Signed Contracts

The dealer will have the ability to present the Buyer, and Co-Buyer (if applicable) a printed copy of the contract containing ALL customer signatures without the dealers' signature. If the dealer chooses to use this option, the dealer will be responsible for mailing a fully signed contract containing the dealers' signature once available. This option will only be available if ALL customer signatures have been obtained.

Functionality:
- Once ALL Customer signatures have been obtained (Buyer and Co-Buyer – if applicable), the dealer will select "Save" on the Signature Page.
    - The dealer will be presented with the AWS Overview Page indicating Buyer signatures as Complete and Co-Buyer signatures as Complete (if applicable).
        - Note: Additional instructions to print a customer copy without dealer signature will appear in the AWS overview page to the left (Figure 17).
- The dealer will follow the instructions and select "Back to Contract Details".
- The Contract Status Details page will require the dealer to select "Refresh" which will allow the AWS system to update the contract PDF with the obtained eSignatures (Figure 18).
    - Enhancement: The 'Refresh' button will be replaced by a 'Processing'. This will be available along with the Spot delivery process and coding.
- Once AWS has completed processing the signatures, the dealer will select "View & Print Copy" (Figure 19) which will open the eContract PDF in a separate browser. The dealer will use the Print functionality provided within Adobe Acrobat and print copies for the Buyer, and Co-Buyer (if applicable).
    - Once the dealer has completed printing copies, the dealer will close the viewing window.

Hyperlinks:
- "Obtain Signatures" – opens the Signature Page.
- "Cancel" – Pop-up box indicating: "Canceling will delete all eContract information and return you to Application Status. Are you sure this is what you want to do? Yes/No". If the dealer clicks "Yes" then return dealer to the Application Status screen. "Begin eContract Data Entry" functional button, along with all other functional buttons ("Comments to Credit Analyst", "Add Co-Applicant", "Submit to Other Lenders"), will reappear in the Application Status Detail screen. DealerTrack will message the lender advising that the dealer wishes to cancel the eContracting process. If the dealer clicks "No" then return the dealer to the current page.
- "Modify" – If lender participates in data verification, pop-up box indicating; "Data will have to be resubmitted to Lender for verification Are you sure this is what you want to do? Yes/No". If the dealer clicks "Yes" then return the dealer to the Data Entry screen retaining dealer entered/Lender approved data. PDF version of eContract, and fax cover sheet (if applicable) will be deleted. If the dealer clicks "No" then return the dealer to the current page.
    - If lender does not participate in data verification or dealer has elected to spot deliver the vehicle, pop-up box indicating; "Do you wish to Modify Contract Data? Yes/No". If the dealer clicks "Yes" then return the dealer to the Data Entry Screen retaining dealer-entered data. PDF version of eContract, and fax cover sheet (if applicable) will be deleted. If the dealer clicks "No" then return dealer to the current page.

- "Back to Contract Details" – will return the dealer to the Contract Status Detail Page indicating additional instructions to print a Partially signed contract for the Buyer, and Co-Buyer (if applicable).

Action Buttons:
- "Refresh" – will refresh the page. Once the AWS has completed processing and binding the available signatures to the contract the dealer will be returned to the Contract Status Detail screen reflecting a status of ePartially Signed (see below).
    - NOTE: Enhancement; The 'Refresh' button will be replaced by a 'Processing' screen. This will be available along with the Spot delivery process and coding.
- "Comments to Funding Analyst" – Will allow the dealer to send comments to the analyst.
- "Print Review Copy" – Will allow the dealer to print another version of the contract WITHOUT signatures.

Hyperlinks:
- "Back to Contract Summary" – Will return the user to the Contract Summary screen.

Action Buttons:
- "View and Print Copy" – Opens the contract containing ALL customer signatures in a separate browser for the dealer to print and provide to the Buyer and Co-Buyer (if applicable).
    - Note: This is OPTIONAL.
- "Continue" – Brings the dealer back to the overview page, indicating that the dealer's signatures are required.
- "Cancel" – Pop-up box indicating: "Canceling will delete all eContract information and return you to Application Status. Are you sure this is what you want to do? Yes/No". If the dealer clicks "Yes" then return dealer to the Application Status screen. "Begin eContract Data Entry" functional button, along with all other functional buttons ("Comments to Credit Analyst", "Add Co-Applicant", "Submit to Other Lenders"), will reappear in the Application Status Detail screen. DealerTrack will message the lender advising that the dealer wishes to cancel the eContracting process. If the dealer clicks "No" then return the dealer to the current page.
- "Modify" – If lender participates in data verification, pop-up box indicating; "Data will have to be resubmitted to Lender for verification Are you sure this is what you want to do? Yes/No". If the dealer clicks "Yes" then return the dealer to the Data Entry screen retaining dealer entered/Lender approved data. PDF version of eContract, and fax cover sheet (if applicable) will be deleted. If the dealer clicks "No" then return the dealer to the current page.
    - If lender does not participate in data verification or dealer has elected to spot deliver the vehicle, pop-up box indicating; "Do you wish to Modify Contract Data? Yes/No". If the dealer clicks "Yes" then return the dealer to the Data Entry Screen retaining dealer-entered data.

PDF version of eContract, and fax cover sheet (if applicable) will be deleted. If the dealer clicks "No" then return dealer to the current page.

Hyperlinks:
- "Back to Contract Summary" – Return the dealer to the Contract Summary page.

Printing the Signed PDF and Submitting for Funding (Verified/Bypass Verification Processes)

Once ALL signatures have been obtained, including the dealers', the dealer will print a copy for the customer(s) and dealer records and submit the contract to the lender for funding. The dealer will review the printed Fax Cover Sheet, obtain all ancillary documentation, and fax to the lender.

Functionality

Figure 22:
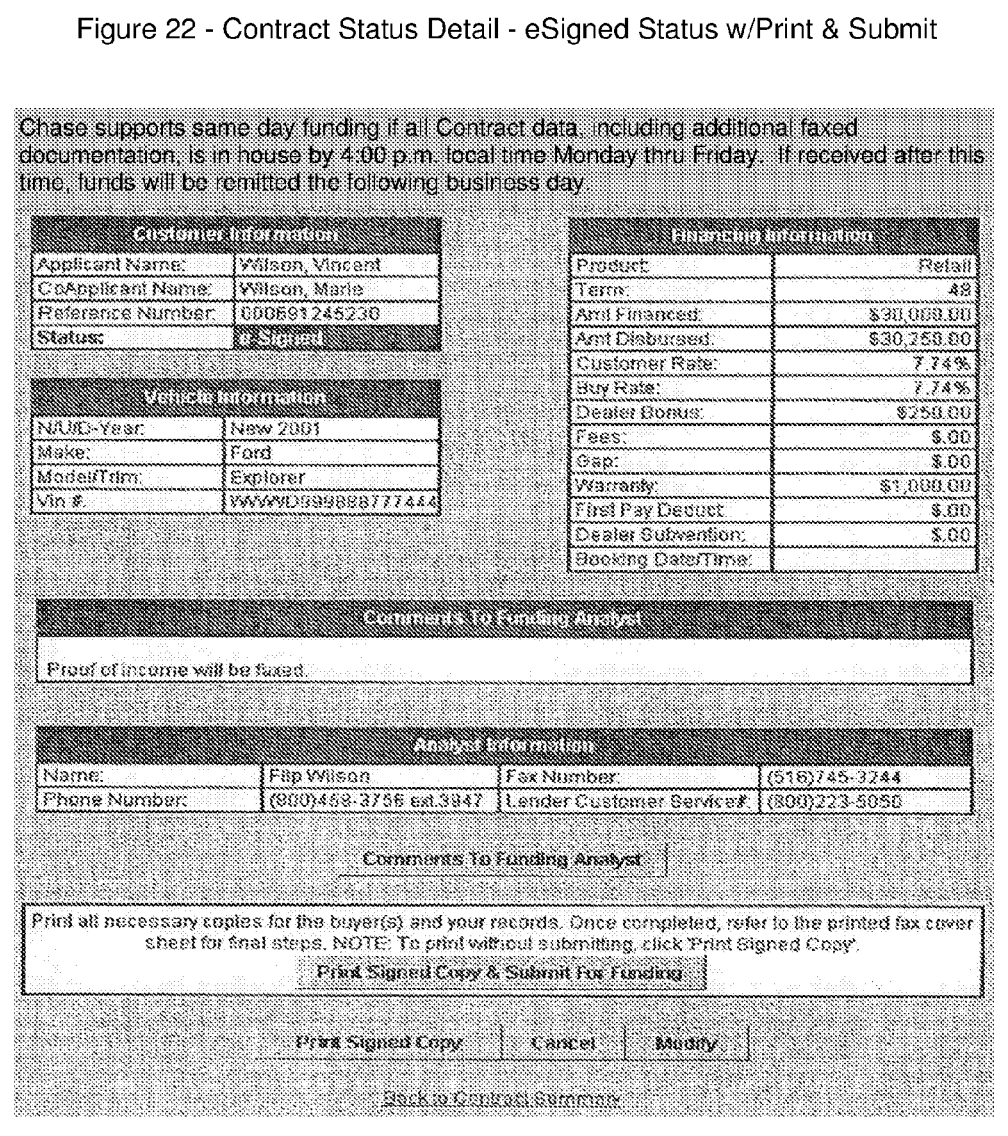

- Once ALL required signatures, including the dealers', have been obtained via the Signature Page, the dealer will select "Continue" (Figure 20).
- The Dealer will be returned to the Contract Status Detail screen indicating a required "Refresh" button (Figure 21).
    - Enhancement: a 'Processing' screen will replace the 'Refresh' button. This will be available along with the Spot delivery process and coding.
- Once the dealer has selected refresh and the AWS has completed processing and binding the signatures, the dealer will be presented with the "Print Signed Copy and Submit For Funding Button" (Figure 22). When this button is selected the following will occur:
    - The eContract PDF and fax cover sheet will be presented to the dealer in a separate browser window and a Print Dialogue box will appear.
        - The fax cover sheet will be a separate Document merged with the Contract PDF.
    - The dealer will select the number of copies to print and destination.
    - The fully signed, flattened copy of the eContract will be forwarded to the lender's imaging system referencing the APS #.
    - The dealer will be returned to the Contract Status screen with the status indicating "eContract Submitted". Once the eContract (Co-Signor Notice and Gap Waiver Form if applicable) has been successfully submitted to the lender the dealer will be notified via a change in Contract Status (eContract Received).
        - Should an error in submission occur, the dealer will be notified via a change in Contract Status (eContract Submit Error). DealerTrack will provide an 800 # for the dealer to call for assistance.
    - NOTE: The dealer will have the option to print additional copies of the contract by selecting "Print Signed Copies" on the Contract Status Detail screen.

- The dealer will review the Bar-Coded Fax Cover Sheet, obtain all required ancillary documentation and fax to the lender.
- Lender's fax server will forward the documentation to the lender imaging system referencing the bar code and match to the eContract.
    - The Buyer will review all ancillary documentation and if all documents have been received, the lender will send DealerTrack an indicator stating the lender's acceptance of the eContract PDF and ancillary documentation. Once the lender's decision to purchase the contract package has been received, DealerTrack will forward the Original contract PDF to the lender.
        - If all ancillary documentation is not received, the lender will notify DealerTrack. The Lender can send comments to the dealer itemizing the missing documentation through DealerTrack.
        - DealerTrack will display to the dealer a change in Contract Status (ePending Docs).
        - DealerTrack will display the missing documentation comments within the Contract Status Detail Screen.
        - The dealer will obtain the missing documentation and fax to the lender along with the Fax Cover Sheet.
        - Should the dealer require an additional copy of the fax cover sheet or contract, this can be obtained on the DealerTrack site for 7 days after initial submittal.
    - Should the Lender review the contract package and find that the contract package will not be accepted, the lender will forward an indicator stating the lender's decision to not purchase this deal.
        - Once received by DealerTrack, a status of "eRejected" will be displayed to the dealer.
        - The dealer will have the ability to "Select Lender(s)" from the eContract Select lenders screen. Please see page 44 regarding Submitting eContract to Other Lender.

Action Buttons:
- "Continue"
    - Dynamic. This is button will replace the "Save" button only after ALL signatures, including the dealers', have been obtained.
    - When selected the following will occur:
        - The signatures will be bound to the contract PDF.
        - The dealer will be returned to the Contract Status Detail page.
- "Cancel" – Pop-up box indicating: "Canceling will delete all eContract information and return you to Application Status. Are you sure this is what you want to do? Yes/No". If the dealer clicks "Yes" then return dealer to the Application Status screen. "Begin eContract Data Entry" functional button, along with all other functional buttons ("Comments to Credit Analyst", "Add Co-Applicant", "Submit to Other Lenders"), will reappear in the Application Status Detail screen. DealerTrack will message the lender advising that the dealer wishes to cancel the eContracting process. If the dealer clicks "No" then return the dealer to the current page.

- "Modify" – If lender participates in data verification, pop-up box indicating; "Data will have to be resubmitted to Lender for verification Are you sure this is what you want to do? Yes/No". If the dealer clicks "Yes" then return the dealer to the Data Entry screen retaining dealer entered/Lender approved data. PDF version of eContract, and fax cover sheet (if applicable) will be deleted. If the dealer clicks "No" then return the dealer to the current page.
  - If lender does not participate in data verification or dealer has elected to spot deliver the vehicle, pop-up box indicating; "Do you wish to Modify Contract Data? Yes/No". If the dealer clicks "Yes" then return the dealer to the Data Entry Screen retaining dealer-entered data. PDF version of eContract, and fax cover sheet (if applicable) will be deleted. If the dealer clicks "No" then return dealer to the current page.

Hyperlink:
- "Back to Contract Summary" – Return the dealer to the Contract Summary page.

Action Buttons:
- "Refresh" – will refresh the page. Once the AWS has completed processing and binding the available signatures to the contract the dealer will be returned to the Contract Status Detail screen reflecting a status of ePartially Signed (see below).
  - NOTE: Enhancement; The 'Refresh' button will be replaced by a 'Processing' screen. This will be available along with the Spot delivery process and coding.
- "Comments to Funding Analyst" – Will allow the dealer to send comments to the analyst.
- "Print Review Copy" – Will allow the dealer to print another version of the contract WITHOUT signatures.

Hyperlinks:
- "Back to Contract Summary" – Will return the user to the Contract Summary screen.

Action Buttons:
- "Print Signed Copy and Submit For Funding"
  - Presents the dealer with the fully signed PDF in a separate browser to view and print as needed. Once this function has been selected, the following occurs:
    - Opens the contract containing ALL signatures in a separate browser for the dealer to print for the Buyer, Co-Buyer (if applicable) and Dealer records.
      - Opens Print Dialogue Box.
      - Printed copies will contain a watermark "Copy" on all pages.
    - DealerTrack will submit the flattened eContract PDF to the lender.

- Dealer will be brought to the Contract Summary page indicating a status of "eContract Submitted" and message to appear indicating eContract is being submitted to the lender.
- "Print Signed Copy" - Presents the dealer with the fully signed PDF in a separate browser to view and print as needed.
- "Cancel" – Pop-up box indicating: "Canceling will delete all eContract information and return you to Application Status. Are you sure this is what you want to do? Yes/No". If the dealer clicks "Yes" then return dealer to the Application Status screen. "Begin eContract Data Entry" functional button, along with all other functional buttons ("Comments to Credit Analyst", "Add Co-Applicant", "Submit to Other Lenders"), will reappear in the Application Status Detail screen. DealerTrack will message the lender advising that the dealer wishes to cancel the eContracting process. If the dealer clicks "No" then return the dealer to the current page.
- "Modify" – If lender participates in data verification, pop-up box indicating; "Data will have to be resubmitted to Lender for verification Are you sure this is what you want to do? Yes/No". If the dealer clicks "Yes" then return the dealer to the Data Entry screen retaining dealer entered/Lender approved data. PDF version of eContract, and fax cover sheet (if applicable) will be deleted. If the dealer clicks "No" then return the dealer to the current page.
  o If lender does not participate in data verification or dealer has elected to spot deliver the vehicle, pop-up box indicating; "Do you wish to Modify Contract Data? Yes/No". If the dealer clicks "Yes" then return the dealer to the Data Entry Screen retaining dealer-entered data. PDF version of eContract, and fax cover sheet (if applicable) will be deleted. If the dealer clicks "No" then return dealer to the current page.

Hyperlinks:
- "Back to Contract Summary" – Return the dealer to the Contract Summary page.

Printing the Signed PDF and Submitting for Funding (Spot Delivery Process)

Once ALL signatures have been obtained, including the dealers', the dealer will print a copy for the customer(s) and dealer records and submit the contract to the lender for funding ONLY UPON RECEIPT of a Credit Approval or Counter-offer from the lender. The dealer will review the printed Fax Cover Sheet, obtain all ancillary documentation, and fax to the lender.

Functionality
- Once ALL required signatures, including the dealers', have been obtained via the Signature Page, the dealer will select "Continue" (figure 20).
- DealerTrack will present the dealer with a page indicating "Processing" while the signature binding is taking place.
- Once AWS has completed processing and binding the signatures, the dealer will be presented with the Contract Status Detail screen (figure 23) and complete Step 1 "Print Signed Copy". When selected the following will occur:

- o The eContract PDF will be presented to the dealer in a separate browser window and a Print Dialogue box will appear.
- o The dealer will select the number of copies to print and destination.
- Once completed, the dealer will close the viewing window, and the Contract Status Detail page will be open.
- DealerTrack will restrict the dealer from submitting the contract for funding until a credit decision has been made.
  - o If a Credit Application has been previously sent to an eContract participating lender, the dealer will have the option to "Select Lenders" (figure 23, step 2).
    - The dealer will be presented with the eContract Select Lenders screen (figure 25) which will indicate the status of submitted applications to eContract participating lenders.
    - The dealer will have the option of selecting an eContract participating lender that has approved the customers credit to submit the contract to by using the Radio Button function.
    - The dealer will be required to select "Compare Application & Contract" (figure 26) which will open the Compare Application & Contract screen.
    - The Compare Application & Contract screen will be segmented to show the chosen lenders approved data and compare it to the completed eContract data.
      - A Blue Background in the differing field will indicate any differences between the data to the dealer.
    - The comparison requirement will allow the dealer to make sure the completed contract is within the selected lenders program criteria.
    - The dealer will Click "Print Fax Cover & Submit for Funding" which will do the following:
      - The selected lenders Fax Cover sheet will be printed for the dealer.
        - o NOTE: Lenders will be required to supply all stipulations required at the time of application approval or counter-offer to ensure the dealer has all required documentation listed.
      - The fully signed, flattened copy of the eContract will be forwarded to the lender along with the contract data XML for the lender to review.
      - The dealer will be returned to the Contract Status screen with the status indicating "eContract Submitted". Once the eContract (Co-Signor Notice and Gap Waiver Form if applicable) has been successfully submitted to the lender, the dealer will be notified via a change in Contract Status (eContract Received).
      - Should an error in submission occur, the dealer will be notified via a change in Contract Status (eContract Submit Error). DealerTrack will provide an 800 # for the dealer to call for assistance.
- NOTE: The dealer will have the option to print additional copies of the contract by selecting "Print Signed Copy" on the Contract Status Detail screen.
- The dealer will review the Bar-Coded Fax Cover Sheet, obtain all required ancillary documentation and fax to the lender.
- Lender's fax server will forward the documentation to the lender imaging system referencing the bar code and match to the eContract.
    - The Buyer will review all ancillary documentation and if all documents have been received, the lender will send DealerTrack an indicator stating the lender's acceptance of the eContract PDF and ancillary documentation. Once the lender's decision to purchase the contract package has been received, DealerTrack will forward the Original contract PDF to the lender.
    - If all ancillary documentation is not received, the lender will notify DealerTrack. The Buyer can send comments to the dealer itemizing the missing documentation through DealerTrack.
    - DealerTrack will display to the dealer a change in Contract Status (ePending Docs).
    - DealerTrack will display the missing documentation comments within the Contract Status Detail Screen.
    - The dealer will obtain the missing documentation and fax to the lender along with the Fax Cover Sheet.
    - Should the dealer require an additional copy of the fax cover sheet, it will be obtained on the DealerTrack site for 7 days after initial submittal.
- Should the Buyer review the contract package and find that the contract package will not be accepted, the lender will forward an indicator stating the lender's decision.
    - Once received by DealerTrack, a status of "eRejected" will be displayed to the dealer.
    - The dealer will have the ability to "Submit eContract to Additional Lender". Please see page 22 regarding Submitting eContract to Other Lender.

Figure 24:
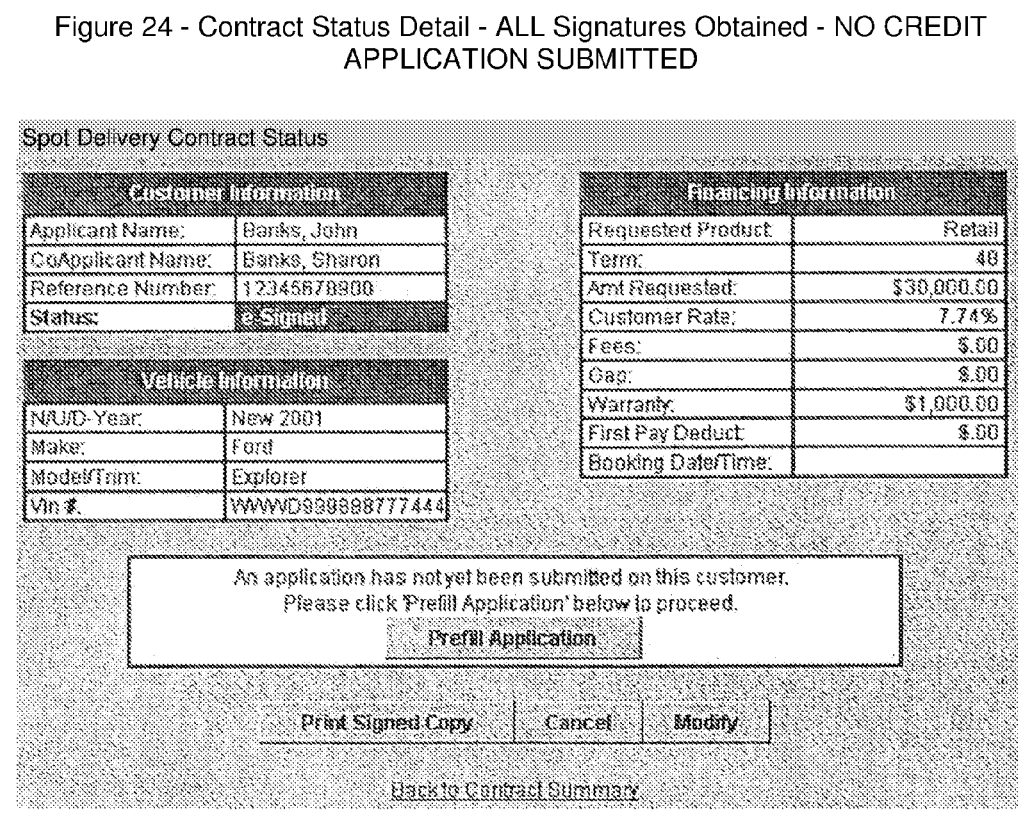

- If a Credit Application has not been submitted to an eContract participating lender, the user will be required to "Prefill Application" (Figure 24).
  - Once selected, DealerTrack will present the user with the Application Data Entry screen prefilled with all available contract data.
    - The Prefilled contract data will be non-editable to the dealer.
  - The dealer will complete the remaining required fields in the Application Data Entry screen and follow the Submit an Application procedure.
    - The dealer will have the option of checking Contract Status Detail/Select Lenders for application status or accessing Application Status.
      - The dealer will have the ability to "Print Fax Cover" sheet and "Submit for Funding" in both locations.

Action Buttons:
- Step 1 "Print Signed Copy" – Will open the signed PDF version of the contract in Adobe for the dealer to print the desired number of copies.
- Step 2 "Select Lenders" - this button will only be active after Print Final Copies has been selected. Once selected, the dealer will be presented with the eContract Select Lenders screen.
- "Cancel" – Pop-up box indicating: "Canceling will delete all eContract information and return you to Application Status. Are you sure this is what you want to do? Yes/No". If the dealer clicks "Yes" then return dealer to the Application Status screen. "Begin eContract Data Entry" functional button, along with all other functional buttons ("Comments to Credit Analyst", "Add Co-Applicant", "Submit to Other Lenders"), will reappear in the Application Status Detail screen. If the dealer clicks "No" then return the dealer to the current page.
- "Modify" – Pop-up box indicating; "Do you wish to Modify Contract Data? Yes/No". If the dealer clicks "Yes" then return the dealer to the Data Entry Screen retaining dealer-entered data. PDF version of eContract, and fax cover sheet (if applicable) will be deleted. If the dealer clicks "No" then return dealer to the current page.

Hyperlinks:
- "Back to Contract Summary" – Return the dealer to the Contract Summary page.

Select Lenders

The dealer will have the option to "Select Lenders" if a prior Credit Approval or Counter-offer has been received from an eContract Participating lender and the dealer has decided to Spot Deliver the vehicle. If no credit application has been submitted to a lender, the dealer will be given the opportunity to submit a credit application prefilled with contractual data to the lenders of their choice. This same screen is utilized if the dealer decides to "Submit the Contract to Another Lender" (eRejected scenario). The Select Lenders page will require the dealer to Compare the Application & Contract or Submit Application to Other Lenders.

Submitting the eContract to Other Lender

The dealer will have the option to Submit the eContract to Other Lender if the first lender of choice has decided not to purchase the contract. This functionality will allow the dealer to submit the eContract to another eContracting participating lender who has approved the customers' credit. If the dealer has not submitted the customers' credit application to the next eContracting participating lender or his choice, DealerTrack will provide the dealer with an option to submit the customers' credit application to other lenders. Once an Approval has been received, the dealer will have the ability to submit the contract to that lender for review.

Functionality

- In the Spot Delivery process, upon receipt of a Credit Approval from an eContract participating lender, DealerTrack will present the dealer with the option to "Select Lender(s)".
- The dealer will click "Select Lender(s)" and DealerTrack will present the eContract Select Lender screen.
- eContract Participating Lenders who have approved this customers' credit will be listed.
    - Any lender who has rejected the contract package or turn-downed the customers' application will be displayed, but will show as unable to submit.
    - The dealer will be able to select ONE lender from this list to submit the contract package to.
    - Upon selecting this lender, the dealer will select "Compare Application & Contract" which will open the Compare Application & Contract screen.
    - The Compare Application & Contract data screen will display the Approved/Counter-offered application data and the Contract data side-by-side for the dealer to review.
        - Any differences between the approved/counter-offered application will be highlighted to the dealer by displaying the differing field in with a blue background.
    - Once the dealer has completed comparing the data, the will select "Print Fax Cover & Submit for Funding".
        - The DealerTrack created Fax Coversheet, complete with all lender stipulations and itemized ancillary documentation, will open in a separate window. The dealer will print the fax cover sheet and close the window.

- ▪ The flattened version of the eContract will be sent to the lender for funding review purposes. Please refer to page 34 for additional information regarding the funding process.
- Optional: the dealer will have the ability to "Submit Application to Other Lenders":
  - o Once selected, DealerTrack will present the deal with the Application Select Lender page.
  - o The dealer will select the lenders which they wish to submit this application to.
  - o The dealer will check Application Status for approval, counter-offer or turn-down from the lender.
  - o If an eContracting lender approves the application, the dealer will access the Contract Status Detail for this customer and select "Select Lender(s)".
  - o DealerTrack will present the eContract Select Lender(s) screen and reflect this lender in the "eContract Participating Lenders who have approved this customers' credit" section. Please see page 43 for additional information regarding the Select Lenders page.

Action Buttons:
- "Prefill Application" – DealerTrack will prefill the Application Data Entry screen with all available contract data (credit bureau data if applicable).
- "Print Signed Copy" - Presents the dealer with the fully signed PDF in a separate browser to view and print as needed.
- "Cancel" – Pop-up box indicating: "Canceling will delete all eContract information and return you to Application Status. Are you sure this is what you want to do? Yes/No". If the dealer clicks "Yes" then return dealer to the Application Status screen. "Begin eContract Data Entry" functional button, along with all other functional buttons ("Comments to Credit Analyst", "Add Co-Applicant", "Submit to Other Lenders"), will reappear in the Application Status Detail screen. DealerTrack will message the lender advising that the dealer wishes to cancel the eContracting process. If the dealer clicks "No" then return the dealer to the current page.
- "Modify" – If lender participates in data verification, pop-up box indicating; "Data will have to be resubmitted to Lender for verification Are you sure this is what you want to do? Yes/No". If the dealer clicks "Yes" then return the dealer to the Data Entry screen retaining dealer entered/Lender approved data. PDF version of eContract, and fax cover sheet (if applicable) will be deleted. If the dealer clicks "No" then return the dealer to the current page.
  - If lender does not participate in data verification or dealer has elected to spot deliver the vehicle, pop-up box indicating; "Do you wish to Modify Contract Data? Yes/No". If the dealer clicks "Yes" then return the dealer to the Data Entry Screen retaining dealer-entered data. PDF version of eContract, and fax cover sheet (if applicable) will be deleted. If the dealer clicks "No" then return dealer to the current page.

Hyperlinks:
- "Back to Contract Summary" – Return the dealer to the Contract Summary page.

Select eContract Lender:
o Note: The dealer will only be able to select ONE lender from this list.
o Each eContracting participating lender who has approved the customers credit will appear in this section.
- o The lender who did not approve the customers credit or rejected the contract package will be crossed out and the dealer will be unable to select that lender.
- o The Non-Eligible lenders will be listed below indicating a reason for ineligibility.

Action Buttons:
o "Compare Application & Contract"
- o Will open the Compare Application & Contract screen.
o "Submit Application to Other Lenders"
- o DealerTrack will present the dealer with the Application Select Lenders page.

Link:
- "Back to Contract Status Details" – Return the dealer to the Contract Status Detail for this customer.

Compare Application & Contract Screen
o The dealer will be required to review the approved/counter-offered application data to the completed eContract to ensure it meets all lenders program perimeters.
o Any differences between the application and contract data will be indicated to the dealer by displaying a blue background in the differing field.

Action Buttons
o "Comments to Credit Analyst"
- o Will allow the dealer to send comments directly to the lenders analyst (if available with the lender).
o "Print Fax Cover & Submit for Funding"
- o The fax cover sheet will open in a separate window for dealer printing purposes. The flattened version of the eContract will be sent to the lender for funding review purposes.
- o The dealer will be returned to the Contract Status Detail page indicating a status of eContract Submitted.

Fax Cover Sheet Requirements

The fax cover sheet will be created separately from the contract PDF and at the time the dealer chooses the lender to submit the completed (fully signed) contract to. DealerTrack will create a generic template separated into four sections:
1. Customer/Dealer/Lender data to be completed by DT:
    - To be displayed on the top of each page:
        - Bar-code created by DT using the lenders supplied Ref# (placement must be in accordance with lenders' fax server settings)
        - Customer(s) Name(s)
        - Lender Name
        - Dealer Name
        - Reference Number
    - To be displayed on the bottom of each page:
        - Bar-code created by DT using lenders supplied Ref# (placement must be in accordance with lenders' fax server settings)
        - Lender Fax Number
        - Lender statement of funding commitment
2. Standard required supporting documentation completed by DT (unless lender decides to send at time of credit approval – Chase?)
    - Signed Credit Application
    - New Car Invoice or Used Car Book-out
    - Title Application
    - Agreement to provide insurance or proof of insurance
    - Assignment
3. DT completed supporting documentation identified by fields completed on the data entry screen.
    - Copy of Service Contract
    - Copy of Warranty Contract
    - Copy of GAP Contract
    - Copy of Credit/Life/Disability Contract
4. Stipulations/comments supplied by the lender. Lenders will be required to supply ALL stipulations upfront at the time of application approval/counter-offer.
    - This section will be completed using the lenders freeform text from stipulations and comments.

The fax cover sheet will contain a bar code created using the lenders unique application identifier. This bar code will appear both n the top and bottom of the sheet to allow the fax server to identify the bar-code regardless of way faxed by dealer (top up/down).

Accessing the eContract via Contract Status

The dealer will be able to drill down into the contract detail. The functions available to the dealer will depend upon the eContracting status of the given customer. DealerTrack will provide the dealer with the option of printing additional customer or dealer copies of the eContract as well as the bar-coded fax cover sheet after submitting to the lender for funding. In addition, DealerTrack will save the eContracting data and documentation as follows:

- Saved Contract data will be saved until the Credit Approval has become inactive.
- An eSigned Contract will be good for 19 days from the Note Date.
- eLender Verified and DTVerified statuses will be good for 5 days from the note date.
- Booked/Funded Contract data will be saved in Contract Status for 60 days. The PDF version of eContract, fax cover sheet and Co-Signor Notice (if applicable) will be available for 7 days.

Contract Status Detail

| Field | Description |
|---|---|
| eContract Status | See below for eContract Status Indicators |

*eContract Status Indicators

| APS Indicator | Web Translation |
|---|---|
| | eSaved |
| | eSubmitted |
| | eReceived |
| | eSubmit Error |
| | eLender Verified |
| | eDT Verified |
| | eReview |
| | eCancel |
| | eError |
| | ePartially Signed |
| | eSigned |
| | eContract Submitted |
| | eContract Received |
| | eContract Submit Error |
| | ePending Docs |
| | eBooked |
| | eFunded |
| | eRejected |

*Note: The lender will be required to code their respective indicators to the generic translations supplied.

- Each link will bring the dealer to the Contract Status Detail Screen. Functional buttons will differ based upon contract Status:
    - *eSubmitted/eReceived/eReview* Contract Status Detail screen will allow the dealer to go back to the Contract Status screen via a "Back to Contract Summary" link. The dealer will not have access to the Contract Data Entry screen after submitting to the lender for verification until an eError or eLender Verified status is received.
    - *eSaved* Contract Status Detail screen will allow to the dealer to enter the eContract Data Entry screen retaining dealer-entered data via the button "Continue eContract Data Entry".

- *eError* Contract Status Detail screen will allow the dealer to enter the Contract Data Entry Screen displaying the error.
- *eLender Verified/eDT Verified* Contract Status Detail screen:
    - Will allow the dealer to print review copies (forced print) and access to the AWS Overview page which will guide the dealer through signature capture, print of final copies, and submittal of final documentation.
- *ePartially Signed* Contract Status Detail screen will allow the dealer to reenter the Silanis Overview Page to obtain the remaining signatures via the button "Continue".
- *eSigned* Contract Status Detail screen will allow the dealer to "Submit eContract for Funding":
    - If the vehicle has been spot delivered and the credit application for the customer has been Declined or Counter-offered, the dealer WILL NOT have the opportunity to submit the contract for funding. Please refer to the section "Submitting the eContract to Other Lender".
- *eContract Submitted/eContract Received/ePending Docs* - Contract Status Detail screen will allow the dealer to view lender comments indicating missing ancillary documentation, return back to Contract Status via a "Back to Contract Summary" link or view the eContract PDF via the "Generate Final eContract" button.
- *eBooked/eFunded* Contract Status Detail screen will allow the dealer to return back to Contract Status via a "Back to Contract Summary" link or view the eContract PDF via the "Generate Final eContract" button.
- *eSubmit Error/eContract Submit Error* – Will present the dealer with the Contract Status Detail screen including the 800# for DealerTrack Customer Service.
- *eCancel* – Will present the dealer with the Contract Status Detail screen along with comments from the lender. DealerTrack will present the dealer with a button to "Return to Application Status".
    - If the dealer chooses to "Return to Application Status", DealerTrack will remove the customer from Contract Status and return the dealer to Application Status.
    - Application Status will reflect a counter-offer or turndown status on the customer.
    - The dealer will be required to rehash the deal with the lender and receive an approval or counter-offer in order to begin the eContract process again.
- *eRejected* Contract Status Detail screen will allow the dealer to "Select Lender(s)".
- Note:
    - Message will appear in Contract Status Detail screen, under financing information, for all e(status'), other than those in the spot process where a lender has not yet been identified, indicating:

- "(Lender name) supports same day funding if all contract data, including faxed ancillary documentation, is in house and verifiable by X:XX PM Local time Monday thru Friday. If received after this time, funds will be remitted the following business day."
- Should an Approved or Counter-offered application become inactive prior to achieving the Contract Status of eDocs Received, the customer and relating data will be removed from Contract Status.

Printing Additional Copies

DealerTrack will save the Contract and Fax Cover Sheet for seven days after submittal to the lender. The dealer will have the ability to access the PDF files and print additional copies. The Contract PDF and Fax Cover Sheet will be separate, but can be printed at the same time.

Securitization Vault Functional Requirements

Functional Description

The Securitization Vault product provides member dealers, member lenders and special access users with access to the DealerTrack hosted vault. The vault is designed to allow users access to the electronic contracts that they either originated or purchased. Dealer users will only have access to the vault for viewing and printing of copies of the electronic contracts they have originated. Lender users will have the same functionality but will also have administrative rights over the electronic contracts they have purchased.

*Securitization Vault Functionality*

The vault will be housed on the DealerTrack servers and will be administered using the current User Administration function within DealerTrack. Additional permissions will be added to the existing permissions and will be governed by the DIO and LIO of the respective dealership and lender. The vault will store all electronic contracts for a period equaling, the life of the account plus seven years. Electronic contracts will be added to the vault real time and real time access is also required. Permissions for dealer users versus lender users will vary. The Vault access will be found under the existing Administration tab with a new link to the "Securitization Vault" page. The permission level of the user will determine what functionality they get to see. (See Figure 28).

Dealer users will have the ability to view a copy of any electronic contract they have originated. The on screen display will present a "copy" watermark on the screen. Dealer users will also be capable of printing such copy and each printed version will also have a "copy" watermark.

Lender users will, in addition to the viewing and printing of copies, be able to perform administrative functions. They will be able to export contracts to various media, including cd, tape and paper. They will be able to view the "original" contract stored in the vault (will present a "View of Original" watermark). Lender users will be capable of converting an electronic original to a paper original using the patented "paper out" approach as designed by eOriginal. All activities within the vault will be logged in the DT system and any ownership changes will be included in the Registry. The registry is also housed on the DealerTrack system and acts as the audit trail of ownership for each contract. Lender users will have access to view the Registry in addition to the contract.

Dealer User

The securitization vault page will provide the dealer user with the capability to select the appropriate electronic contract, which they would like to view and/or print a copy of. The user cannot in any way view contracts that were not originated by the dealer that they are associated with. In addition, users will be able to request contract to be exported to paper. These contracts can't be assigned to a lender and if they are assigned to a lender the checkbox will be grayed out. If they are not assigned to a lender, the user can select the appropriate contract(s) and request that DealerTrack "paper out" those contracts on the dealer's behalf. A pop up box will be presented to the dealer to ensure they are aware that if they continue with the export process, the electronic original (authoritative copy) will be destroyed. The screen display will provide details on the following:

*Header Section*

| Field | Type | Description |
|---|---|---|
| Date | System | MM/DD/YYYY |
| Customer Name | List | List of Customers Names |
| Contracts | Hyperlink | Copy link to contract for viewing/printing purposes |
| Request Export | Checkbox | User identifies which accounts to Export |

*Hyperlink*

Copy: Opens Adobe and brings up the fully executed pdf file for the dealer to view and print. Both the on screen version and the printed version have a "copy" watermark.

*Action Button Functionality*

Submit Request to Export: Submits the request to DealerTrack to export the contracts to paper.

Figure 29:
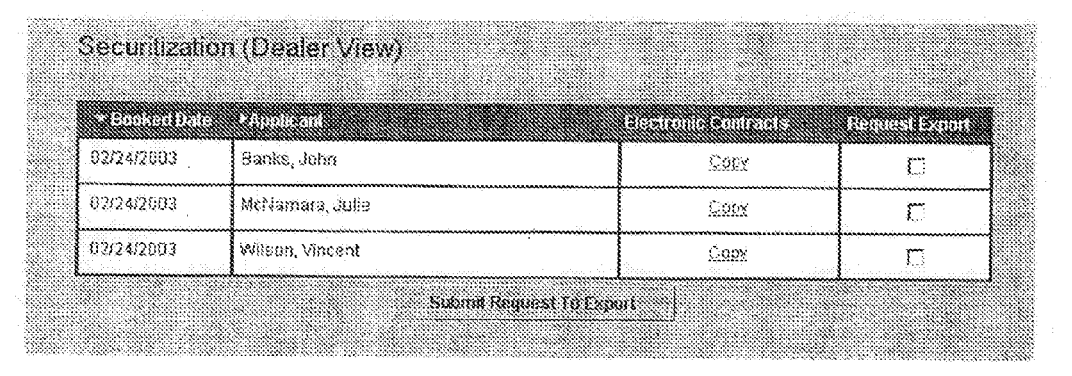
Figure 30:
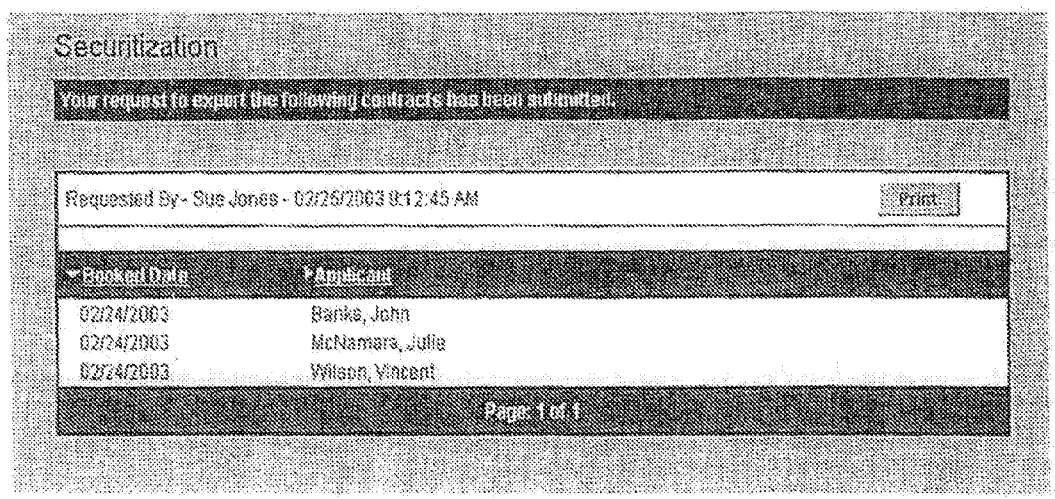

*Screen Captures: See Figures 29-30*

Lender User

Lender users will have permissions that will allow them to view a copy, view an original, view the registry and export contracts to cd, tape and paper. Users will be able to print out copies and the respective copies will be watermarked accordingly. If the user selects a contract or contracts to be exported, DealerTrack will display a pop up dialogue box to ensure that the user is aware that they are exporting the contracts and that the electronic version will be destroyed. Upon confirmation of the export dialogue box, DealerTrack will provide the user with a confirmation screen indicating who exported the contracts, which contracts were exported, to what media and the date and time of the export.

*Header Section*

| Field | Type | Description |
|---|---|---|
| Date | System | MM/DD/YYYY |
| Customer Name | List | List of Customers Names |
| Contracts | Hyperlinks | Copy, Original, Registry |
| Export | Checkboxes | User identifies which accounts to select for exporting purposes |
| Select | Radio | CD, Tape, Paper. User selects the media that they |

| Field | Type | Description |
|---|---|---|
| | Buttons | want the selected contracts exported to |

*Hyperlinks:*

Copy: Opens Adobe and brings up the fully executed pdf file for the dealer to view. All viewed copies display a "copy" watermark. User can print a copy from Adobe. All printed copies display a "copy" watermark.

Original: Opens Adobe and brings up the "original" fully executed pdf file for the dealer to view. All viewed originals display a "view of original" watermark both on screen and in the printed version.

Registry: DealerTrack presents a formatted page listing the registry information for the user to view and/or print.

*Action Button Functionality:*

Export: sends a message to DealerTrack indicating which contracts (and media type) the lender wants DealerTrack to export.

Figure 31:
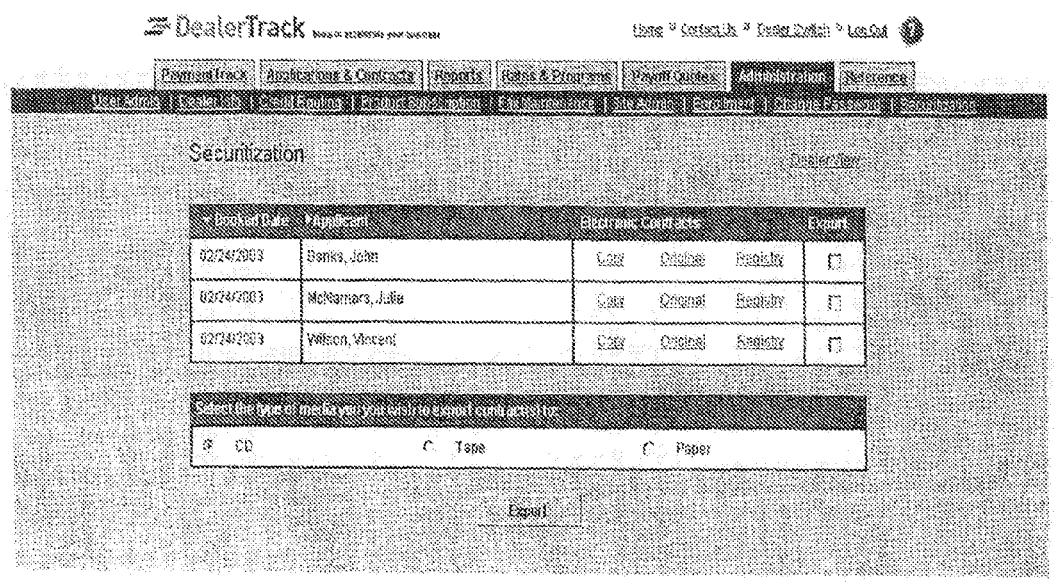
Figure 32:
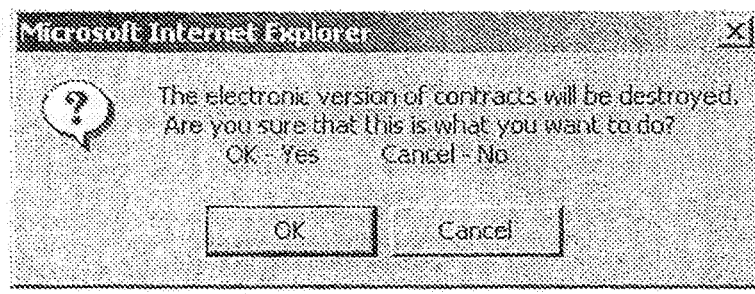
Figure 33:
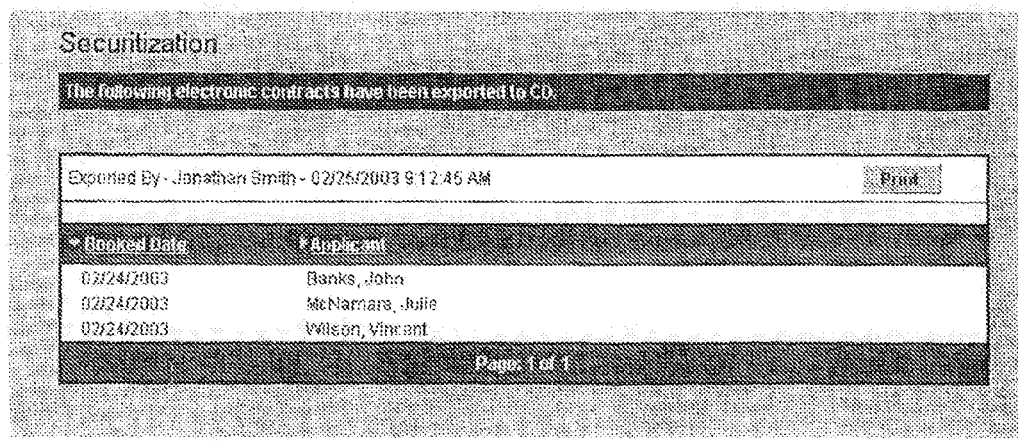
Figure 34:
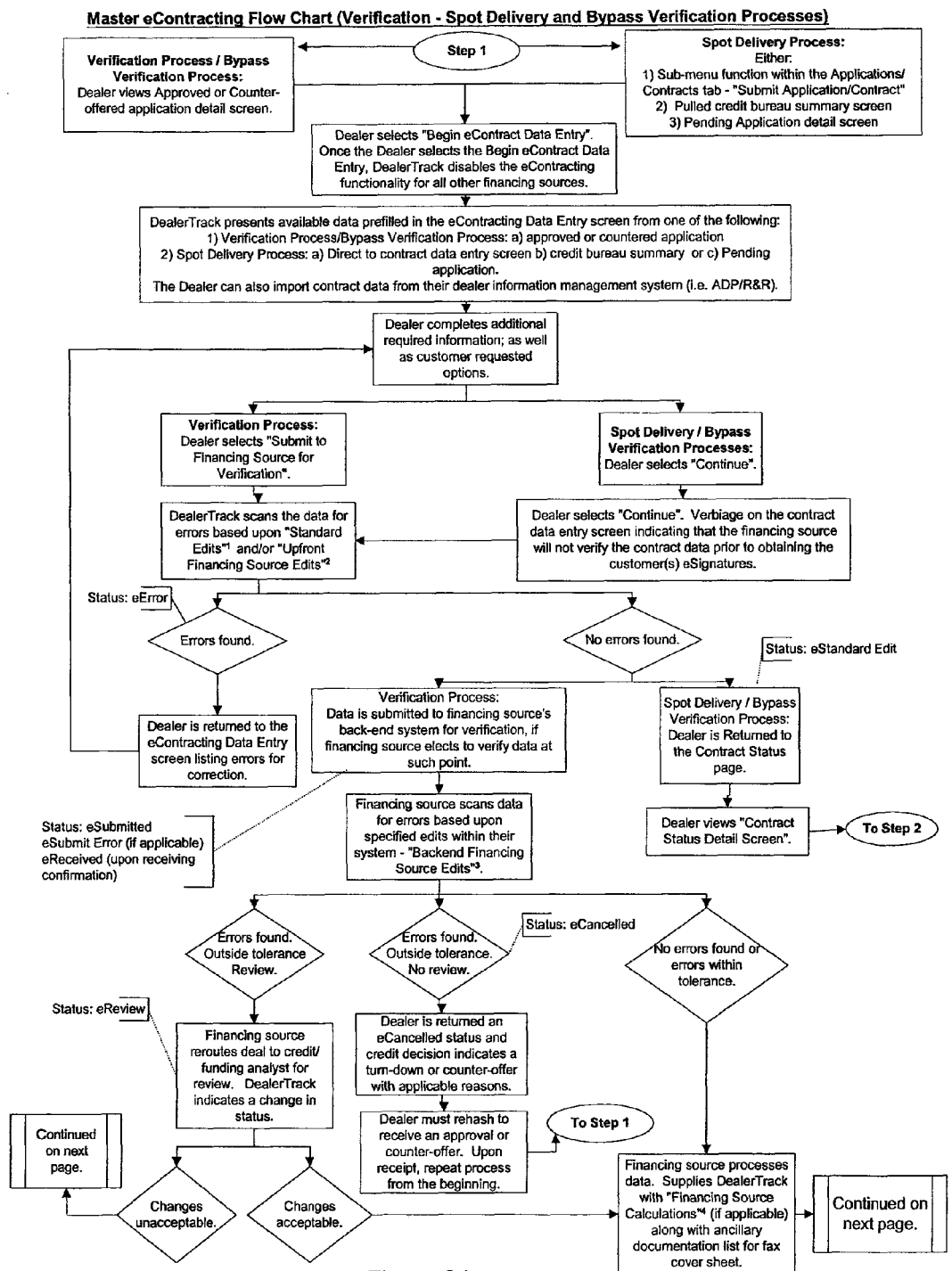
Figure 35:
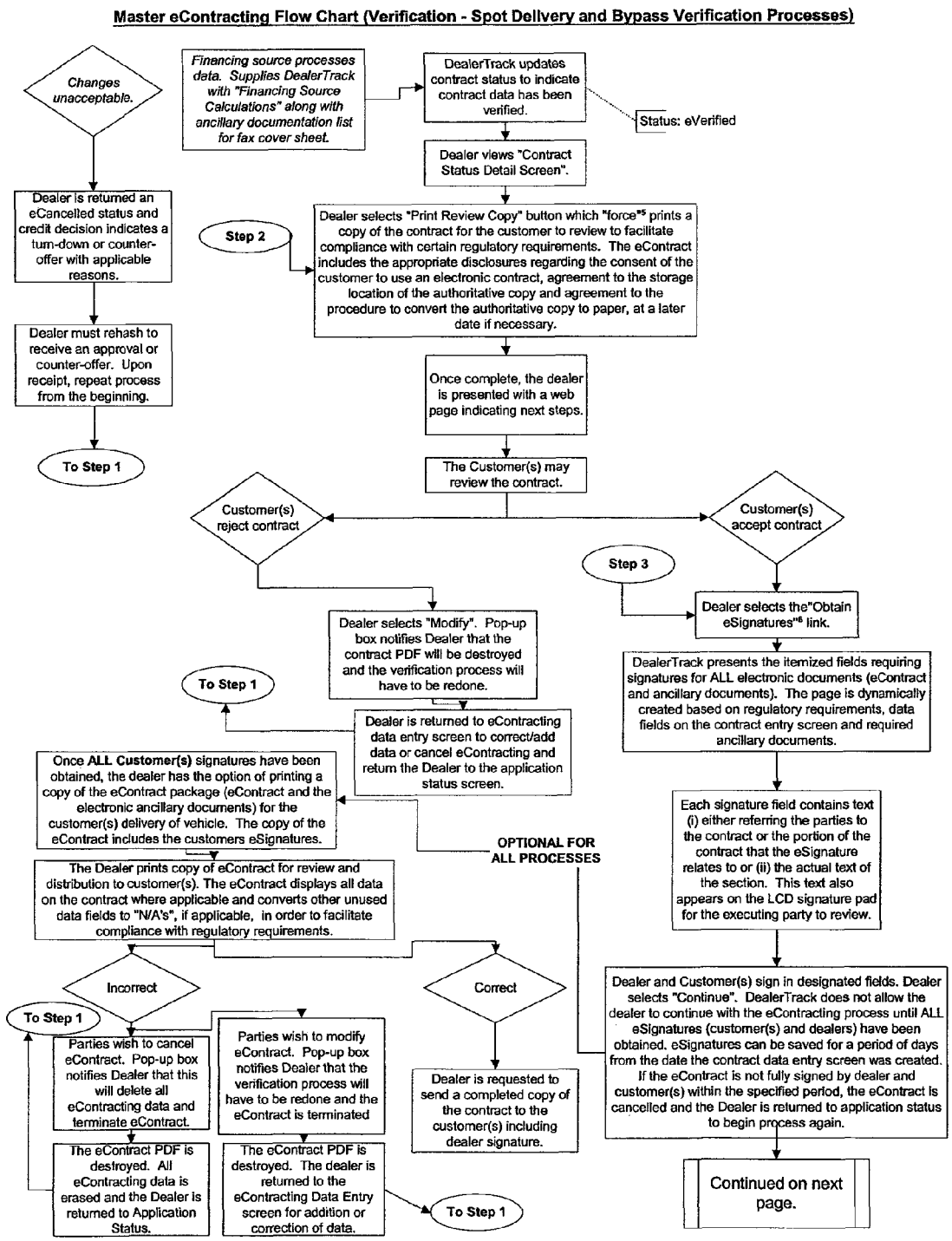
Figure 36:
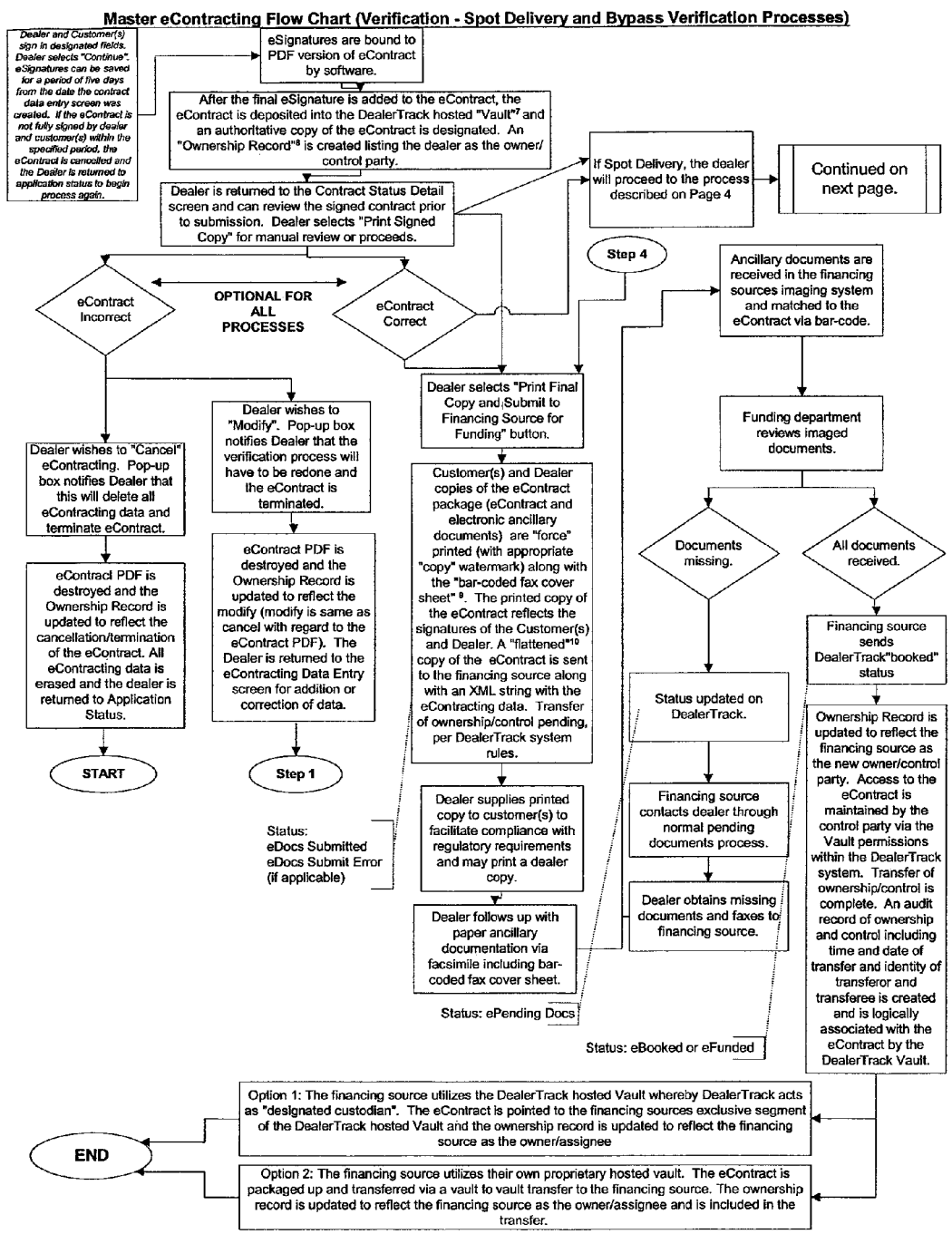
Figure 37:
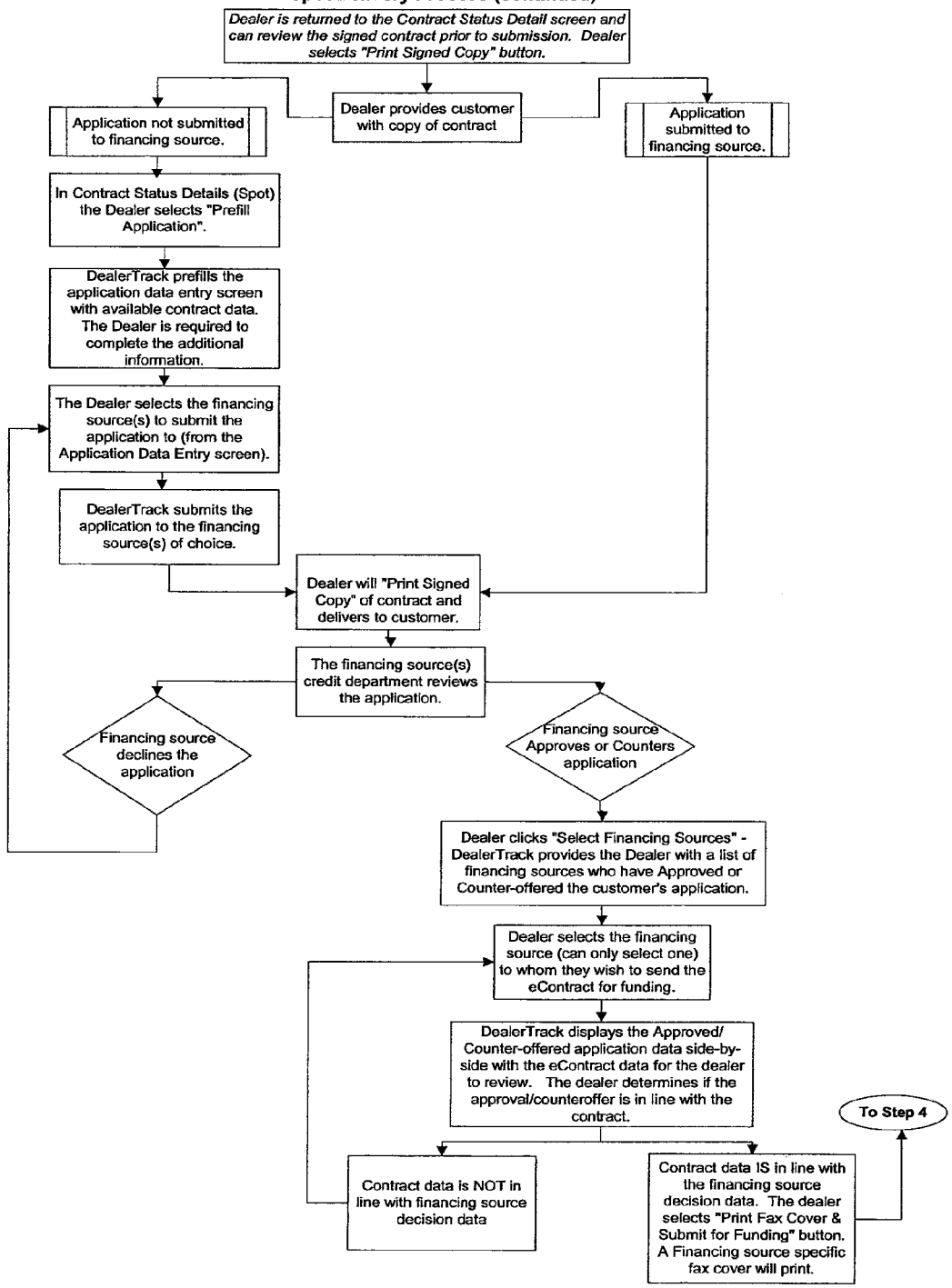
Figure 39:
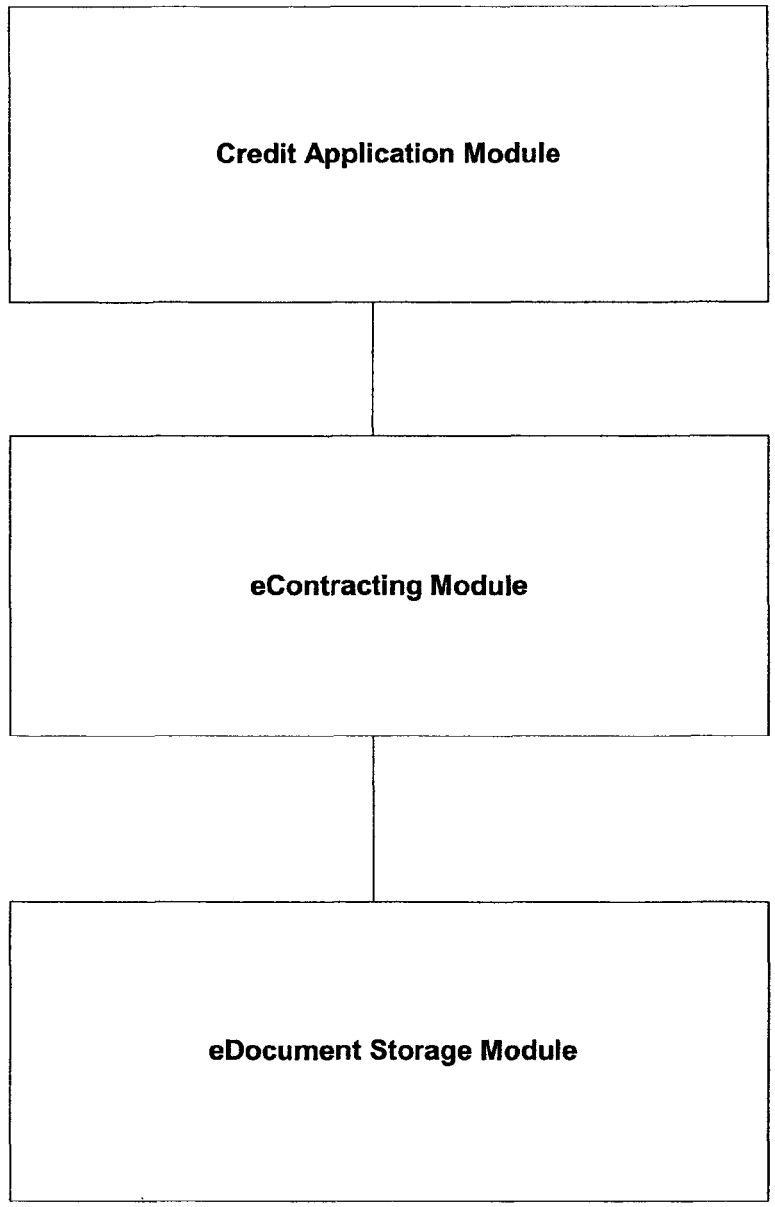

*Screen Captures: See Figures 31-33*

Electronic Contracting and Securitization for the Automotive Finance Industry

Overview

II. Summary

DealerTrack's eContracting solution marks the next step in the transformation of the traditional automobile financing process. The solution allows dealers and financers to complete the entire contracting process electronically. Unlike the traditional paper-based finance process, which typically takes days or weeks from start to finish, DealerTrack's eContracting solution transfers data from the credit application to an online contract form, which is validated against a financer's system to ensure accuracy. Once validated, dealers use electronic signature pads to capture participants' signatures, and then electronically submit eContracts to financers. The solution enables a dealer to receive same-day funding upon the financer's acceptance of all ancillary documentation.

A. Benefits

The DealerTrack eContracting solution provides benefits to both dealers and financers.

Financer benefits include:

| Benefit | How |
| --- | --- |
| Improve processing efficiencies | eContract data is automatically entered into a financer's processing system. |
| Eliminate contract data errors | Standard eContract forms perform online edit checks as the dealer enters data. |
| Reduce manual intervention by a credit analyst | Credit application and eContract data is verified prior to submission to financer. |
| Lower cost of doing business | Systematic verification of data by financer reduces the credit/documentation analyst's review process. |
| Improve customer service to dealers | The solution reduces the number of returned contracts and improves response time. |
| Generate incremental volume | Dealers can book more business with financers on the system. |

Dealer benefits include:

| Benefit | How |
|---|---|
| Improve customer satisfaction | Familiar signature capture device eases customers into eContracting and discloses more information than paper process. |
| Reduce contracts-in-transit | Credit applications and eContracts are transmitted electronically to financers for same day funding. |
| Eliminate contract data errors | The solution automatically pre-fills eContracts with credit application and decision data. |
| 24/7 access to contracts | The solution reduces paperwork and the waiting time for callbacks on funding status. |
| Reduce shipping costs | eContracts are transmitted electronically to financers so submission of original paper documents is no longer required. |

B. Product Capabilities

DealerTrack's eContracting solution provides dealers and financers with a true end-to-end electronic process. From credit application submission to contracting, the process is entirely electronic. The financers can also securitize the eContracts in accordance with the requirements of:

- Uniform Electronic Transactions Act (UETA)
- Federal Electronic Signatures in Global and National Commerce Act (E-SIGN)
- Revised Uniform Commercial Code Article 9 on Secured Transactions (Revised Article 9)

The eContracting process is as follows:

Fulfillment/Installation

In order to participate in the DealerTrack platform, a dealer must do business with at least one financer who participates electronically on the DealerTrack platform. Once enrolled on the DealerTrack platform, a dealer may subscribe to the DealerTrack eContracting solution. An authorized user within the dealership is required to complete the subscription process. DealerTrack automatically assigns eContracting permissions to a Dealer Information Owner (DIO). The DIO is an authorized user who has the ability to add, delete and modify user access to the DealerTrack platform. The DIO can utilize the Product Subscription functionality to obtain detailed information about the eContracting solution and enroll online.

The dealer's subscription is processed and the electronic signature pad(s) are ordered on behalf of the dealership. Upon receipt of the signature pad and supporting software, the dealer completes the self-installation.

Data Entry and Verification
DealerTrack's eContracting solution provides a dealer with the capability to complete the application/contract process completely online. The solution allows a dealer to enter contract specific data by incorporating the application data, as well as the approval/counteroffer data as determined by the financer. The DealerTrack software application performs generic edit checks to ensure that all required data is entered prior to submitting to a financer for review. The data is submitted to the financer via a DealerTrack-defined eXtensible Markup Language (XML)[1] message, which updates the financer's origination system. The financer validates that the contract data matches its decision parameters.

eContract Creation and Signature Capture
DealerTrack merges the validated data with the state-specific eContract. Prior to signing, the system requires that the eContract, with its integrated disclosures, be printed and presented to the customer for review. Upon satisfactory review of the eContract, the dealer obtains the customer(s) signatures using an electronic signature pad. The signatures are captured, stored and bound to the contract in Adobe's Portable Document Format (PDF)[2]. The eContract, including the embedded graphic signatures, is displayed to the dealer and printed for the customer. An eContract cannot be submitted to a financer until all signatures have been captured.

Financer Review and Funding
Once all signatures are captured, the dealer submits the contract and its associated data to the financer for review. The financer updates its origination system and reviews the eContract. The dealer faxes all ancillary documents required to fund the deal. Upon successful review of the eContract and ancillary documentation, the financer books the eContract and notifies the dealer that the contract is authorized for funding.

Transfer of Control and Ownership Record[3]
DealerTrack's system automatically updates the ownership record to reflect the transfer of control from the dealer to the financer. The ownership record reflects all transfers of control until the eContract is removed from the DealerTrack system. The financer has two options for storing purchased contracts during the transaction lifecycle. eContracts can be stored in the DealerTrack-hosted vault (DealerTrack eVault™) in a financer's

---

[1] Extensible Markup Language – is a pared down version of the Standard Generalized Markup Language, SGML, designed specifically for Web documents. It enables designers to create their own customized tags to provide functionality not available with Hypertext Markup Language, HTML. XML enables servers attached to the web to communicate structured exchanges of data to each other.

[2] Portable Document Format – is the file format for documents viewed and created by Adobe's Acrobat Reader, Capture, Distiller, Exchange and the Acrobat Amber Plug-in for Netscape Navigator.

[3] Ownership record - is the historical trail of ownership changes. The ownership record is created when a fully executed eContract is stored in the DealerTrack eVault. It tracks all transfers of ownership as well as other transactions such as terminations, export to financer (vault), export to financer (send), payoffs and charge-offs.

exclusive segment. Alternatively, purchased contracts may be transferred directly to the financer's system using a vault-to-vault transfer.

DealerTrack eVault

A financer maintains full control over the eContracts stored in the DealerTrack eVault, as if they were in its proprietary system. Using the eVault, a financer is able to access its eContracts using a graphical user interface (GUI). The interface provides a financer with the following eContracting capabilities:

- Searching
- Sorting
- Viewing
- Printing
- Creating securitization pools
- Transferring ownership
- Exporting In addition to the user interface, a financer is able to manage eContracts through an interactive programming interface between their respective servicing system and DealerTrack. All contract management is communicated to DealerTrack via messaging and an Application Programming Interface[4] (API).

C. Legal Framework

1. Background

The automobile finance industry has long relied on paper documents to memorialize agreements, both with the consumer and the parties to the financing. The laws regulating automobile financing have historically required that retail installment sales contracts be in writing to be enforceable. In addition, the contracts had to be signed. As the use of electronic commerce and the drive to eliminate paper documentation has spread, state and federal lawmakers have reviewed and rethought these requirements. Both state and federal law now accommodate the use of electronic records and signatures in retail installment sales contracts.

In 1999, the National Conference of Commissioners on Uniform State Laws (NCCUSL) promulgated UETA. UETA establishes a set of uniform rules for electronic equivalents of writings and signatures in most business transactions, including consumer automobile financing. To date, UETA has been adopted in some form in 40 states plus the District of Columbia. In 2000 the president signed E-SIGN. It adopts most of the significant rules of UETA and uses those rules to create a federal "baseline" for acceptance of electronic records and signatures under federal law, and under state law in states that have not adopted UETA.

---

[4] Application Programming Interface – is a set of definitions of the ways in which one application can communicate with another.

NCCUSL also completed work on Revised Article 9 of the Uniform Commercial Code (UCC) in 1999. Revised Article 9 governs transactions where a security interest is taken in personal property, such as an automobile. Revised Article 9, now adopted in all 50 states and the District of Columbia, authorizes the use of electronic records and signatures to create enforceable security agreements. This is important because retail installment sales contracts usually contain a security agreement as part of the contract, granting a security interest in the automobile to secure payment of the contract.

Revised Article 9 also creates special rules for perfecting an ownership interest in an electronic retail installment sales contract. These special rules are necessary because the old rules assumed that the contract was on paper, and gave a person who had physical possession of the paper important rights. Physical delivery of the original retail installment sales contract to the transferee was almost absolute proof of the transferee's right to enforce the underlying payment obligation. The transferee possessing the paper did not have to worry that a third party, such as another financer, would claim to own an interest in the contract or a right to enforce the underlying obligation.

It is not possible to give an individual person physical "possession" of an electronic record in the manner of a paper record. So, in order to make an electronic retail installment sales contract commercially acceptable, it was necessary to create new rules in Revised Article 9 that give the purchaser of the eContract the same rights given to the purchaser of a paper contract through the use of "control" of the eContract rather than physical possession of it.

2. *New Rules*

The basic rules under UETA, E-SIGN and Revised Article 9 that are most important for electronic retail installment sales contracts are:

- The eContract may be created and stored in electronic form, so long as the customer signing the eContract agrees and receives a copy of the eContract to keep;
- The eContract may be signed using an electronic signature; and
- A purchaser of the eContract can have all the same special rights as the purchaser of a paper contract as long as certain special requirements are met for creating and storing an "authoritative copy" of the eContract and keeping track of transfers of ownership.

An "electronic signature" under UETA and E-SIGN is an "electronic sound, symbol, or process attached to or logically associated with a record and executed or adopted by a person with the intent to sign the record." A digitized hand-written signature is included within this definition. Revised Article 9 uses a different definition, but also recognizes a digitized handwritten signature as a method for signing an electronic security agreement.

Revised Article 9's special requirements for creating, storing and transferring an ownership interest in the eContract are:

- Once the eContract is signed, there is always a single authoritative copy of the eContract that can be identified and distinguished from all other copies of the eContract;
- After being signed, the authoritative copy must be unalterable without the alteration being detected and identified as either an authorized or unauthorized change;
- The authoritative copy in some way provides a way to identify the person in "control" of the record (meaning the person entitled to transfer an ownership interest);
- The authoritative copy is transmitted to and maintained by either the person in control or someone acting as a custodian for that person; and
- Control can only be transferred with the approval of the person already in control.

3. DealerTrack's eContracting Solution

DealerTrack's eContracting solution takes advantage of these new laws and facilitates the creation, management, execution, and transfer of ownership of electronic retail installment sales contracts.

The standardized electronic retail installment sales contracts used by participating financers include the customer's agreement to use electronic records and signatures to create the contract. This satisfies the requirement that the customer agree to the use of electronic records and signatures.

The customer's handwritten signature is captured on an electronic signature pad and added to the electronic record as a graphic. This procedure complies with the requirements under the new laws for creation of an electronic signature.

A paper copy of the completed, signed eContract is printed out at the time of signing for the dealer to deliver to the customer. This satisfies the requirement that the customer receives a copy of the eContract to keep.

DealerTrack's document management system provides controls to address the special requirements that must be met for transfers of ownership. In particular, the DealerTrack eContracting solution keeps the eContract secure from unauthorized changes, and provides a secure method for tracking transfers of ownership interests in the eContract. Once all the signatures are captured, the signatures are securely bound to the eContract using signature capture/binding software, which results in creation of the "authoritative copy" required by Revised Article 9. The authoritative copy of each fully executed eContract is stored in the DealerTrack eVault.

The ownership record entry created within the vault structure initially lists the dealer as the owner of the contract. The eContracts and signatures are authenticated by the eOriginal eCore™ Business Suite software and placed into the DealerTrack eVault with an additional digital signature to further secure the document. The system ensures that the authoritative copy is not tampered with in any way and tracks all revisions and modifications to the eContract as such within the ownership record. Upon a transfer of ownership of the authoritative copy of the eContract, the transferee is listed as the owner of the eContract with full ownership rights and the ability to grant permissions regarding the eContract. This process meets the requirements of Revised Article 9 for "control" of the eContract.

*4. Disclosures*

E-SIGN and some states adopting UETA have created special rules for delivering disclosures and notices to customers electronically. However, these rules only apply if the disclosures are delivered in electronic form. DealerTrack's eContracting solution provides the dealer with paper copies of the disclosures to give to the customer, both before and after the eContract is signed. The customer gets exactly the same disclosures and notices as before, in exactly the same format: paper.

E. Evolution of eContracting in the Automotive Finance Industry

The automotive finance industry is taking a leadership role in the evolution of electronic documents and digital signature technology. The mortgage industry has laid a foundation for electronic contracting and securitization for the automotive finance industry. A tremendous amount of due diligence has been completed regarding the E-SIGN laws and the acceptability/enforceability of electronic documents and digital signatures. Although there has been a significant amount of effort by the mortgage industry participants, they have yet to push the industry to utilize electronic documentation from pilot mode into production. The automotive finance industry is forging ahead to full production mode for eContracting and securitization.

Through partnerships with major dealer management systems, DealerTrack will support electronic ancillary documents that enable a truly paperless process between the dealer and financer. The addition of other types of electronic chattel paper, such as balloon payment and lease contracts, will further increase dealer and financer efficiencies.

Lastly, the industry may decide to pursue a broader goal of creating a national registry, whereby financers, investors and third parties conduct transactions utilizing a common registry. Users can access the national registry to view ownership of contracts and to initiate/confirm the transfer (buy/sell) of ownership among parties within the network. DealerTrack's involvement in industry standards definition and open standards-based architecture make it confident that the DealerTrack eVault and ownership record for eContracts are transferable and acceptable within a national registry. DealerTrack has the capability to integrate with various third parties, e.g. investors, buyers, sellers, auditors. Potentially, DealerTrack envisions that its eContracting solution could provide the basis for the national registry.

F. Conclusion

DealerTrack's eContracting solution provides the automotive finance industry with the ability to create enforceable electronic retail installment sales contracts. As part of the solution, DealerTrack uses standardized retail installment sales contracts created and maintained by Hudson Cook, LLP to ensure compliance with federal and state laws. The eContracting process significantly reduces funding turnaround time and shipping costs for dealers, while at the same time provides significant productivity gains for financers.

The DealerTrack eVault provides participants with a secure storage environment that permits eContracts to be securitized in accordance with UETA, E-SIGN, and Revised Article 9. The system provides self-service administration and robust management of contract portfolios, both through programmable interfaces and an easy-to-use web-based application.

DealerTrack has retained independent counsel to provide a reasoned opinion on its eContracting solution for compliance with UETA, E-SIGN and Revised Article 9, including but not limited to:

- System business processes

- Electronic signature capture and binding
- Storage and access to the eContracts DealerTrack is transforming the automotive finance industry from a paper intensive environment to a more efficient electronic process. DealerTrack is committed to actively participate with all interested parties to ensure the benefits of this transition are fully realized by all industry participants, e.g. dealers, financers, investors.

DealerTrack's eContracting solution provides the only mechanism available today for participants to perform fully electronic retail installment sales contract transactions.

III. Process Overview

DealerTrack has taken the initiative to develop an eContracting solution that facilitates compliance by a financer with the applicable requirements of UETA, E-SIGN and Revised Article 9. This section describes the process for creating, signing, transferring and storing eContracts.

DealerTrack's eContracting solution currently supports retail installment sales contracts and will be expanded to support balloon payment and lease contracts. The eContract is created entirely online and no paper retail installment sales contract needs to be sent to a financer. The eContract is executed by obtaining signatures via an electronic signature pad. The eContracting functionality is designed to support either:

- A Standard process, which is used when an application has either an "approval" or a "counter-offer" credit decision from the financer
- A Spot/Bypass process, which is used when the application is in a "pending" status and has not yet received a credit decision

A. Process Flowchart

Figure 1 indicates the eContracting process from application submission to the funding of the eContract.

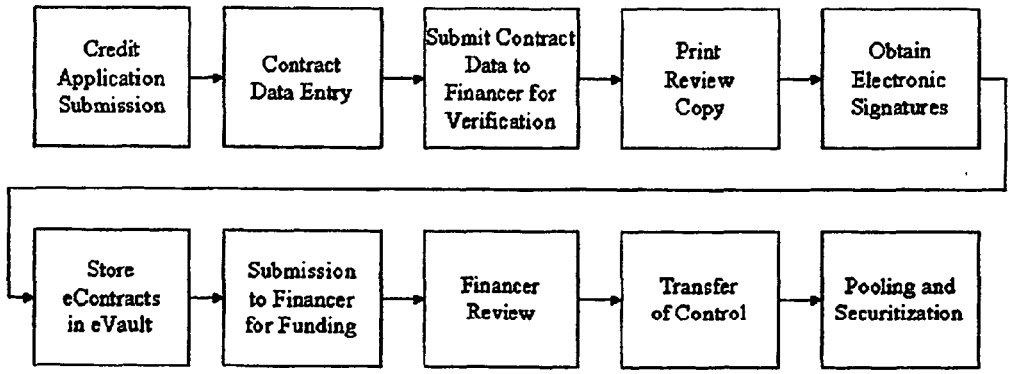

Figure 1 - eContracting Flow Chart

The sections below describe the eContracting process, system functionality and system rules. Upon request, DealerTrack can provide additional functional detail regarding the processes described below.

B. Contract Creation and Management

This section describes the eContracting process from application submission to storage of the eContract within the DealerTrack eVault.

*1. Credit Application Submission*

DealerTrack's credit application product is widely used throughout the automotive finance industry, currently processing over 1.5 million applications per month. Even if a dealer does not submit a credit application through the DealerTrack platform, it can still utilize the DealerTrack eContracting solution if the financer transmits the credit application and decision to the dealer via DealerTrack.

The DealerTrack platform provides a dealer with a standard credit application form to collect customer, financial and collateral information. Figure 2 illustrates a portion of the form used to collect the required information.

Figure 2 - Online Application Submission Form

Once the information has been collected, it is packaged using the DealerTrack-defined XML data format and transmitted to the financer's system for a credit decision. If the credit decision returned (Figure 3) by the financer is either an "approved" or "counter-offer," then the dealer can proceed with the Standard process for eContracting. Similarly, if the credit decision is "pending" the dealer can utilize the Spot/Bypass process for eContracting. A "pending" credit decision occurs most commonly when the credit application requires review by a credit analyst.

Figure 3 - Application Status Screen

2. eContracting Data Entry

Figure 4:
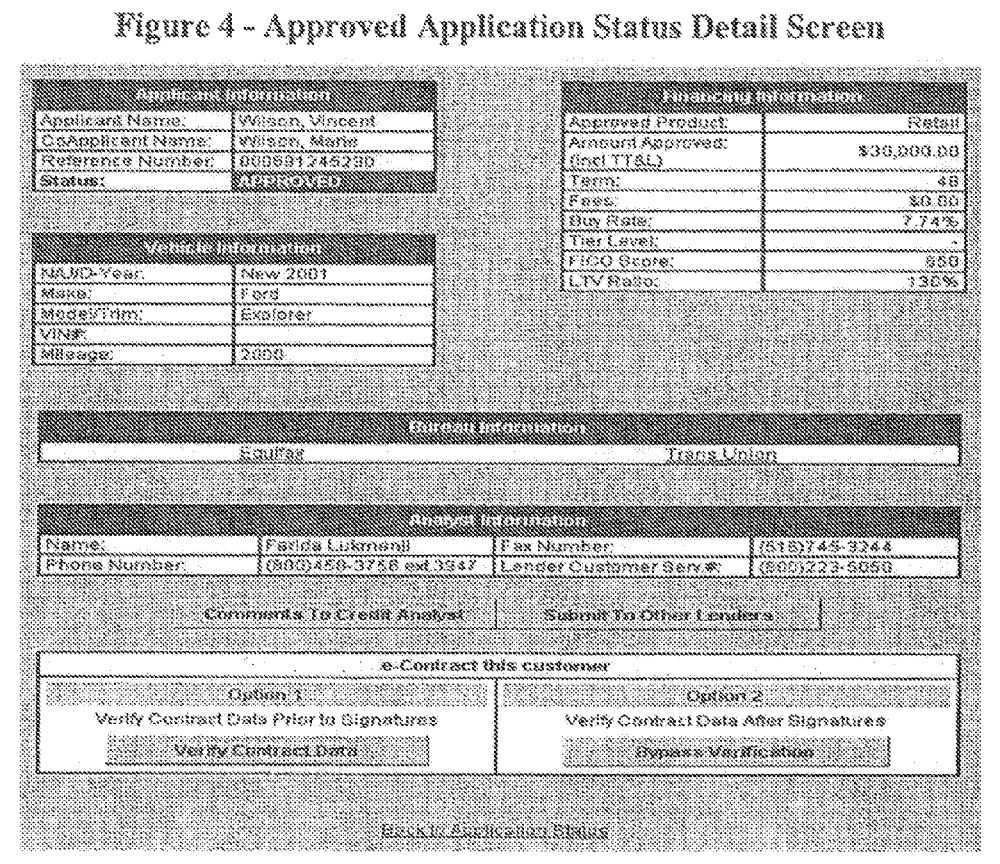

To begin the eContracting process, the dealer accesses the contract data entry form from the application status detail screen (Figure 4).

Figure 4 - Application Status Detail Screen

DealerTrack has created a set of state-specific standard contract data entry forms (Figure 5) that are designed to capture all necessary information to create the eContract. All application and approval data is pre-populated into the contract data entry form. In the Spot/Bypass process only the application data is pre-populated. The remaining fields are to be completed by the dealer.

Figure 5 - Collecting Finance Information

The DealerTrack platform prevents the dealer from preparing multiple contracts for the same customer. In the event a contract is modified or cancelled, the system automatically returns the dealer to the appropriate eContracting starting point.

The contract data entry form has built-in validation capabilities that ensure the completeness and accuracy of the eContract. The validation criteria includes:

- Automatically generating the Co-Signor Notice
- Ensuring that all mandatory data fields are complete
- Validating that the customer interest rate is capped at the maximum allowable by applicable state usury laws
- Verifying that the first payment date is between 19-51 days of the note date
- Providing GAP information in applicable states
- Verifying the monthly payment calculation The form also provides the dealer with the financer's "Approved Amount" and calculates the "Total of Payments." DealerTrack's eContracting solution provides dealers and financers with many other value-added capabilities, such as:

- The automatic notification of errors on the contract data entry form
- The ability to limit the types of applications eligible for the eContracting solution (e.g. an application related to a prior application)
- A notification from the financer to the dealer if the application is ineligible to be processed as an eContract

3. Submit to Financer for Verification/Continue

For previously approved or counter-offered applications, the dealer submits the eContract data to the financer for verification. The eContract data is packaged in the DealerTrack XML messaging format and transferred through DealerTrack to the selected financer's application processing system. After submission, the solution disables the dealer's ability to change contract data while awaiting the financer's response. The communication that occurs between DealerTrack and the financer is real-time and is presented to the dealer in the form of status changes on the "Contract Status" screen.

As the financer processes the eContract data, it transmits any error messages identified for the dealer to address and resubmit. The system has the flexibility to accommodate multiple backend processes by the financer to support the verification of contract data entered by the dealer. Should any errors be identified, the financer notifies the dealer through DealerTrack. Once corrected, the dealer can resubmit the contract data for verification. If no errors are found, but the terms of the eContract are not within the parameters of the approval or the financer's tolerances for booking the eContract are exceeded, the financer can reroute the deal to a credit or funding analyst for review. The financer updates the status within DealerTrack along with specific reasons, and the system is automatically updated to reflect the current status.

If the contract data is verified, the financer transmits to DealerTrack the Annual Percentage Rate (APR), Monthly Payment, and Finance Charge along with the required documentation to be referenced on a bar-coded fax cover sheet. The system merges the eContract data and the financer-supplied data into the state-specific eContract template and displays it to the dealer for viewing and printing. At this point, the dealer is required to provide a paper copy to the customer for review prior to obtaining electronic signatures.

4. Print Review Copy

The next step in the process is a "forced" printing of a paper review copy (Figure 6) for the customer to address any state and federal disclosure requirements. The forced print copy is presented to the customer in exactly the same manner as is currently performed in a paper environment. The printed copy indicates "Copy" as a watermark on each page, and the signature sections are blacked out to prevent the customer from applying a wet signature. The eContracting process is paused until the forced print is complete.

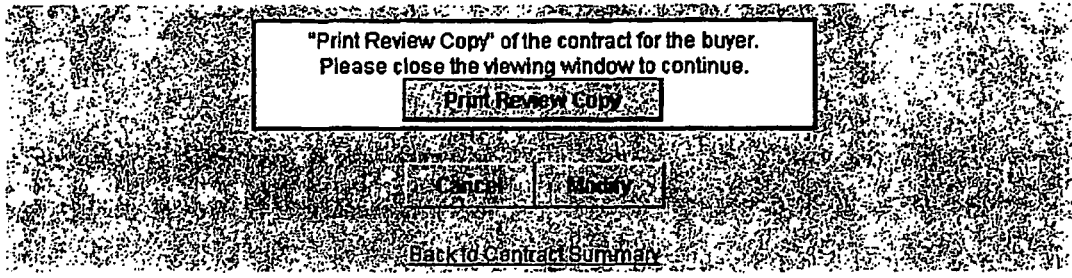

Figure 6 - Print Paper Review Copy

After printing the review copy, DealerTrack displays an overview page (Figure 7) that contains instructions for the dealer and indicates the status of the eContracting process. The dealer is also provided the opportunity to "Cancel" or "Modify" the eContract, if requested by the customer. Modification requires the dealer to resubmit data to the financer for verification and also requires another forced print.

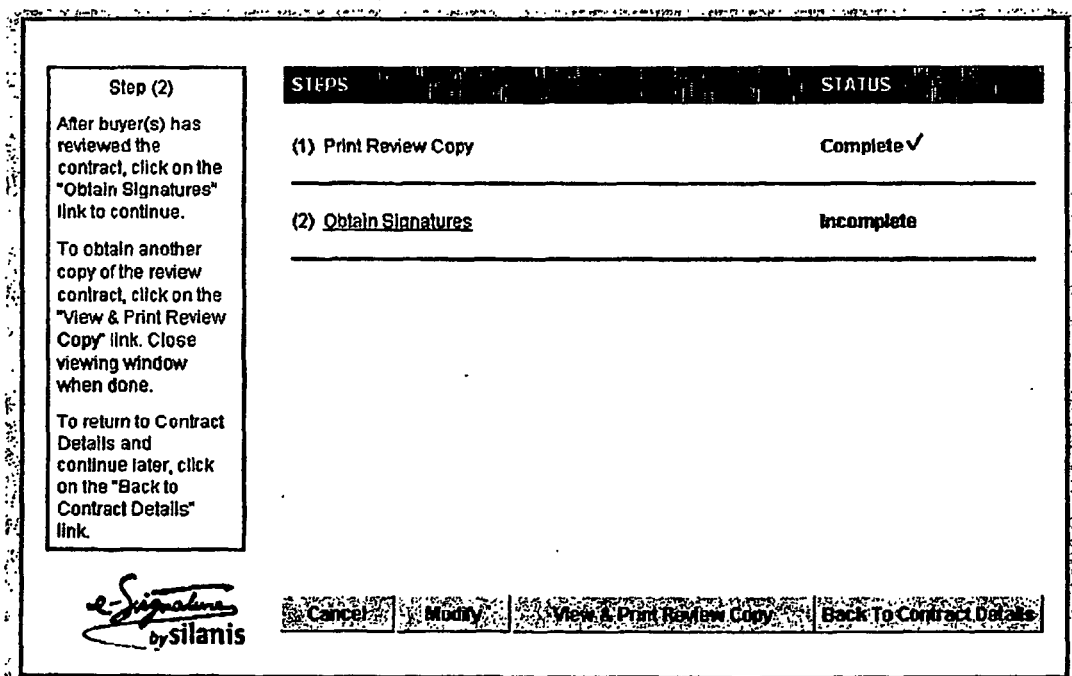

Figure 7 - Print Review Screen

5. Obtaining Signatures

DealerTrack's eContracting solution provides the dealer with a screen to capture the required signatures (Figure 8). The screen displays the required signature blocks for the buyer, co-buyer (if applicable), and dealer based on any products selected during the eContract creation process, e.g. warranty, credit life, accident and health insurance and GAP insurance. Each signature block contains language describing the associated contractual requirement.

Figure 8 - Signature Capture Screen

As the dealer guides the customer through the signature capture process, the dealer selects each signature block from the screen and the corresponding language automatically appears on the electronic signature pad. This process assures that the customer is presented the required language, is aware of the required signatures, and has notice of each signature's purpose.

If there is a date requirement on the eContract for the signature, the system uses the date that the signature was bound to the eContract. The signer has the ability to recapture signatures as many times as desired before securing to the eContract; however, once secured, the signature cannot be deleted from the eContract.

The system requires the dealer to select each signature block and obtain the appropriate signature(s) individually. The dealer repeats this process until all customer and dealer signatures are obtained. Signatures cannot be cut-and-pasted across signature blocks. The system does not allow the dealer to submit the contract to a financer for funding review until all signatures are obtained (Figure 9). Once all signatures are obtained, the dealer is capable of submitting the contract to a financer.

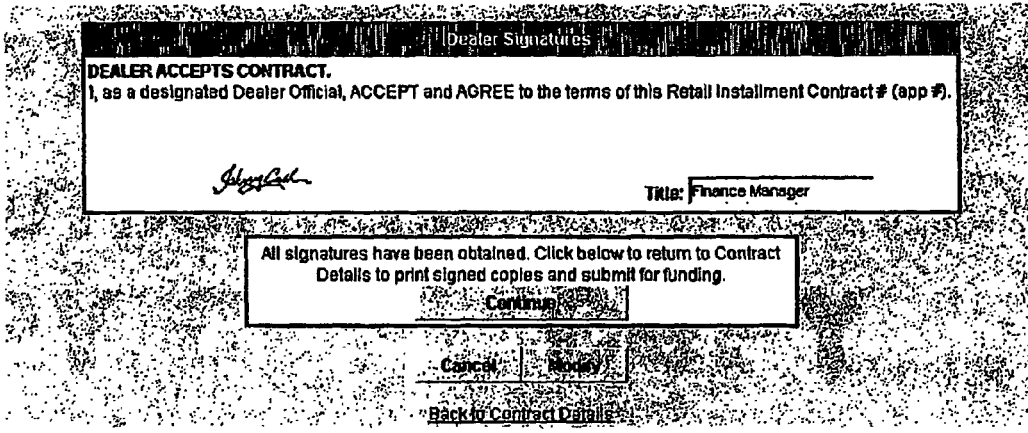

Figure 9 - Fully Executed Signature Capture Screen (Partial View)

The system permits individual participants to sign eContracts at different times, so long as all signatures for that participant are obtained. Partially signed eContracts are only stored for five days from the date the first signature is obtained by the dealer. If the eContract is not fully executed within the five days, the signatures are no longer retained and the dealer must get the customer to re-sign the eContract. Once the first signature is obtained, the eContract cannot be altered without invalidating the signature(s). The system provides the dealer with the option to print a copy of the customer-executed eContract for the customer.

Once all the signatures are obtained, the system begins the electronic binding process. Leveraging industry standard digital signature, encryption and hashing algorithms, the system generates an "approval token," that includes audit information and other related signer data. Once generated, the token is digitally signed, encrypted and programmatically embedded into the eContract - thereby creating a perpetual, unbreakable bond between the signer and financer.

Once embedding has taken place, the electronic signatures and related audit trail cannot be deleted or removed from the eContract. Regardless of whether the document is transmitted or archived, the electronic signatures remain part of the authoritative copy. The system inserts signatures into the eContract without corrupting or altering the usability of the file. If the document content is modified following signing, the signatures within the eContract are visibly invalidated. Authenticity of the document content, related approvals and audit trail can be verified at any time.

6. Storing the Authoritative Copy

Once the signatures have been embedded into the eContract, the system automatically submits the eContract to the DealerTrack eVault. The submission is initiated by creating a session, referred to as the security context, with the eVault on behalf of a dealer agent account. The dealer agent account comprises a single user and an associated digital certificate. The session security context enables the vault to verify the dealer's right to submit the eContract.

When the eVault is presented with an eContract, the system initiates a series of steps that result in a persistent authoritative copy. Figure 10 depicts the process used by the vault to create the closed, trusted environment necessary for storing eContracts.

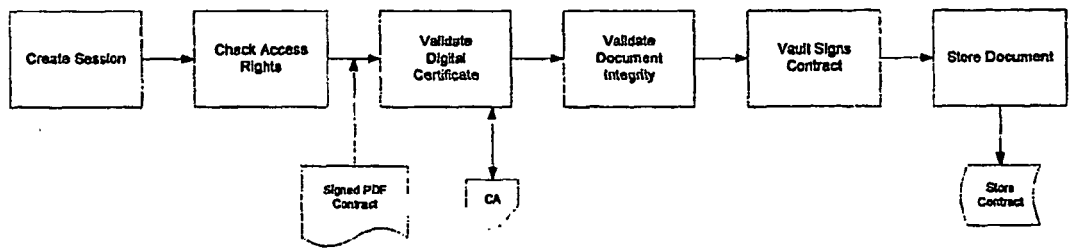

Figure 10 - Storing of Documents in the Vault

As mentioned earlier, the vault uses the user session security context to determine the user's rights in the eVault. Dealers are provided the ability to submit new eContracts to the system for storage and initiate transfer to financers. Financer's rights include the ability to assume control of eContracts from a dealer, view an eContract, request a paper copy, or request an export. DealerTrack's eContracting solution manages these rights through the administration tools described in section on access security.

Once the user's ability to access the eVault has been validated, the system verifies the digital certificate of the dealer agent used to bind the holographic signatures to the PDF contract. This is accomplished through a real-time connection to the certificate authority[5] (CA), using the online certificate status protocol (OCSP). The system is capable of verifying digital certificates from multiple CA's. However, DealerTrack recommends that a financer obtain RSA Keon certificates from a preferred provider.

After the system establishes that the dealer agent certificate is valid, it must ensure the integrity of the eContract. This is done by using the public key in the signed eContract to generate a new hash[6] of the document for comparison purposes. If the eContract has been altered at all, even a single character change, the hash comparison results in a failure and the eContract is returned to the system exception handling process.

---

[5] Certificate Authority (CA) - is a trusted third-party organization or company that issues digital certificates used to create digital signatures and public-private key pairs.

[6] Hash – is the result obtained by subjecting a set of data to an algorithm for purposes of checking the data at the time the algorithm is applied.

Once the system verifies the dealer's ability to submit the eContract, the digital certificate and the integrity of the eContract, it is ready to store the eContract in the eVault. The eVault has also been assigned a digital certificate, which is used to seal the eContract prior to storage in the eVault. The eVault utilizes a trusted time source to generate a date/time stamp that is embedded in the vault-signed eContract. This enables the eVault to clearly identify the time at which control of the eContract is assumed.

The time-stamped and sealed authoritative copy is stored in the eVault, whereby it is placed in a database table. The eVault continues to monitor the integrity of the eContract over time, using a series of background processes that run automatically on a defined schedule. Access to the authoritative copy is limited by the permissions defined in the system. The eVault ensures that the financer requests to view the authoritative copy contain the appropriate watermark overlays. The system also enables a dealer to view copies of their eContracts for a limited period of time. Access to dealer unassigned eContracts is controlled by the eVault permissions.

Each financer maintains strict access control over all eContracts contained its exclusive segment of the eVault. The permissions defined by the DealerTrack administration system are used to limit access to the eContracts, as well as ensure the integrity of the documents over time.

7. Creation of the Ownership Record

An internal ownership record is created for all eContracts submitted to the DealerTrack eVault. The ownership record begins with the initial deposit into the eVault by the dealer, and continues through the transfer of control to the financer, as well as each subsequent transfer of control. The ownership record also contains transactional information for:

- Termination of an eContract
- Export of an eContract
- Customer payoff
- Financer charge-off In this way, a complete transactional history of the transfers of control is maintained for the term of the eContract plus seven years.

Figures 11A, 11B:
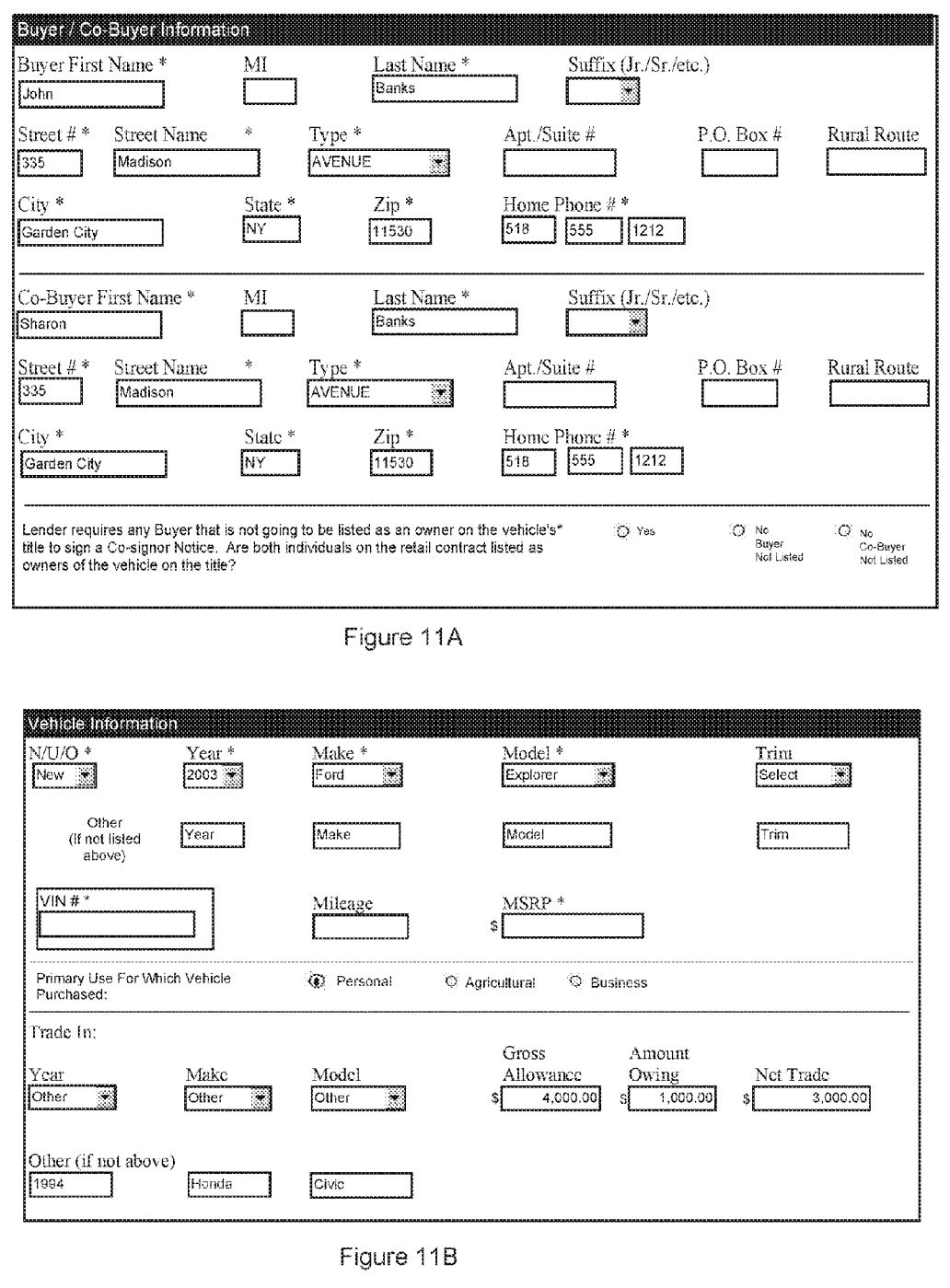

The ownership record is transferable and may be transmitted with the eContract if the transferee has the requisite software. The ownership record is only accessible to authorized users of the owning organization through the DealerTrack system. Figure 11 contains a description of the information currently captured in the ownership record.

| Field Name | Description |
|---|---|
| DealerTrack ID # (application) | Unique DealerTrack ID # associated with the application |
| Lender ID # (application/contract) | Unique Lender ID # associated with the application/contract |
| Borrower Name | First Name, Middle Initial, Last Name of Borrower |
| Co-Borrower Name | First Name, Middle Initial, Last Name of Co-Borrower (if applicable) |
| Transferor Organization Name | Name of selling organization |
| Transferor Organization Address | Address of selling organization |
| Transferee Organization Name | Name of buying organization |
| Transferee Organization Address | Address of buying organization |
| Date | MM/DD/YYYY for each ownership record entry |
| Time | HH:MM:SS for each ownership record entry |
| Transaction Type | Deposit, Transfer, Export (electronic/paper), Export to Lender, Payoff, Charge-off, Termination |
| User ID | System login id for user who initiated each of the following transactions: Export (electronic/paper), Export to Lender, Payoff, Charge-off, Termination |
| User Name | First Name, Middle Initial, Last Name of user who initiated each of the following transactions: Export (electronic/paper), Export to Lender, Payoff, Charge-off, Termination |

Figure 11 - Ownership Record Fields

8. Creation of the Audit Log

In addition to the ownership record, the system provides financers with an audit log for each eContract submitted to the DealerTrack eVault. The audit log includes events performed on eContracts, such as:

- Viewing
- Printing
- Exporting
- Payoffs
- Charge-offs
- Terminations

The audit log captures many data fields relevant to the event, such as the digital signature/certificate information of the transferor and transferee, user identification information and a date and time stamp.

Access to the audit log is a separate permission within the user administration function and is administered by the financer. The audit log permission can be assigned to users within the financer's organization or to a third party, e.g. an outside accounting firm, as designated by the financer.

9. Submit to Financer for Funding

Once a fully-executed copy of the eContract has been created, the DealerTrack system generates a second "forced" print of the fully-executed copy of the eContract and a deal-specific bar-coded fax cover sheet (Figure 12). The bar-coded fax cover sheet includes the bar code, customer information, financer reference number and documentation required to fund the deal. The bar code is used by the financer's imaging system to associate the ancillary documentation to the eContract record.

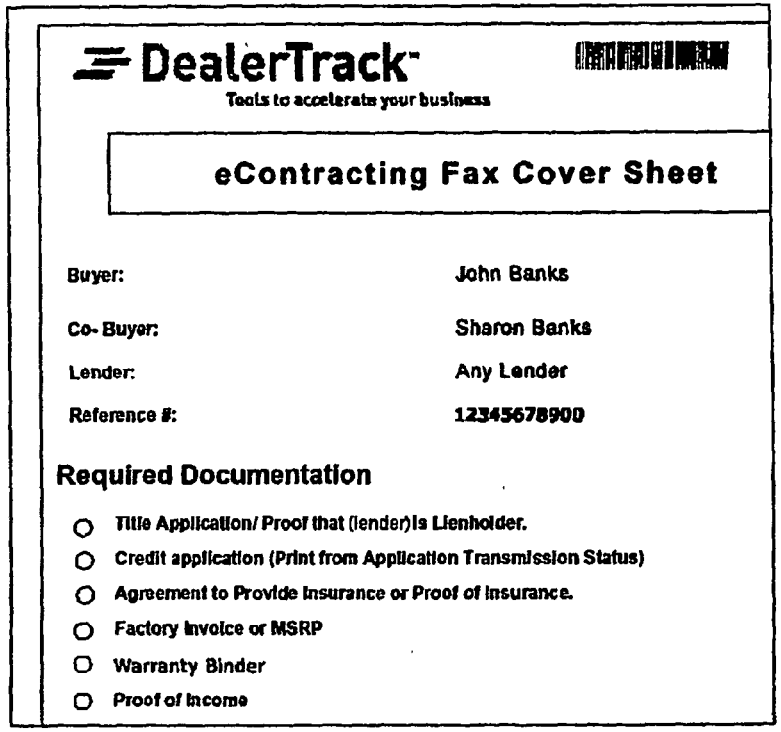

Figure 12 - Bar-coded Fax Cover Sheet

The second forced print enables the dealer to satisfy any applicable state law requirement that the executed agreement be delivered to the customer.

At the financer's option, the contract data is packaged in the DealerTrack XML format and transmitted to the financer (Figure 13) along with a non-authoritative or flattened[7] copy of the eContract. The dealer reviews the fax cover sheet (bar-coded), obtains all ancillary documents, and faxes those documents to the financer. The financer's fax server may forward the documentation to their imaging system, referencing the bar code to match it to the previously submitted eContract.

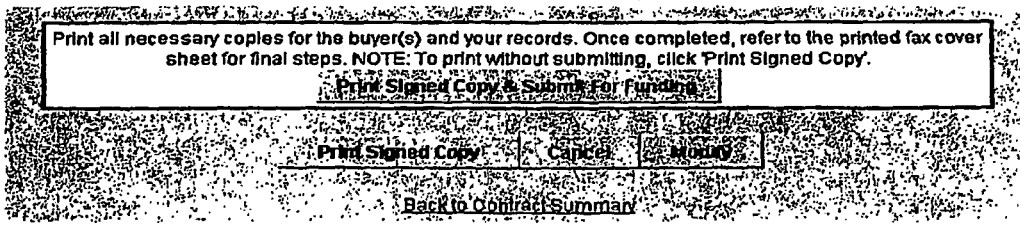

Figure 13 - Submit to Financer for Funding

---

[7] Flattened – a non-authoritative copy of the PDF eContract, with appropriate watermark overlays.

In the case where a dealer is utilizing the Spot/Bypass process, the DealerTrack system still forces a second printout of the eContract for the customer. Following the second forced print, the dealer is able submit the eContract to financers who have responded with an approval or counter-offer credit decision (Figure 14).

Figure 14 - Spot/Bypass Process

Upon entering the financer selection screen (Figure 15), the dealer is limited to submission to a single financer. The dealer is required to compare the credit application data to the eContract data to determine if the eContract is within the financer's decision parameters.

Figure 15 - Spot Delivery Select Financer

The user interface identifies the fields in the contract that do not match the decision parameters (Figure 16). If within bounds, the dealer submits the eContract to the financer in the same manner as the Standard process described above.

Figure 16 - Application/eContract Comparison Screen

10. Financer Review

Upon receipt of the eContract and ancillary documents, the financer initiates the documentation review process. The financer transmits to the dealer via the DealerTrack system, the result of the review process, e.g. booked, pending docs, etc. When necessary, the financer has the ability to send comments to the dealer itemizing the missing documentation.

At any period during the funding process and for thirty days following the initial submission, the dealer and financer can each request additional print copies of the fax cover sheet and non-authoritative eContract. As required, all printed copies of the eContract contain the appropriate watermark overlay. In either the Standard or Spot/Bypass process, when the financer rejects the deal the dealer is provided with the ability to select another financer to submit for funding.

DealerTrack requests a financer to provide the dealer with priority service, e.g. same day funding, when all eContract and ancillary documents are received within the financer-specified timeframe. This feature assures the dealer that a financer reviews the contract and ancillary documentation in order to fund the dealer the same day.

11. Transfer of Control

Once the financer has agreed to book the eContract, the solution supports two options for transferring control of the authoritative copy to the financer (Figure 17). The options are:

- Financer utilizes the DealerTrack eVault
- Financer utilizes its own secured storage solution

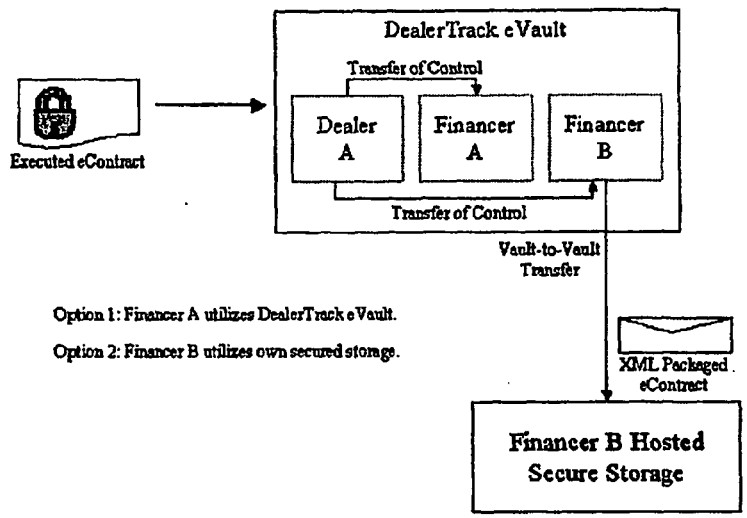

Figure 17 - eContract Storage Alternatives

When utilizing the eVault, the financer is allocated an exclusive segment to store their eContracts. The ownership record is automatically transferred during the transfer of control event. In the case of a financer secured storage solution, the eContract is exported from the eVault and transmitted to the financer. This process offers the flexibility of including or excluding the ownership record with the eContract package.

In either scenario, a multi-step protocol is used to facilitate the transfer of control. This process begins with the dealer initiating the transfer, the financer confirming receipt and the dealer acknowledging the confirmation of receipt. It is important to note that only the organization with control can initiate the transfer of an eContract to another party. Every transfer of control is entered into the ownership record for the eContract.

The eVault manages documents within a container transaction that includes the documents, ownership record, and user access rights. The buyer initiates the process by requesting the transfer of control. The first transfer of an eContract is from the dealer to the financer. The transfer is initiated after the financer has reviewed and accepted the contract from the dealer.

Once the financer acknowledgment has been received, the system creates an escrow account for the transfer. This also causes the documents contained in the dealer's transaction to be frozen. The escrow transaction operates as a temporary, neutral holding container for the documents and the final record of transfer (FROT)[8]. The dealer agent digitally signs the FROT.

The financer system initiates the creation of the financer-owned transaction. Both parties then confirm the transfer, and the documents are transitioned from the escrow transaction to the financer's new transaction. The dealer-signed FROT is also placed in the financer's transaction. The escrow transaction is then destroyed, and the system leaves a non-authoritative copy of the eContract in the dealer transaction. The system also places a financer-signed version of the FROT in the dealer transaction.

Financers with the desire to provide their own secured storage solution continue to utilize the standard transfer of control mechanisms within the eVault. Once control of the eContract has successfully transitioned to the financer, the system packages the eContract for a vault-to-vault transfer to the financer-hosted facility.

12. Financer eContract Management

Once the financer has assumed control of an eContract within the DealerTrack eVault, there are two options of management (Figure 18):

- Direct communication from the financer's servicing system
- Online through the DealerTrack web-based interface

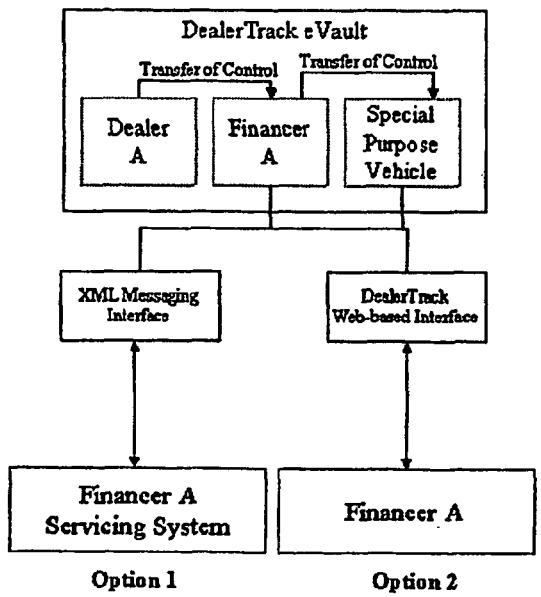

Figure 18 - Vault Access and Contract Management

---

[8] Final Record of Transfer - The FROT is an XML document that contains information about the dealer, financer, documents involved in the transfer and their associated ownership records.

Each of the options provides the financer with a unique manner in which to interact with the eVault, and different benefits. The direct communication link enables a financer to extend their existing servicing system capabilities to manage eContracts by interfacing with the vault using the DealerTrack-defined XML messaging interface. This allows financer personnel to continue to use their existing systems with minimal interruption. Direct connection enables rapid integration with minimal impact to the financer's systems.

The online web interface provides a financer with a robust application to manage eContracts stored in the eVault. Financer personnel with permissions to access the vault through the web application are able to:

- Search for eContracts based on a variety of criteria (e.g. loan term, loan value, origination date, APR)
- View and print the ownership record, audit log, and copies of PDF files
- Create pools to bundle and securitize eContracts
- Manage securitization pools (e.g. assign or reassign of eContracts)
- Export eContracts to paper or electronic media Regardless of which option the financer chooses to interact with the system, access is limited to only those eContracts stored in its exclusive segment.

13. Pooling eContracts for Securitization

Once an eContract has been transferred from the dealer to the financer, the financer is provided with the ability to securitize the eContract into the secondary market. The system provides a financer with the ability to pool, or bundle, eContracts for securitization to affiliate organizations or third parties.

The financer submits a pool request to the system from their servicing system or through the online web-based interface. The request to transfer the eContracts to the pool is processed by the system. The request consists of a collection of financer loan identifiers, which are maintained by DealerTrack in a cross-reference field on their eContracts. The system creates a new pool that contains all the eContracts identified in the request and initiates a transfer of control on behalf of the financer to the appropriately identified buyer. The buyer, who is typically a special purpose vehicle set up by the sponsoring financer, is identified as the new owner in the ownership record and each subsequent transfer of control is also reflected in the ownership record.

There is no limit to the number of transfers that are tracked in the ownership record. In order to facilitate the transfer process, an authorized financer user has the capability to create affiliate organizations within the eVault. These affiliates are issued their own digital certificate, which the ownership record uses in the transfer process. The sale to a third party is reflected in the ownership record and the third party has the ability to access those eContracts via direct communication or the online web-based interface.

14. Export

The export process, which enables the transfer of eContacts electronically or to paper, is available to both dealers and financers. DealerTrack completes the process on behalf of the dealer or financer. By requesting the export, the requestor is granting DealerTrack with the agency authority to perform the export. DealerTrack ensures that the eContract has been exported successfully prior to destroying the authoritative copy. The exported eContract is mailed to the requestor, with a required acknowledgment receipt.

The system is designed to export the authoritative copy while maintaining its authenticity, regardless of the media to which it is being exported. DealerTrack stores a non-authoritative copy of the exported eContract for backup purposes and destroys the authoritative copy upon confirmation that the eContract has been successfully exported. In addition, DealerTrack updates the ownership record to reflect that the export process has taken place and captures the name and user id of the individual who initiated the export.

C. Access Security

DealerTrack's user administration function allows dealers and financers to manage their respective users and to assign available permissions to users. Each organization participating on the DealerTrack system must identify a security administrator. The role of the organization determines the type of administrator assigned:

- Dealers – Dealer Information Owner (DIO)
- Financers – Lender Information Owner (LIO)

1. Dealer - User Administration

DIOs are provided the ability to grant four levels of eContracting access permissions. These access permissions are:

- Preparation – the ability to enter eContract data, submit eContract data to financers, access eContract statuses, print draft and final copies of eContracts
- Signature Capture – the ability to obtain the required customer and dealer signatures, and submit the fully executed eContract to a financer for review/funding
- Spot Delivery[9] – the ability to enter eContract data and create the eContract PDF file
- eVault – the ability to access unassigned eContracts, request an export, and terminate eContracts Figure 19 depicts the screen for assigning and managing a dealer's user permissions.

---

[9] Spot Delivery - is the Spot/Bypass process defined earlier that allows a dealer to generate and execute an eContract without prior credit approval from a financer.

Figure 19 - Dealer User Administration Screen

2. Financer - User Administration

LIOs are provided the ability to grant six levels of eContracting access permissions. These access permissions are:

- eContracts – the ability to access their portfolio of eContracts
- Ownership Record – the ability to access ownership records and historical trail of ownership for eContracts
- Create Pools and Transfer Ownership – the ability to pool and initiate securitization of eContracts
- Export – the ability to request export of eContracts electronically or on paper
- Create Affiliates/SPVs – the ability to dynamically create affiliate organizations, e.g. Financer A-Trust A, in order to facilitate the securitization of eContracts: the process includes a request to the CA to create a digital certificate for the affiliate
- Audit Log – the ability to provide internal and external auditors' access to relevant eContract data, e.g. ownership record, digital certificate information Figure 20 depicts the screen for assigning and managing a financer's user permissions.

Figure 20:
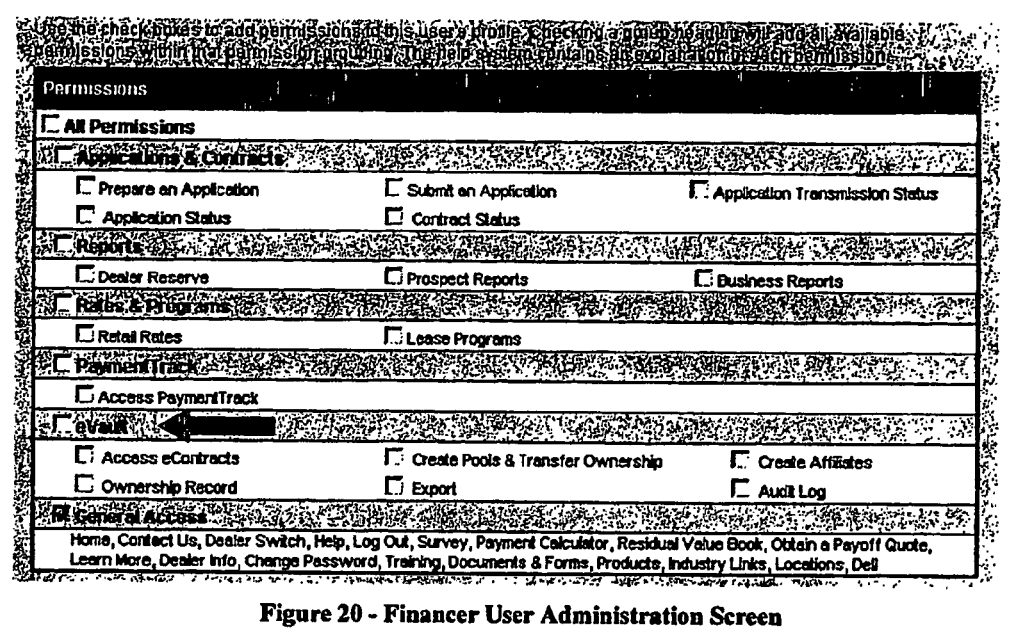

Figure 20 - Financer User Administration Screen

IV. Technology Overview

A. Infrastructure

The DealerTrack architecture is fully scalable and designed for high availability and reliability. An N-tier[10] logical design is utilized for maximum flexibility. The infrastructure is externally hosted and consists of a production site on the East Coast and disaster recovery site on the West Coast. The production site is fully redundant with no single point of failure.

Intel and Unix servers comprise the DealerTrack processing platform. Servers have Redundant Array of Inexpensive Disks - Level 5[11] (RAID-5) storage arrays and multiple processors, and are clustered for maximum availability.

DealerTrack uses a pair of hardware load balancers configured for automatic fail-over to distribute transaction traffic across its web server farm. The load balancers also perform secure sockets layer (SSL)[12] encryption and decryption using hardware acceleration. Web/application servers can be rotated in and out of service while the site is operating without affecting user sessions.

The software architecture consists of separate layers for presentation, application processing, and database processing, allowing for maximum flexibility, extensibility, scalability, and ease of development. Object-oriented component development with a separate Hypertext Markup Language (HTML)[13] presentation layer is used in the web/application tier to support extensibility and performance. Asynchronous processing and message queuing are used throughout the middle tier to enhance scalability and reliability. Stored procedures and transactions with automatic rollback are used in the database to maximize performance and data integrity.

1. Hosting

Both sites are externally hosted in world-class modern facilities that have comprehensive physical security controls such as:

- HVAC temperature control systems with separate cooling zones
- Seismically braced racks
- Advanced smoke detection and fire suppression systems

---

[10] N-tier – is an application that is distributed into separate software layers (e.g. presentation, business logic and database).

[11] Redundant Array of Inexpensive (or Independent) Disks (RAID) – is a collection of drives, which collaboratively act as a single storage system. The RAID can tolerate the failure of a drive without losing data and can operate independently of each other.

[12] Secure sockets layer (SSL) – is a transaction security standard that provides data encryption, server authentication, and message integrity. SSL is generally used on sites that want to keep information private.

[13] Hypertext markup language (HTML) – the encoding language used by Internet browsers to display text, images and links.

- 24/7 secured access with motion sensors, video camera surveillance, and security breach alarms
- Raised floors
- Redundant network of multiple fiber trunks from multiple sources
- Redundant power on premises
- Multiple backup generators DealerTrack personnel provide "managed services" for networking, hardware and software monitoring and maintenance. Both data centers have been independently audited and a SAS #70[14] report is available.

2. Website Security

DealerTrack is implemented in a layered firewall environment. All communications to and from the Internet are encrypted with 128-bit SSL. DealerTrack employs an intrusion detection system (IDS) operating both externally to the site (outside the firewall), as well as, internally on all Ethernet segments. Firewalls and IDS are both managed and monitored 24/7, 365 days a year, by an independent security management company.

DealerTrack utilizes a commercial software solution for securely managing user access to all applications. All incoming traffic must be authenticated before it is authorized to be passed on to the application. Once a user has been authorized, access control to specific functions within the site is performed by the application. DealerTrack has a highly granular access control system, which includes the granting and revocation of user permissions to functions on the site. A financer is granted security administration privileges to manage their users and access to their information. The security administrator can create/modify/delete users and assign specific privileges to individuals in order to match job responsibilities.

DealerTrack maintains and monitors logs of all activity on the site.

3. TruSecure Certification

DealerTrack has obtained certification from TruSecure Corporation, a leading industry security certification body. This certification program entails a comprehensive evaluation of DealerTrack's security program. The evaluation includes extensive testing of the website's perimeter defenses. As a result of this process, recommendations are made and implemented. The certification program requires continual monitoring and adherence to critical security policies and practices.

---

[14] SAS #70 – is an auditing standard designed to enable an independent auditor to evaluate and issue an opinion on a service organization's controls. The audit report (i.e. the service auditor's report) contains the auditor's opinion, a description of the controls placed in operation, and description of the auditor's tests of operating effectiveness.

4. Database Backup

(a) Database Backup

The database environment consists of a two-node server cluster and two fiber attached storage arrays. Each storage array is attached to both nodes of the cluster. The arrays are configured for RAID-5 and the data is mirrored across arrays. This configuration protects against data loss in the event that a disk or even the entire storage array is lost.

Database backup occurs on a nightly basis. A copy of the database is exported and transmitted over a secured virtual private network (VPN)[15] to the disaster recovery site where it is imported into a secured database instance.

(b) Database Backup (Scheduled for June, 2003)

DealerTrack is upgrading the current disk storage environment to a Storage Area Network (SAN)[16]. This new storage solution is highly resilient and as in today's environment the storage array uses RAID-5 for data protection. To improve disaster recovery capability, DealerTrack is implementing the real-time replication of data from the production site to the disaster recovery site in conjunction with this project. In addition, a nightly procedure is executed to backup the database to tape. The data is encrypted before being written to tape. A bonded courier then transports the backup tapes to a secured offsite facility for storage.

(c) Database Recovery (DR)

In the unlikely event that data is lost, a *point-in-time* recovery methodology is used to restore the data. *Point-in-time* recovery restores data to a point prior to the loss or corruption by recovering the data from activity log files. If the data is unrecoverable using this method, a copy can be recreated from the DR database or, as a last resort, from a backup tape.

---

[15] Virtual Private Network (VPN) - is a network that is constructed by using the public Internet as the medium for transporting data. A VPN uses encryption and other security mechanisms to ensure that the data traveling across the network is kept private and secure.

[16] Storage Area Network (SAN) – is a high-speed special-purpose sub-network that interconnects different kinds of data storage devices with associated data servers.

5. Partner Integration

Integration with financers is currently performed using XML encoded messages. DealerTrack is a member of both STAR and AFSA and is committed to supporting published standards as they evolve in the automotive finance industry. XML messages may be sent over a number of transports such as: HTTPS Post, Microsoft Message Queuing, IBM MQSeries and TCP/IP (Sockets).

CONCLUSION

Having now described exemplary embodiments of the present invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, and equivalents or similar purpose, unless expressly stated otherwise. Therefore, numerous other embodiments of the modifications thereof are contemplated as falling within the scope of the present invention as defined by the appended claims and equivalents thereto.

For example, the techniques described herein may be implemented in hardware or software, or a combination of the two. The techniques may be implemented in computer programs executing on programmable computers that each include a processor, a storage medium readable by the processor (including volatile and nonvolatile memory and/or storage elements), at least one input device and one or more output devices. Program code is applied to data entered using the input device to perform the functions described and to generate output information. The output information is applied to one or more output devices.

Each program may be implemented in a high level procedural or object oriented programming language to communicate with a computer system, however, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner. For illustrative purposes the present invention is embodied in the system/apparatus configuration, method of operation and product or computer-readable medium, such as carrier waves, floppy disks, conventional hard disks, CD-ROMS, Flash ROMS, nonvolatile ROM, RAM and any other equivalent computer memory device. It will be appreciated that the system, apparatus, method of operation and product may vary as to the details of its configuration and operation without departing from the basic concepts disclosed herein.

What is claimed is:

1. An integrated electronic credit application, contracting and securitization system comprising:
   a network device for receiving a credit application from an applicant utilizing at least one remote application input and display device at a dealer location;
   a processor configured for selectively forwarding said credit application to a plurality of funding sources and for receiving a funding decision from the plurality of funding sources;
   a server for providing an electronic contract between at least said applicant and a selected one of said plurality of funding sources using at least some information from said credit application; and
   a hosted vault for storing, retrieving and maintaining the integrity of said electronic contract by digitally signing, encrypting and programmatically embedding an approval token in said electronic contract, thereby providing irrevocable proof of the authenticity of said electronic contract,
   wherein the approval token comprises audit information and other data related to the applicant.

2. The system of claim 1 wherein said server for providing an electronic contract provides on said at least one application input and display device an electronic contract form having at least one first data field containing at least a portion of said credit application information and at least one second data field for entry of electronic contract information by said applicant.

3. The system of claim 2 wherein said server for providing an electronic contract stores in a storage medium at least a partially completed electronic contract.

4. The system of claim 2 wherein said server for providing an electronic contract provides on said at least one application input and display device tracking and status information about said electronic contract.

5. The system of claim 2 wherein said server for providing an electronic contract forwards at least said electronic contract information to said selected funding source for verification purposes and receives a funding source verification message from said selected funding source.

6. The system of claim 5 wherein said verification message comprises funding source edits.

7. The system of claim 5 wherein said server for providing an electronic contract prevents access by said applicant to said electronic contract information until receipt of said funding source verification message.

8. The system of claim 5 wherein said server for providing an electronic contract provides said verification message on said at least one application input and display device.

9. The system of claim 2 wherein said server for providing an electronic contract provides on said at least one application input and display device error information associated with the processing of said electronic contract.

10. The system of claim 2 further comprising at least one electronic signature device and wherein said server for providing an electronic contract captures an electronic signature of at least said applicant for said electronic contract using said electronic signature device.

11. The system of claim 2 wherein said server for providing an electronic contract selectively forwards said electronic contract information to another of said one or more funding sources for funding.

12. The system of claim 10 further comprising a printing device and wherein, prior to sending said electronic contract to said selected funding source for funding, said server for providing an electronic contract prints a copy of said electronic contract on said printing device for said applicant to review.

13. The system of claim 12 wherein said hosted vault for storing, retrieving, and maintaining the integrity of said electronic contract receives and stores said electronic contract in a second storage medium for a predefined period of time.

14. The system of claim 13 wherein said second storage medium is a database.

15. The system of claim 13 wherein said hosted vault for storing, retrieving, and maintaining the integrity of said electronic contract retrieves said stored electronic contract from said second storage medium and displays said stored electronic contract having an "original" or "copy" designation on said at least one application input and display device.

16. The system of claim 15 wherein said hosted vault for storing, retrieving, and maintaining the integrity of said electronic contract retrieves said stored electronic contract from said second storage medium and prints said stored electronic contract having said "original" or "copy" designation on said printing device.

17. The system of claim 13 wherein said hosted vault for storing, retrieving, and maintaining the integrity of said electronic contract maintains in said second storage medium user permissions data of said at least one authorized user.

18. The system of claim 17 wherein said at least one authorized user comprises at least one party to said electronic contract.

19. The system of claim 18 wherein said at least one authorized user comprises an agent of said at least one party to said electronic contract.

20. The system of claim 13 wherein said hosted vault for storing, retrieving, and maintaining the integrity of said electronic contract tracks and stores in said second storage medium access and usage information.

21. The system of claim 13 further comprising a registry and wherein said hosted vault for storing, retrieving, and maintaining the integrity of said electronic contract stores electronic contract ownership information in said registry.

22. The system of claim 21 wherein said hosted vault for storing, retrieving, and maintaining the integrity of said electronic contract displays said registry on said at least one application input and display device.

23. A method in an integrated electronic credit application, contracting and securitization system, comprising the steps of:
receiving a credit application from an applicant utilizing at least one remote application input and display device at a dealer location;
selectively forwarding said credit application to a plurality of funding sources utilizing a transmitting apparatus;
receiving a funding decision from the plurality of funding sources using a receiving apparatus;
providing an electronic contract between at least said applicant and a selected one of said plurality of funding sources using a processor configured to process at least some information from said credit application; and;
storing, retrieving and maintaining the integrity of said electronic contract using a storage medium by digitally signing, encrypting and programmatically embedding an approval token in said electronic contract, thereby providing irrevocable proof of the authenticity of said electronic contract,
wherein the approval token comprises audit information and other data related to the applicant.

24. The method of claim 23 further comprising providing on said at least one remote application input and display device an electronic contract form having at least one first data field containing at least a portion of said credit application information and at least one second data field for entry of electronic contract information by said applicant.

25. The method of claim 24 further comprising storing in said storage medium at least a partially completed electronic contract.

26. The method of claim 24 further comprising providing on said at least one application input and display device tracking and status information about said electronic contract.

27. The method of claim 24 further comprising forwarding at least said electronic contract information to said selected funding source for verification purposes and receiving a funding source verification message from said selected funding source.

28. The method of claim 27 wherein said verification message comprises funding source edits.

29. The method of claim 27 further comprising preventing access to said electronic contract information by said applicant until receipt of said funding source verification message.

30. The method of claim 24 further comprising providing said verification message on said at least one application input and display device.

31. The method of claim 24 further comprising providing on said at least one application input and display device error information associated with the processing of said electronic contract.

32. The method of claim 24 further comprising capturing an electronic signature of at least said applicant for said electronic contract using an electronic signature device.

33. The method of claim 24 further comprising selectively forwarding said electronic contract information to another of said one or more funding sources for funding.

34. The method of claim 24 further comprising prior to sending said electronic contract to said selected funding source for funding, printing a copy of said electronic contract on a printing device for said applicant to review.

35. The method of claim 24 further comprising receiving and storing in a second storage medium said electronic contract for a predefined period of time.

36. The method of claim 35 wherein said second storage medium is a database.

37. The method of claim 35 further comprising retrieving said stored electronic contract from said second storage medium and displaying said stored electronic contract having an "original" or "copy" designation on said at least one application input and display device.

38. The method of claim 37 further comprising printing said stored electronic contract having said "original" or "copy" designation on said printing device.

39. The method of claim 35 further comprising maintaining in said second storage medium user permissions data of said at least one authorized user.

40. The method of claim 39 wherein said at least one authorized user comprises at least one party to said electronic contract.

41. The method of claim 39 wherein said at least one authorized user comprises an agent of said at least one party to said electronic contract.

42. The method of claim 35 further comprising monitoring access to said electronic contract stored in said storage medium.

43. The method of claim 35 further comprising providing and storing electronic contract ownership information in a registry.

44. The method of claim 43 further comprising displaying said registry on said at least one application input and display device.

45. A program storage device readable by a machine, tangibly embodying a program of instructions executable by the machine to perform method steps for electronic credit application processing, contracting and securitizing, said method steps comprising:
receiving credit application information of an applicant;
selectively forwarding said credit application to one or more funding sources for approval to provide an approved credit application;
processing electronic contract information and at least some of said application information from said approved credit application to provide an electronic contract between at least said applicant and a selected one of said funding sources; and;
storing and retrieving said electronic contract and maintaining the integrity of said at least some of said application information contained therein by digitally signing, encrypting and programmatically embedding an approval token in said electronic contract, thereby providing irrevocable proof of the authenticity of said electronic contract, wherein the approval token comprises audit information and other data related to the applicant.

46. The program storage device as in claim 45 wherein the method steps further comprise providing on at least one application entry and display device an electronic contract form having at least one first data field containing at least a portion of said application information and at least one second data field for entry of electronic contract information by said applicant.

47. The program storage device as in claim 46 wherein the method steps further comprise storing in a storage medium at least a partially completed electronic contract.

48. The program storage device as in claim 46 wherein the method steps further comprise providing on said least one application entry and display device tracking and status information about said electronic contract.

49. The program storage device as in claim 46 wherein the method steps further comprise forwarding at least said electronic contract information to said selected funding source for verification purposes and receiving a funding source verification message from said selected funding source.

50. The program storage device as in claim 49 wherein said verification message comprises funding source edits.

51. The program storage device as in claim 49 further comprising preventing access to said electronic contract information by said applicant until receipt of said funding source verification message.

52. The program storage device as in claim 49 wherein the method steps further comprise providing said verification message on said at least one application entry display device.

53. The program storage device as in claim 46 wherein the method steps further comprise providing for at least one authorized user of said system and maintaining in said second storage medium user permissions data of said at least one authorized user.

54. The program storage device as in claim 46 wherein the method steps further comprise capturing an electronic signature of at least said applicant of said electronic contract using an electronic signature device.

55. The program storage device as in claim 46 wherein the method steps further comprise selectively forwarding said electronic contract information to another of said one or more funding sources for funding.

56. The program storage device as in claim 54 wherein the method steps further comprise the step of, prior to sending said electronic contract to said selected funding source for funding, printing a copy of said electronic contract on a printing device for said applicant to review.

57. The program storage device as in claim 46 wherein the method steps further comprise receiving and storing in a second storage medium said electronic contract for a predefined period of time.

58. The program storage device as in claim 57 wherein said storage medium is a database.

59. The program storage device as in claim 57 wherein the method steps further comprise the steps of retrieving said stored electronic contract from said second storage medium and displaying said stored electronic contract having an "original" or "copy" designation on said at least one application entry and display device.

60. The program storage device as in claim 59 wherein the method steps further comprise the step of printing said stored electronic contract having said "original" or "copy" designation on said printing device.

61. The program storage device as in claim 57 wherein the method steps further comprise the steps of providing and maintaining in said second storage medium user permissions data of an authorized user of said integrated system.

62. The program storage device as in claim 61 wherein said authorized user comprises at least one party to said electronic contract.

63. The program storage device as in claim 62 wherein said authorized user comprises an agent of said at least one party to said electronic contract.

64. The program storage device as in claim 47 wherein the method steps further comprise monitoring access to said electronic contract stored in said storage medium.

65. The program storage device as in claim 57 wherein the method steps further comprise the steps of providing and storing electronic contract ownership information in a registry.

66. The program storage device as in claim 65 wherein the method steps further comprise the step of displaying said registry on said at least one application entry and display device.

* * * * *